United States Patent
Wei et al.

(10) Patent No.: US 11,899,172 B2
(45) Date of Patent: Feb. 13, 2024

(54) IMAGING OPTICAL LENS ASSEMBLY INCLUDING FIVE LENSES +−++−, −++−, −−++−, +−+++, +++−+, +−+−+, +−+−−, OR −++−+ OF REFRACTIVE POWERS, IMAGING APPARATUS AND ELECTRONIC DEVICE

(71) Applicant: LARGAN PRECISION CO., LTD., Taichung (TW)

(72) Inventors: Chung-Yu Wei, Taichung (TW); Wen-Yao Yang, Taichung (TW); Yi-Hsiang Chuang, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 619 days.

(21) Appl. No.: 17/038,066

(22) Filed: Sep. 30, 2020

(65) Prior Publication Data
US 2021/0302700 A1    Sep. 30, 2021

(30) Foreign Application Priority Data

Mar. 30, 2020 (TW) ................. 109110871

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .... G02B 13/0045; G02B 9/60; G02B 13/002; G02B 13/0015; G02B 13/001; G02B 9/00
See application file for complete search history.

(56) References Cited

U.S. PATENT DOCUMENTS

| | | | |
|---|---|---|---|
| 8,520,322 B2 | 8/2013 | Tang et al. |
| 8,736,984 B1 | 5/2014 | Hsieh et al. |
| 8,947,790 B2 | 2/2015 | Tsai et al. |
| 8,988,793 B2 | 3/2015 | Kubota et al. |
| 9,052,491 B2 | 6/2015 | Tang et al. |
| 9,201,215 B2 | 12/2015 | Hsu et al. |
| 9,207,435 B2 | 12/2015 | Tsai et al. |
| 9,223,114 B2 | 12/2015 | Tsai et al. |

(Continued)

FOREIGN PATENT DOCUMENTS

| | | |
|---|---|---|
| CN | 103837962 A | 6/2014 |
| CN | 105259636 A | 1/2016 |

(Continued)

*Primary Examiner* — Wen Huang
(74) *Attorney, Agent, or Firm* — McClure, Qualey & Rodack, LLP

(57) ABSTRACT

An imaging optical lens assembly includes five lens elements, which are, in order from an object side to an image side along an optical path, a first lens element, a second lens element, a third lens element, a fourth lens element and a fifth lens element. Each of the five lens elements has an object-side surface towards the object side and an image-side surface towards the image side. The third lens element has positive refractive power. At least one of the object-side surface and the image-side surface of at least one of the five lens elements includes at least one critical point in an off-axis region thereof.

10 Claims, 35 Drawing Sheets

(56) References Cited

U.S. PATENT DOCUMENTS

| | | | |
|---|---|---|---|
| 9,310,587 B2 * | 4/2016 | Tsai | G02B 13/0045 |
| 9,411,133 B1 | 8/2016 | Isieh et al. | |
| 9,638,894 B2 | 5/2017 | Hsieh et al. | |
| 9,864,171 B2 | 1/2018 | Hsieh et al. | |
| 9,880,373 B2 | 1/2018 | Hsu et al. | |
| 9,989,741 B1 | 6/2018 | Hsueh et al. | |
| 10,175,458 B2 | 1/2019 | Tseng et al. | |
| 10,175,493 B1 | 1/2019 | Chen et al. | |
| 10,197,772 B2 | 2/2019 | Chen et al. | |
| 10,310,230 B2 | 6/2019 | Chen et al. | |
| 10,545,315 B2 | 1/2020 | Chen et al. | |
| 2014/0376109 A1 | 12/2014 | Jeong | |
| 2015/0116569 A1 | 4/2015 | Mercado | |
| 2016/0139364 A1 | 5/2016 | Tang et al. | |
| 2016/0139365 A1 | 5/2016 | Tang et al. | |
| 2016/0187619 A1 * | 6/2016 | Tang | G02B 13/0045 |
| | | | 359/713 |
| 2017/0269337 A1 | 9/2017 | Lai et al. | |
| 2017/0269338 A1 | 9/2017 | Lai et al. | |
| 2018/0059376 A1 | 3/2018 | Lin et al. | |
| 2018/0321470 A1 | 11/2018 | Lee et al. | |
| 2019/0011673 A1 | 1/2019 | Fukaya et al. | |
| 2019/0064484 A1 | 2/2019 | Yeh et al. | |
| 2019/0137734 A1 | 5/2019 | Gong et al. | |
| 2019/0271832 A1 * | 9/2019 | Kuo | G02B 9/60 |
| 2019/0278054 A1 | 9/2019 | Chang et al. | |
| 2019/0278056 A1 | 9/2019 | Chang et al. | |
| 2021/0063703 A1 | 3/2021 | Byun et al. | |
| 2021/0109321 A1 | 4/2021 | Jo et al. | |
| 2021/0231918 A1 | 7/2021 | Chang et al. | |
| 2021/0231921 A1 | 7/2021 | Chang et al. | |
| 2021/0263263 A1 | 8/2021 | Teranishi | |
| 2022/0187577 A1 * | 6/2022 | Zhang | G02B 9/60 |

FOREIGN PATENT DOCUMENTS

| | | |
|---|---|---|
| CN | 105278109 A | 1/2016 |
| CN | 205844609 U | 12/2016 |
| CN | 107121755 A | 9/2017 |
| CN | 107515455 A | 12/2017 |
| CN | 109633867 A | 4/2019 |
| CN | 110297313 A | 10/2019 |
| CN | 110320647 A | 10/2019 |
| CN | 110412750 A | 11/2019 |
| CN | 110426838 A | 11/2019 |
| CN | 110749976 A | 2/2020 |
| CN | 111045192 A | 4/2020 |
| CN | 211426895 U | 9/2020 |
| JP | 2013011710 A | 1/2013 |
| JP | 2015087495 A | 5/2015 |
| TW | I512326 B | 12/2015 |
| TW | M596355 U | 6/2020 |
| TW | M596356 U | 6/2020 |
| WO | 2012020554 A1 | 2/2012 |

* cited by examiner

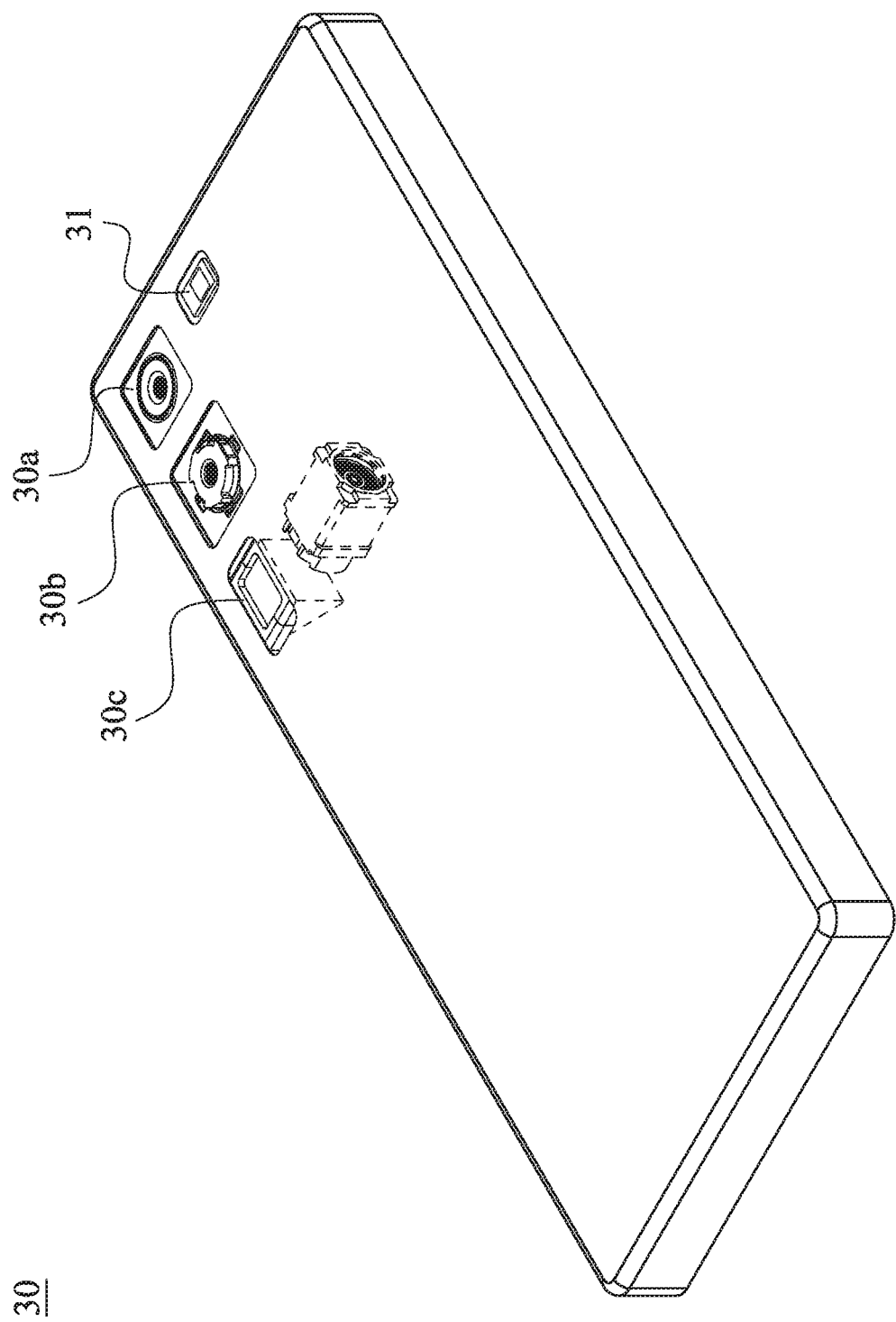

IMAGING OPTICAL LENS ASSEMBLY INCLUDING FIVE LENSES +−++−, −++−, −−++−, +−+++, +++−+, +−+−+, +−+−−, OR −++−+ OF REFRACTIVE POWERS, IMAGING APPARATUS AND ELECTRONIC DEVICE

RELATED APPLICATIONS

This application claims priority to Taiwan Application Serial Number 109110871, filed Mar. 30, 2020, which is herein incorporated by reference.

BACKGROUND

Technical Field

The present disclosure relates to an imaging optical lens assembly and an imaging apparatus. More particularly, the present disclosure relates to an imaging optical lens assembly and an imaging apparatus with compact size applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a demand for an optical lens assembly that meets the aforementioned needs.

SUMMARY

According to one aspect of the present disclosure, an imaging optical lens assembly includes five lens elements, the five lens elements being, in order from an object side to an image side along an optical path, a first lens element, a second lens element, a third lens element, a fourth lens element and a fifth lens element, each of the five lens elements has an object-side surface towards the object side and an image-side surface towards the image side. The third lens element has positive refractive power. The fourth lens element has the object-side surface being concave in a paraxial region thereof. At least one of the object-side surface and the image-side surface of at least one of the five lens elements includes at least one critical point in an off-axis region thereof. When a measurement is made in accordance with a reference wavelength as a d-line, an Abbe number of the first lens element is Vd1, an Abbe number of the second lens element is Vd2, an Abbe number of the third lens element is Vd3, an Abbe number of the fourth lens element is Vd4, an Abbe number of the fifth lens element is Vd5, and the following condition is satisfied: $50.0<Vd1+Vd2+Vd3+Vd4+Vd5<165.0$. When a focal length of the imaging optical lens assembly is f, a focal length of the third lens element is f3, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a central thickness of the third lens element is CT3, and a central thickness of the fourth lens element is CT4, the following conditions are satisfied: $0<f3/f<4.5$; $4.80<(T23+T34)/(T12+T45)$; and $0<(CT3+CT4)/T34<5.0$.

According to another aspect of the present disclosure, an imaging optical lens assembly includes five lens elements, the five lens elements being, in order from an object side to an image side along an optical path, a first lens element, a second lens element, a third lens element, a fourth lens element and a fifth lens element, each of the five lens elements has an object-side surface towards the object side and an image-side surface towards the image side. The third lens element has positive refractive power. The fourth lens element has the image-side surface being convex in a paraxial region thereof. At least one of the object-side surface and the image-side surface of at least one of the five lens elements includes at least one critical point in an off-axis region thereof. When a measurement is made in accordance with a reference wavelength as a d-line, an Abbe number of the first lens element is Vd1, an Abbe number of the second lens element is Vd2, an Abbe number of the third lens element is Vd3, an Abbe number of the fourth lens element is Vd4, an Abbe number of the fifth lens element is Vd5, and the following condition is satisfied: $50.0<Vd1+Vd2+Vd3+Vd4+Vd5<160.0$. When a focal length of the imaging optical lens assembly is f, a focal length of the third lens element is f3, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and a central thickness of the third lens element is CT3, the following conditions are satisfied: $0<f3/f<4.5$; $3.80<(T23+T34)/(T12+T45)$; $T23/T34<1.35$; and $0<CT3/(T23+T34)<3.2$.

According to another aspect of the present disclosure, an imaging optical lens assembly includes five lens elements, the five lens elements being, in order from an object side to an image side along an optical path, a first lens element, a second lens element, a third lens dement, a fourth lens element and a fifth lens element, each of the five lens elements has an object-side surface towards the object side and an image-side surface towards the image side. The first lens element has the image-side surface being convex in a paraxial region thereof. The second lens element has the image-side surface being concave in a paraxial region thereof. The third lens element has positive refractive power. The fourth lens element has the object-side surface being concave in a paraxial region thereof. The fifth lens element has the object-side surface being convex in a paraxial region thereof. At least one of the object-side surface and the image-side surface of at least one of the five lens elements includes at least one critical point in an off-axis region thereof. When a measurement is made in accordance with a reference wavelength as a d-line, an Abbe number of the first lens element is Vd1, an Abbe number of the second lens element is Vd2, an Abbe number of the third lens element is Vd3, an Abbe number of the fourth lens element is Vd4, an Abbe number of the fifth lens element is Vd5, and the following condition is satisfied: $55.0<Vd1+Vd2+Vd3+Vd4+Vd5<140.0$. When a focal length of the imaging optical lens assembly is f, a focal length of the third lens element is f3, and a curvature radius of the image-side surface of the second lens element is R4, the following conditions are satisfied: $0<f3/f<4.5$; and $0<R4/f<50$.

According to another aspect of the present disclosure, an imaging apparatus includes the imaging optical lens assembly of the aforementioned aspect and an image sensor, wherein the image sensor is disposed on an image surface of the imaging optical lens assembly.

According to another aspect of the present disclosure, an electronic device includes the imaging apparatus of the aforementioned aspect.

BRIEF DESCRIPTION OF THE DRAWINGS

FIG. 28 is a schematic view of one side of an electronic device according to the 15th embodiment of the present disclosure.

DETAILED DESCRIPTION

Figure 1:
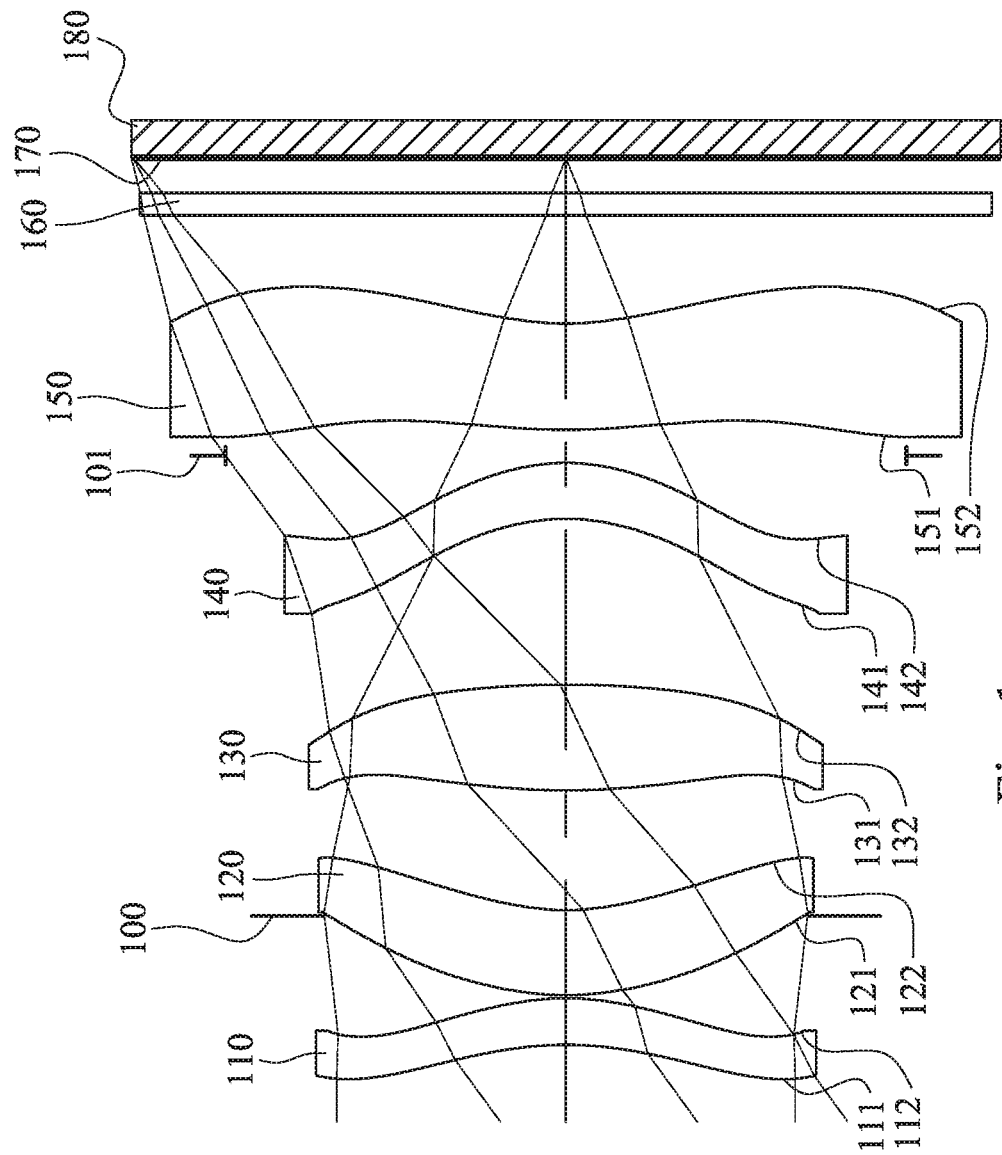
FIG. 1 is a schematic view of an imaging apparatus according to the 1st embodiment of the present disclosure.

An imaging optical lens assembly includes five lens elements, the five lens elements are, in order from an object side to an image side along an optical path, a first lens element, a second lens element, a third lens element, a fourth lens element and a fifth lens element. Each of the five lens elements has an object-side surface towards the object side and an image-side surface towards the image side.

The first lens element can have the image-side surface being convex in a paraxial region thereof, which is favorable for forming the arrangement of large aperture and wide field of view by cooperating with the second lens element.

The second lens element can have the image-side surface being concave in a paraxial region thereof, which is favorable for reducing aberrations, such as distortion by adjusting the surface shape of the second lens element.

The third lens element has positive refractive power, which provides needed positive refractive power for compressing the total track length of the imaging optical lens assembly. The third lens element can have the object-side surface being convex in a paraxial region thereof, so that the size can be compressed by adjusting refractive power of the third lens element. The third lens element can have the image-side surface being convex in a paraxial region thereof, so that it is favorable for balancing the volume distribution of the object side and the image side by adjusting the processing path of light.

The fourth lens element can have the object-side surface being concave in a paraxial region thereof, so that the area of the image surface can be enlarged by adjusting the processing path of light. The fourth lens element can have the image-side surface being convex in a paraxial region thereof, so that off-axis aberrations can be corrected by cooperating with the fifth lens element.

The fifth lens element can have the object-side surface being convex in a paraxial region thereof, so that it is favorable for correcting the image distortion in an off-axis region by adjusting the surface shape of the fifth lens element. The fifth lens element can have the image-side surface being concave in a paraxial region thereof, so that it is favorable for adjusting the back focal length and correcting off-axis aberrations.

At least one of the object-side surface and the image-side surface of at least one of the five lens elements includes at least one critical point in an off-axis region thereof. Therefore, it is favorable for correcting aberrations in the off-axis region, reducing the volume and enlarging the field of view, aperture and image surface by increasing the variation of the lens surface. Furthermore, at least one of the object-side surface and the image-side surface of at least two, at least three or at least four of the five lens elements includes at least one critical point in an off-axis region thereof.

The image-side surface of the first lens element can include at least one critical point in an off-axis region thereof. Therefore, it is favorable for enlarging the aperture and compressing the volume on the object side by adjusting the surface shape of the first lens element.

The object-side surface of the third lens element can include at least one critical point in an off-axis region thereof. Therefore, it is favorable for compressing the size of the lens element and balancing the volume distribution of the object side and the image side by adjusting the processing path of light.

The image-side surface of the fourth lens element can include at least one critical point in an off-axis region thereof. Therefore, it is favorable for correcting aberrations in the off-axis region and enlarging the area of the image surface by adjusting the processing path of light.

The object-side surface of the fifth lens element can include at least one critical point in an off-axis region thereof. Therefore, it is favorable for compressing the size of the lens element and correcting aberrations in the off-axis region. The image-side surface of the fifth lens element can include at least one critical point in an off-axis region thereof. Therefore, it is favorable for enhancing the image quality of the image surface in the peripheral region thereof and the response efficiency of the image sensor by adjusting the incident angle of the light on the image surface. Moreover, when a distance between a critical point of the image-side surface of the fifth lens element and the optical axis is Yc52, and a maximum distance between an optical effective region of the image-side surface of the fifth lens element and the optical axis is Y52, the image-side surface of the fifth lens element can include at least one critical point in an off-axis region thereof satisfying the following condition: 0.60<Yc52/Y52<0.90. Therefore, it is favorable for enhancing the image quality of the image surface in the peripheral region thereof by adjusting the location of the critical point.

When a measurement is made in accordance with a reference wavelength as a d-line, an Abbe number of the first lens element is Vd1, an Abbe number of the second lens element is Vd2, an Abbe number of the third lens element is Vd3, an Abbe number of the fourth lens element is Vd4, an Abbe number of the fifth lens element is Vd5, and the following condition is satisfied: 50.0<Vd1+Vd2+Vd3+Vd4+Vd5<165.0. Therefore, it is favorable for reducing aberrations, such as chromatic aberration by cooperating the material of the lens elements, and it is also favorable for other aberrations except for chromatic aberration in infrared band which has lower demand of chromatic aberration correction. Further, the following condition can be satisfied: 50.0<Vd1+Vd2+Vd3+Vd4+Vd5<160.0. Moreover, the following condition can be satisfied: 55.0<Vd1+Vd2+Vd3+Vd4+Vd5<150.0. Furthermore, the following condition can be satisfied: 55.0<Vd1+Vd2+Vd3+Vd4+Vd5<140.0. Furthermore, the following condition can be satisfied: 60.0<Vd1+Vd2+Vd3+Vd4+Vd5<130.0. Furthermore, the following condition can be satisfied: 60.0<Vd1+Vd2+Vd3+Vd4+Vd5<120.0. Furthermore, the following condition can be satisfied: 65.0<Vd1+Vd2+Vd3+Vd4+Vd5<110.0.

When a focal length of the imaging optical lens assembly is f, and a focal length of the third lens element is f3, the following condition is satisfied: 0<f3/f<4.5. Therefore, it is favorable for avoiding excessive aberrations, such as spherical aberration during reducing the total track length by adjusting the refractive power of the third lens element. Further, the following condition can be satisfied: 0.20<f3/f<3.5. Moreover, the following condition can be satisfied: 0.40<f3/f<2.5. Furthermore, the following condition can be satisfied: 0.60<f3/f<1.5.

When an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following condition is satisfied: 3.80<(T23+T34)/(T12+T45). Therefore, it is favorable for forming wide field of view, large aperture and compact arrangement by adjusting the arrangement of the lens elements. Further, the following condition can be satisfied: 4.30<(T23+T34)/(T12+T45). Moreover, the following condition can be satisfied: 4.80<(T23+T34)/(T12+T45). Furthermore, the following condition can be satisfied: 4.80<(T23+T34)/(T12+T45)<200. Furthermore, the following condition can be satisfied: 5.20<(T23+T34)/(T12+T45)<100. Furthermore, the following condition can be satisfied: 5.20<(T23+T34)/(T12+T45)<60.0.

When a central thickness of the third lens element is CT3, a central thickness of the fourth lens element is CT4, and the axial distance between the third lens element and the fourth lens element is T34, the following condition is satisfied: 0<(CT3+CT4)/T34<5.0. Therefore, it is favorable for compressing the volume by cooperating the third lens element and the fourth lens element. Further, the following condition can be satisfied: 0.40<(CT3+CT4)/T34<4.0. Moreover, the following condition can be satisfied: 0.70<(CT3+CT4)/T34<3.0.

When the axial distance between the second lens element and the third lens element is T23, and the axial distance between the third lens element and the fourth lens element is T34, the following condition is satisfied: T23/T34<3.50. Therefore, it is favorable for enlarging the field of view, aperture and image surface by adjusting the distance between each two lens elements. Further, the following condition can be satisfied: T23/T34<2.50. Moreover, the following condition can be satisfied: T23/T34<1.80. Furthermore, the following condition can be satisfied: T23/T34<1.35. Furthermore, the following condition can be satisfied: T23/T34<1.10. Moreover, the following condition can be satisfied: 0.10<T23/T34. Therefore, it is favorable for reducing the stray light by adjusting the distance between each two lens elements. Further, the following condition can be satisfied: 0.20<T23/T34. Moreover, the following condition can be satisfied: 0.30<T23/T34. Furthermore, the following condition can be satisfied: 0.10<T23/T34<2.50 or 0.20<T23/T34<1.10.

When the central thickness of the third lens element is CT3, the axial distance between the second lens element and the third lens element is T23, and the axial distance between the third lens element and the fourth lens element is T34, the following condition is satisfied: 0<CT3/(T23+T34)<3.2. Therefore, it is favorable for balancing the volume distribution of the object side and the image side by adjusting the arrangement of the lens elements. Further, the following condition can be satisfied: 0.10<CT3/(T23+T34)<1.8. Moreover, the following condition can be satisfied: 0.20<CT3/(T23+T34)<1.2.

When the focal length of the imaging optical lens assembly is f, and a curvature radius of the image-side surface of the second lens element is R4, the following condition is satisfied: 0<R4/f<50. Therefore, it is favorable for correcting aberrations, such as distortion by adjusting the surface shape and the refractive power of the second lens element. Further, the following condition can be satisfied: 0<R4/f<30. Moreover, the following condition can be satisfied: 0<R4/f<15. Furthermore, the following condition can be satisfied: 0.10<R4/f<7.0. Furthermore, the following condition can be satisfied: 0.10<R4/f<4.0, Furthermore, the following condition can be satisfied: 0.20<R4/f<2.0. Furthermore, the following condition can be satisfied: 0.20<R4/f<1.0. Furthermore, the following condition can be satisfied: 0.30<R4/f<0.80. Furthermore, the following condition can be satisfied: 0.30<R4/f<0.60.

When the measurement is made in accordance with the reference wavelength as a d-line, each of at least four of the five lens elements with refractive index is larger than 1.635. Therefore, it is favorable for further compressing the volume and correcting aberrations. Further, when the measurement is made in accordance with the reference wavelength as a d-line, each of at least five of the five lens elements with refractive index can be larger than 1.635. Moreover, when the measurement is made in accordance with the reference wavelength as a d-line, each of at least five of the five lens elements with refractive index can be larger than 1.650.

When the focal length of the third lens element is f3, and a focal length of the fourth lens element is f4, the following condition is satisfied: −0.80<f3/f4<1.2. Therefore, it is favorable for compressing the total track length by cooperating the refractive power of the third lens element and the fourth lens element. Further, the following condition can be satisfied: −0.60<f3/f4<0.80. Moreover, the following condition can be satisfied: −0.40<f3/f4<0.65.

When the focal length of the imaging optical lens assembly is l, and a composite focal length of the first lens element and the second lens element is f12, the following condition is satisfied: −0.30<f/f12<0.55. Therefore, it is favorable for forming the arrangement of the large aperture and wide field of view by adjusting the refractive power of the first lens element and the second lens element. Further, the following condition can be satisfied: −0.20<f/f12<0.38.

When the focal length of the imaging optical lens assembly is f, and a composite focal length of the fourth lens element and the fifth lens element is f45, the following condition is satisfied: −0.28<f/f45<0.15. Therefore, it is favorable for adjusting the back focal length and correcting aberrations by adjusting the refractive power of the fourth lens element and the fifth lens element.

When an f-number of the image capturing optical lens assembly is Fno, the following condition is satisfied: 0.50<Fno<1.60. Therefore, it is favorable for obtaining the balance among the field of view, the illumination and the depth of field. Further, the following condition can be satisfied: 0.80<Fno<1.45.

When a half of a maximum field of view of the image capturing optical lens assembly is HFOV, the following condition is satisfied: 30.0 degrees<HFOV<50.0 degrees. Therefore, it is favorable for obtaining wide field of view characteristic of the imaging optical lens assembly and avoiding aberrations, such as distortion which is generated by excessive field of view.

When a curvature radius of the image-side surface of the fourth lens element is R8, and the focal length of the imaging optical lens assembly is f, and the following condition is satisfied: −0.75<R8/f<0. Therefore, it is favorable for correcting aberrations by adjusting the surface shape and the refractive power of the fourth lens element. Further, the following condition can be satisfied: −0.60<R8/f<−0.20.

When a sum of central thicknesses of all lens elements of the imaging optical lens assembly is ΣCT, and the central thickness of the third lens element is CT3, the following condition is satisfied: 2.0<ΣCT/CT3<5.0. Therefore, it is favorable for compressing the volume by adjusting the arrangement of the lens elements. Further, the following condition can be satisfied: 2.4<ΣCT/CT3<4.2.

When the measurement is made in accordance with the reference wavelength as a d-line, each of at least four of the five lens elements with an Abbe number can be smaller than 26.0. Therefore, it is favorable for reducing aberrations, such as chromatic aberration by cooperating the material of the lens elements, and it is also favorable for other aberrations except for chromatic aberration in infrared band which has lower demand of chromatic aberration correction. When the measurement is made in accordance with the reference wavelength as a d-line, each of at least five of the five lens elements with an Abbe number can be smaller than 24.0.

When the focal length of the third lens element is f3, and a focal length of the fifth lens element is f5, the following condition is satisfied: −1.3<f3/f5<0.80. Therefore, it is favorable for correcting aberrations and adjusting the volume distribution on the image side of the imaging optical lens assembly by adjusting the arrangement of the refractive power. Further, the following condition can be satisfied: −1.0<f3/f5<0.55. Moreover, the following condition can be satisfied: −0.80<f3/f5<0.30.

When a focal length of the first lens element is f1, a focal length of the second lens element is f2, the focal length of the third lens element is f3, the focal length of the fourth lens element is f4, and the focal length of the fifth lens element is f5, the following condition is satisfied: 1.70<1/|f3/f1+f3/f2+f3/f4+f3/f5|. Therefore, it is favorable for compressing the volume and correcting aberrations by adjusting the distribution of refractive power. Further, the following condition can be satisfied: 2.50<1/|f3/f1+f3/f2+f3/f4+f3/f5|. Moreover, the following condition can be satisfied: 3.30<1/|f3/f1+f3/f2+f3/f4+f3/f5|. Furthermore, the following condition can be satisfied: 3.75<1/|f3/f1+f3/f2+f3/f4+f3/f5|.

When a curvature radius of the image-side surface of the first lens element is R2, and the focal length of the imaging optical lens assembly is f, the following condition is satisfied: −5.5<R2/f<0. Therefore, it is favorable for forming the arrangement of large aperture and wide field of view by adjusting the surface shape and the refractive power of the first lens element. Further, the following condition can be satisfied: −3.5<R2/f<−0.20.

When the focal length of the imaging optical lens assembly is f, and an axial distance between the object-side surface of the first lens element and an image surface is TL, the following condition is satisfied: 1.10<TL/f<2.10. Therefore, it is favorable for obtaining the balance between the total track length and the field of view of the imaging optical lens assembly. Further, the following condition can be satisfied: 1.30<TL/f<1.90.

When the axial distance between the object-side surface of the first lens element and the image surface is TL, and a maximum image height of the imaging optical lens assembly is ImgH, the following condition is satisfied: 1.0<TL/ImgH<2.5. Therefore, it is favorable for obtaining the balance among the field of view, the total track length and the size of the image surface of the imaging optical lens assembly.

When a curvature radius of the object-side surface of the third lens element is R5, and a curvature radius of the image-side surface of the third lens element is R6, the following condition is satisfied: −2.0<(R5+R6)/(R5−R6)<1.4. Therefore, it is favorable for compressing the volume by adjusting the surface shape of the third lens element. Further, the following condition can be satisfied: −1.4<(R5+R6)/(R5−R6)<0.50. Moreover, the following condition can be satisfied: −0.90<(R5+R6)/(R5−R6)<0.40.

When the focal length of the imaging optical lens assembly is f, and a curvature radius of the object-side surface of the fourth lens element is R7, the following condition is satisfied: −4.4<f/R7<−1.8. Therefore, it is favorable for correcting aberrations and enlarging the image surface by adjusting the surface shape and the refractive power of the fourth lens element. Further, the following condition can be satisfied: −3.9<f/R7<−2.2.

When a sum of all axial distances between adjacent lens elements of the imaging optical lens assembly is ΣAT, and the axial distance between the third lens element and the fourth lens element is T34, the following condition is satisfied: 1.4<ΣAT/T34<2.3. Therefore, it is favorable for enlarging aperture, the field of view and the size of the image surface by adjusting the arrangement of the lens elements.

When the sum of central thicknesses of all lens elements of the imaging optical lens assembly is ΣCT, and the sum of all axial distances between adjacent lens elements of the imaging optical lens assembly is ΣAT, the following condition is satisfied: 1.0<ΣCT/ΣAT<3.0. Therefore, it is favorable for compressing the volume and enlarging the field of view by adjusting the arrangement of the lens elements.

When a central thickness of the first lens element is CT1, and the central thickness of the third lens element is CT3, the following condition is satisfied: 1.70<CT3/CT1<4.25, Therefore, it is favorable for enlarging the aperture and compressing the volume by adjusting the arrangement of the lens elements on the object side of the imaging optical lens assembly. Further, the following condition can be satisfied: 2.00<CT3/CT1<3.70.

When a central thickness of the second lens element is CT2, the central thickness of the third lens element is CT3, the central thickness of the fourth lens element is CT4, the axial distance between the second lens element and the third lens element is T23, and the axial distance between the third lens element and the fourth lens element is T34, the following condition satisfied: 0.10<(CT2+CT3+CT4)/(T23+T34)<4.2. Therefore, it is favorable for obtaining the balance among the volume, field of view and size of the image surface by adjusting the arrangement of the lens elements which can adjust the processing path of light. Further, the following condition can be satisfied: 0.30<(CT2+CT3+CT4)/(T23+T34)<3.0, Moreover, the following condition can be satisfied: 0.50<(CT2+CT3+CT4)/(T23+T34)<2.3, Furthermore, the following condition can be satisfied: 0.70<(CT2+CT3+CT4)/(T23+T34)<1.9.

When the axial distance between the first lens element and the second lens element is T12, and the axial distance between the third lens element and the fourth lens element is T34, the following condition is satisfied: 6.00<T34/T12<100. Therefore, it is favorable for enhancing the image quality of the image surface in the peripheral region thereof by adjusting the arrangement of the lens elements. Further, the following condition can be satisfied: 9.00<T34/T12<70.0.

The imaging optical lens assembly can be applied to an infrared band within a wavelength ranged from 780 nm to 1500 nm, Therefore, it is favorable for applying to applications, such as biometrics, distance sensing, dynamic capturing or focusing assistance.

At least one of the object-side surface and the image-side surface of each of at least three of the five lens elements includes at least one inflection point. Therefore, it is favorable for correcting aberrations and compressing the volume by increasing the variation of the lens surface. Further, at least one of the object-side surface and the image-side surface of each of at least four or at least five of the five lens elements can include at least one inflection point. Moreover, both of the object-side surface and the image-side surface of each of the five lens elements can include at least one inflection point, Therefore, it is favorable for further correcting aberrations and compressing the volume by increasing the variation of the lens surface.

When an axial distance between the object-side surface of the first lens element and the image-side surface of the fifth lens element is TD, and an axial distance between the image-side surface of the fifth lens element and the image surface is BL, the following condition is satisfied: 3.0<TD/BL. Therefore, it is favorable for enhancing the response efficiency of the image sensor by adjusting the volume arrangement corresponding to the image sensor.

When the axial distance between the object-side surface of the first lens element and the image-side surface of the fifth lens element is TD, and an entrance pupil diameter of the imaging optical lens assembly is EPD, the following condition is satisfied: 1.0<TD/EPD<2.2. Therefore, it is favorable for obtaining the balance between the volume of the imaging optical lens assembly and the size of the aperture. Further, the following condition can be satisfied: 1.2<TD/EPD<2.0.

Each of the aforementioned features of the imaging optical lens assembly can be utilized in various combinations for achieving the corresponding effects.

According to the imaging optical lens assembly, the imaging apparatus and the electronic device of the present disclosure, each parameter value (such as refractive index, focal length, etc.) can be calculated under reference wavelength of the system while each parameter value is not be defined specifically; when the reference wavelength is visible light (such as the main band is 350 nm-750 nm), each parameter value can be calculated in accordance with d-line 587.6 nm; when the reference wavelength is infrared light (such as the main band is 750 nm-1600 nm), each parameter value can be calculated in accordance with 940 nm.

According to the imaging optical lens assembly of the present disclosure, the lens elements thereof can be made of glass or plastic materials. When the lens elements are made of glass materials, the distribution of the refractive power of the imaging optical lens assembly may be more flexible to design. The glass lens element can either be made by grinding or molding. When the lens elements are made of plastic materials, manufacturing costs can be effectively reduced. Furthermore, surfaces of each lens element can be arranged to be aspheric (ASP), since the aspheric surface of the lens element is easy to form a shape other than a spherical surface so as to have more controllable variables for eliminating aberrations thereof, and to further decrease the required amount of lens elements in the imaging optical lens assembly. Therefore, the total track length of the imaging optical lens assembly can also be reduced. The aspheric surfaces may be formed by a plastic injection molding method, a glass molding method or other manufacturing methods.

According to the imaging optical lens assembly of the present disclosure, additives can be selectively added into any one (or more) material of the lens elements so as to change the transmittance of the lens element in a particular wavelength range. Therefore, the stray light and chromatic aberration can be reduced. For example, the additives can have the absorption ability for lights in a wavelength range of 600 nm-800 nm in the imaging optical lens assembly so as to reduce extra red light or infrared lights, or the additives can have the absorption ability for lights in a wavelength range of 350 nm-450 nm in the imaging optical lens assembly so as to reduce blue light or ultraviolet lights. Therefore, additives can prevent the image from interfering by lights in a particular wavelength range. Furthermore, the additives can be homogeneously mixed with the plastic material, and the lens elements can be made by the injection molding method.

According to the imaging optical lens assembly of the present disclosure, when a surface of the lens element is aspheric, it indicates that entire optical effective region of the surface of the lens element or a part thereof is aspheric.

According to the imaging optical lens assembly of the present disclosure, when the lens elements have surfaces being convex and the convex surface position is not defined, it indicates that the aforementioned surfaces of the lens elements can be convex in the paraxial region thereof. When the lens elements have surfaces being concave and the concave surface position is not been defined, it indicates that the aforementioned surfaces of the lens elements can be concave in the paraxial region thereof. In the imaging optical lens assembly of the present disclosure, if the lens element has positive refractive power or negative refractive power, or the focal length of the lens element, all can be referred to the refractive power, or the focal length, in the paraxial region of the lens element.

According to the imaging optical lens assembly of the present disclosure, a critical point is a non-axial point of the lens surface where its tangent is perpendicular to the optical axis.

According to the imaging optical lens assembly of the present disclosure, an inflection point is a point on a lens surface with a curvature changing from positive to negative or from negative to positive.

According to the imaging optical lens assembly of the present disclosure, the image surface thereof, based on the corresponding image sensor, can be flat or curved. In particular, the image surface can be a concave curved surface facing towards the object side. Furthermore, the imaging optical lens assembly of the present disclosure can selectively include at least one image correcting element (such as a field flattener) inserted between the lens element closest to the image surface and the image surface, thus the effect of correcting image aberrations (such as field curvature) can be achieved. The optical properties of the aforementioned image correcting element, such as curvature, thickness, refractive index, position, surface shape (convex or concave, spherical or aspheric, diffraction surface and Fresnel surface, etc.) can be adjusted corresponding to the demands of the imaging apparatus. Generally, a preferred configuration of the image correcting element is to dispose a thin plano-concave element having a concave surface toward the object side on the position closed to the image surface.

Figure 31A:
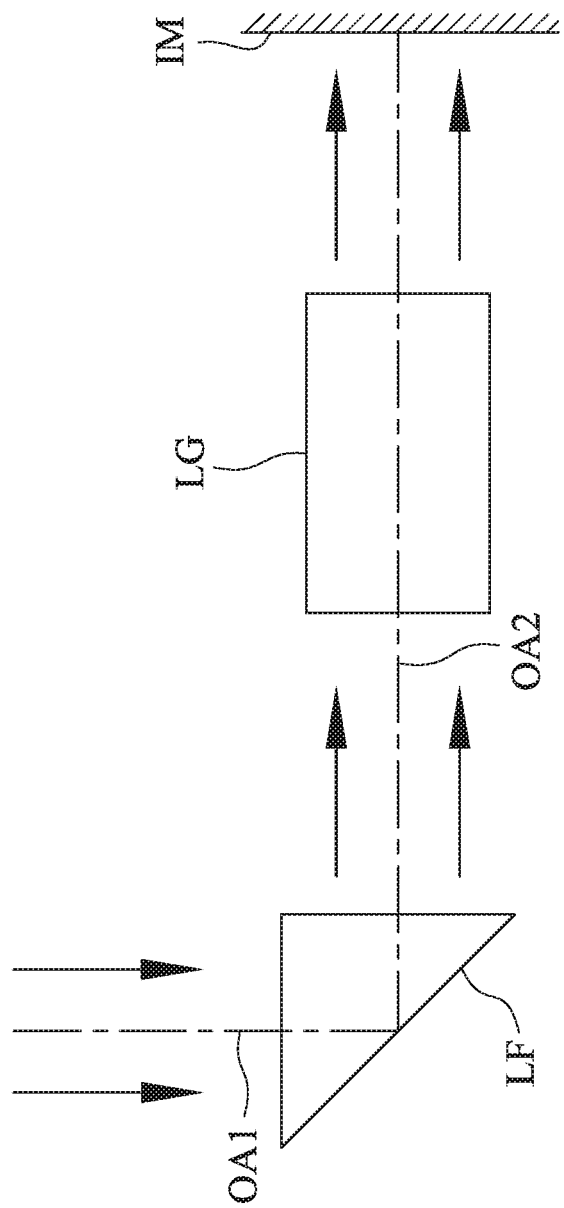
FIG. 31A is a schematic view of an arrangement of a light path folding element in the imaging optical lens assembly of the present disclosure.
Figure 31B:
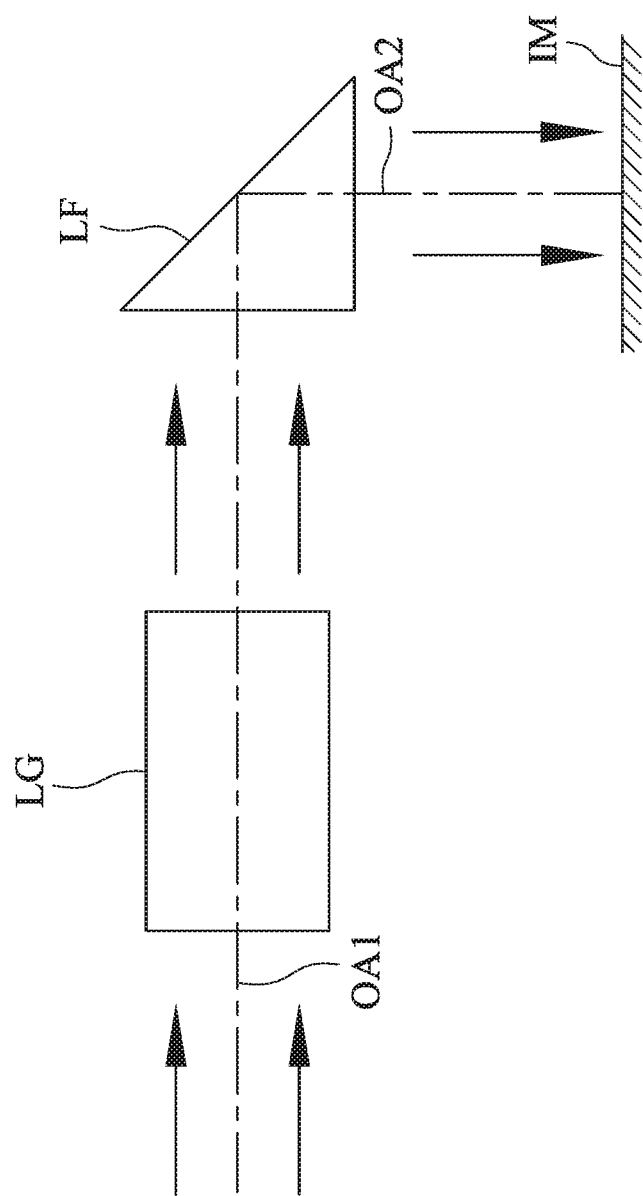
FIG. 31B is a schematic view of another arrangement of the light path folding element in the imaging optical lens assembly of the present disclosure.
Figure 31C:
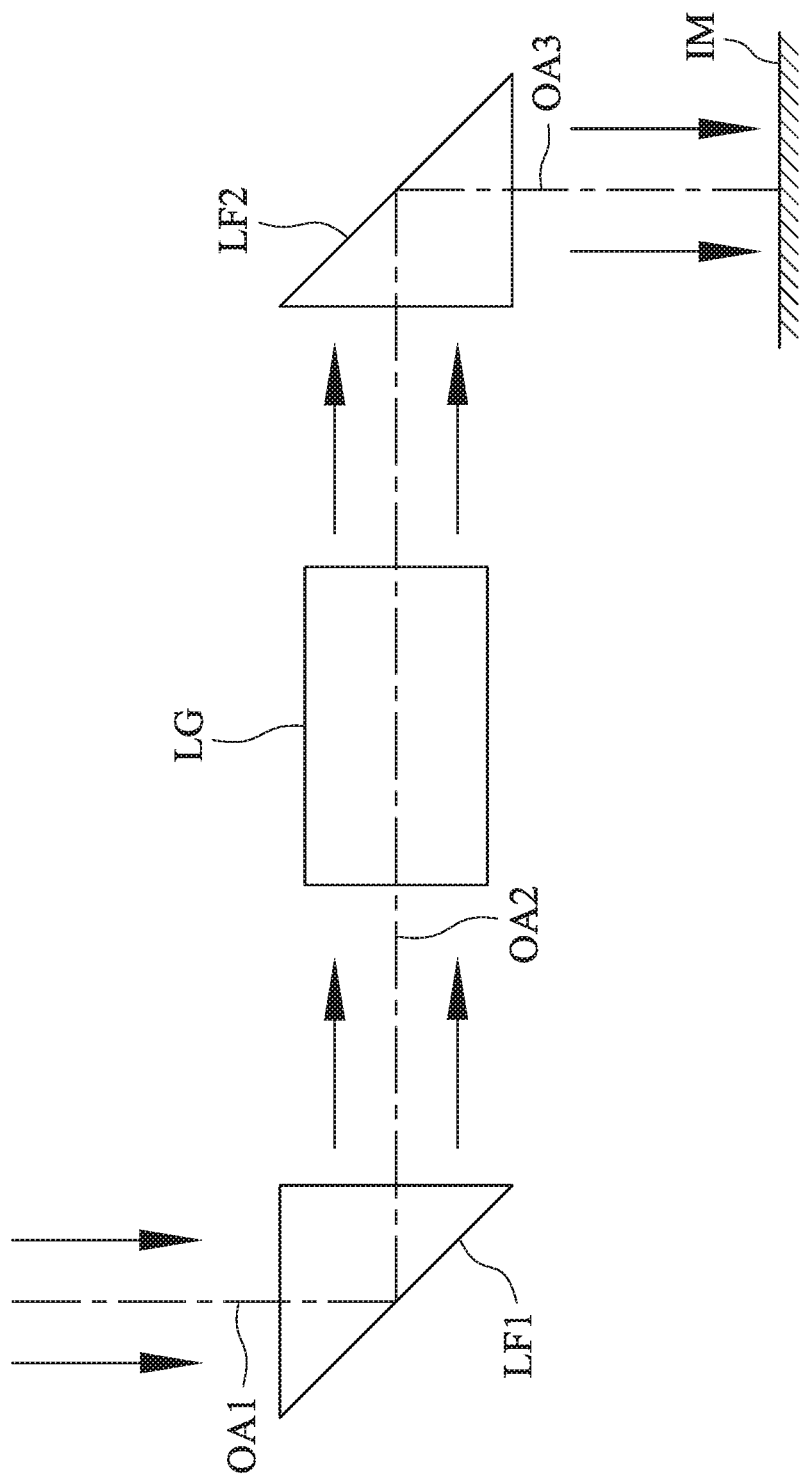
FIG. 31C is a schematic view of an arrangement of two light path folding elements in the imaging optical lens assembly of the present disclosure.

According to the imaging optical lens assembly of the present disclosure, at least one element with light path folding function can be selectively disposed between the imaged object and the image surface, such as a prism or a mirror, etc., Therefore it is favorable for providing high flexible space arrangement of the imaging optical lens assembly, so that the compactness of the electronic device would not be restricted by the optical total track length of the imaging optical lens assembly. FIG. 31A is a schematic view of an arrangement of a light path folding element LF in the imaging optical lens assembly of the present disclosure, FIG. 31B Is a schematic view of another arrangement of the light path folding element LF in the imaging optical lens assembly of the present disclosure. As shown in FIGS. 31A and 31B, the imaging optical lens assembly includes, in order from an imaged object (not shown in drawings) to an image surface IM, a first optical axis OA1, the light path folding element LF and a second optical axis OA2, wherein the light path folding element LF can be disposed between the imaged object and a lens group LG of the imaging optical lens assembly as shown in FIG. 31A, or can be disposed between the lens group LO of the imaging optical lens assembly and the image surface IM as shown in FIG. 31B. Moreover, FIG. 31C is a schematic view of an arrangement of two light path folding elements LF1, LF2 in the imaging optical lens assembly of the present disclosure. As shown in FIG. 31C, the imaging optical lens assembly includes, in order from an imaged object (not shown in drawings) to an image surface 1M, a first optical axis OA1, the light path folding element LF1, a second optical axis OA2, the light path folding element LF2 and a third optical axis OA3, wherein the light path folding element LF1 is disposed between the Imaged object and a lens group LG of the imaging optical lens assembly, and the light path folding element LF2 is disposed between the lens group LG of the imaging optical lens assembly and the image surface IM. The imaging optical lens assembly can also be selectively disposed with three or more light path folding element, the type, amount and location of the light path folding element will not be limited to the present disclosure.

Furthermore, according to the imaging optical lens assembly of the present disclosure, the imaging optical lens assembly can include at least one stop, such as an aperture stop, a glare stop or a field stop, for eliminating stray light and thereby improving image resolution thereof.

According to the imaging optical lens assembly of the present disclosure, the aperture stop can be configured as a front stop or a middle stop, wherein the front stop indicates that the aperture stop is disposed between an object and the first lens element, and the middle stop indicates that the aperture stop is disposed between the first lens element and the image surface. When the aperture stop is a front stop, a longer distance between an exit pupil of the imaging optical lens assembly and the image surface can be obtained, and thereby obtains a telecentric effect and improves the image-sensing efficiency of the image sensor, such as CCD or CMOS. The middle stop is favorable for enlarging the field of view of the imaging optical lens assembly and thereby provides a wider field of view for the same.

According to the imaging optical lens assembly of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incoming light or the exposure time of the image can be controlled by the aperture control unit to enhance the image moderation ability. In addition, the aperture control unit can be the aperture stop of the imaging optical lens assembly according to the present disclosure, so as to moderate the image quality by changing f-number such as changing the depth of field or the exposure speed.

According to the imaging optical lens assembly of the present disclosure, the imaging optical lens assembly of the present disclosure can be applied to 3D (three-dimensional) image capturing applications, in products such as digital cameras, mobile devices, digital tablets, smart TVs, surveillance systems, motion sensing input devices, driving recording systems, rearview camera systems, wearable devices, unmanned aerial vehicles, and other electronic imaging products.

According to the present disclosure, an imaging apparatus including the aforementioned imaging optical lens assembly and an image sensor is provided, wherein the image sensor is disposed on the image surface of the imaging optical lens assembly. Therefore, by adjusting the arrangement of the material of the lens elements and properly arranging the relationship of the focal lengths, aberrations, such as chromatic aberration can be reduced, and excessive aberrations, such as spherical aberration, can be avoided while compressing the total track length. Moreover, the imaging apparatus can further include a barrel member, a holder member or a combination thereof.

According to the present disclosure, an electronic device including the aforementioned imaging apparatus is provided. Therefore, the image quality can be increased. Moreover, the electronic device can further include a control unit, a display, a storage unit, a random-access memory unit (RAM) or a combination thereof.

According to the above description of the present disclosure, the following specific 1st-17th embodiments are provided for further explanation.

1st Embodiment

Figure 2:
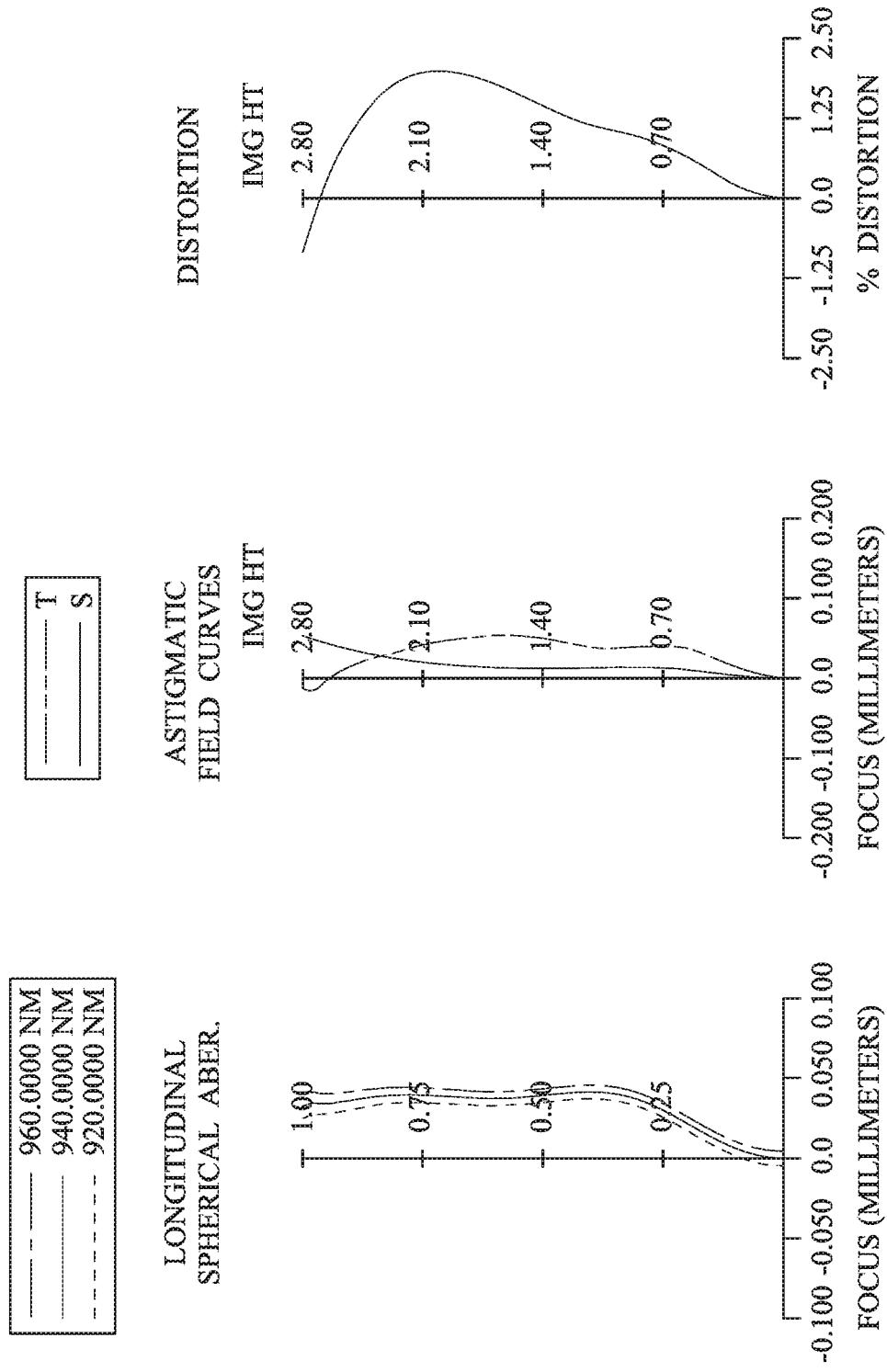
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes an imaging optical lens assembly (its reference numeral is omitted) and an image sensor 180. The imaging optical lens assembly includes, in order from an object side to an image side along an optical path, a first lens element 110, an aperture stop 100, a second lens element 120, a third lens element 130, a fourth lens element 140, a stop 101, a fifth lens element 150, a filter 160 and an image surface 170, wherein the image sensor 180 is disposed on the image surface 170 of the imaging optical lens assembly. The imaging optical lens assembly includes five lens elements (110, 120, 130, 140, 150) without additional one or more lens elements inserted between the first lens element 110 and the fifth lens element 150.

Figure 25:
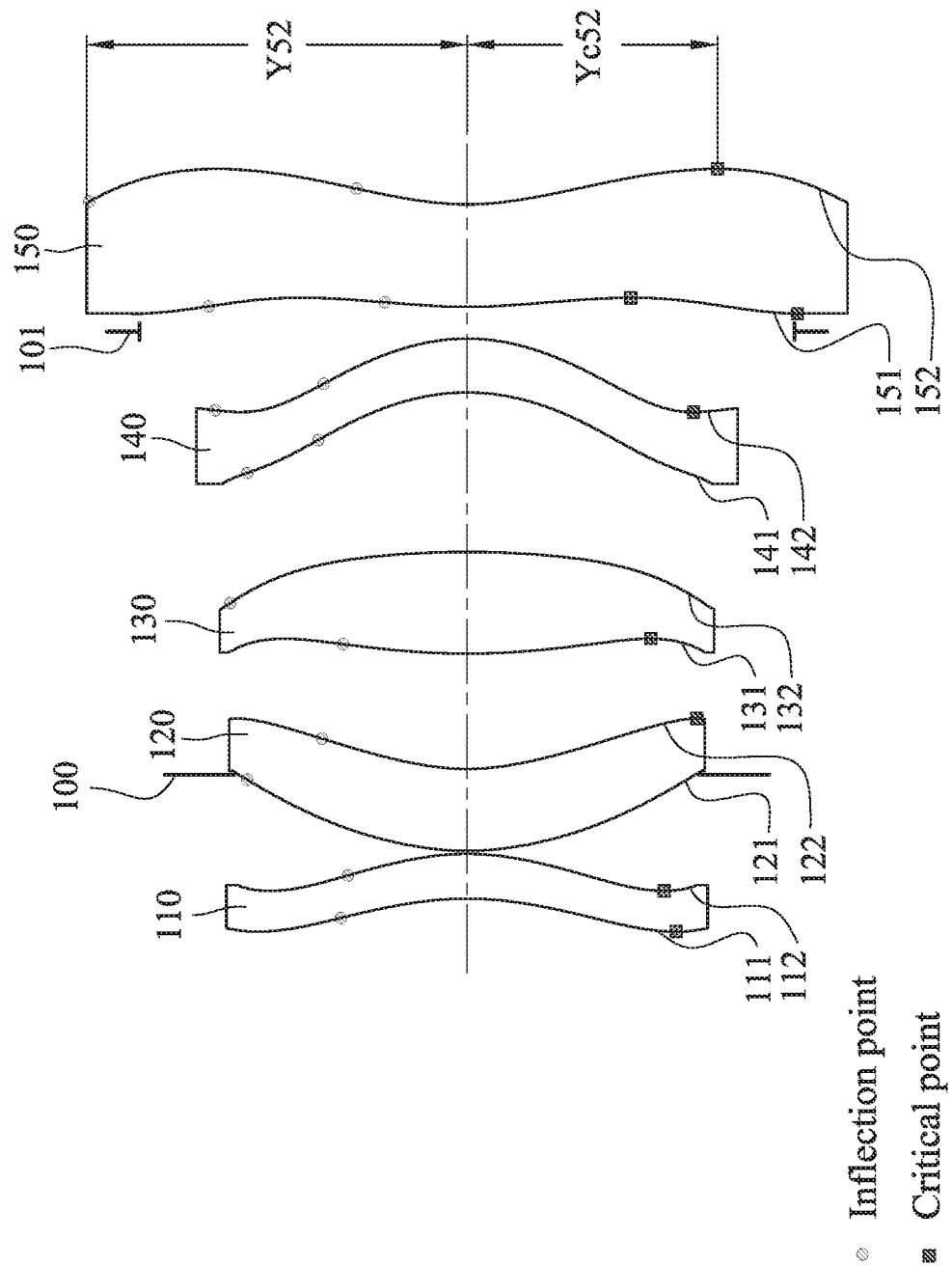
FIG. 25 is a schematic view of partial parameters, inflection points and critical points according to the 1st embodiment of FIG. 1.

The first lens element 110 with positive refractive power has an object-side surface 111 being concave in a paraxial region thereof and an image-side surface 112 being convex in a paraxial region thereof. The first lens element 110 is made of a plastic material, and has the object-side surface 111 and the image-side surface 112 being both aspheric. Furthermore, FIG. 25 is a schematic view of partial parameters, inflection points and critical points according to the 1st embodiment of FIG. 1, wherein the symbol "•" represents the inflection point, the symbol "■" represents the critical point. In FIG. 25, the object-side surface 111 of the first lens element 110 includes one inflection point and one critical point in an off-axis region thereof, and the image-side surface 112 of the first lens element 110 includes one inflection point and one critical point in an off-axis region thereof.

The second lens element 120 with negative refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric. Furthermore, the object-side surface 121 of the second lens element 120 includes one inflection point in an off-axis region thereof, and the image-side surface 122 of the second lens element 120 includes one inflection point and one critical point in an off-axis region thereof.

The third lens element 130 with positive refractive power has an object-side surface 131 being convex in a paraxial region thereof and an image-side surface 132 being convex in a paraxial region thereof. The third lens element 130 is made of a plastic material, and has the object-side surface 131 and the image-side surface 132 being both aspheric. Furthermore, the object-side surface 131 of the third lens element 130 includes one inflection point and one critical point in an off-axis region thereof, and the image-side surface 132 of the third lens element 130 includes one inflection point in an off-axis region thereof.

The fourth lens element 140 with positive refractive power has an object-side surface 141 being concave in a paraxial region thereof and an image-side surface 142 being convex in a paraxial region thereof. The fourth lens element 140 is made of a plastic material, and has the object-side surface 141 and the image-side surface 142 being both aspheric. Furthermore, the object-side surface 141 of the fourth lens element 140 includes two inflection points in an off-axis region thereof, and the image-side surface 142 of the fourth lens element 140 includes two inflection points and one critical point in an off-axis region thereof.

The fifth lens element 150 with negative refractive power has an object-side surface 151 being convex in a paraxial region thereof and an image-side surface 152 being concave in a paraxial region thereof. The fifth lens element 150 is made of a plastic material, and has the object-side surface 151 and the image-side surface 152 being both aspheric. Furthermore, the object-side surface 151 of the fifth lens element 150 includes two inflection points and two critical points in an off-axis region thereof, and the image-side surface 152 of the fifth lens element 150 includes two inflection points and one critical point in an off-axis region thereof.

The filter 160 is made of a glass material, which is located between the fifth lens element 150 and the image surface 170 in order, and will not affect the focal length of the imaging optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where,

X is the displacement in parallel with an optical axis from the intersection point of the aspheric surface and the optical axis to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient.

In the Imaging optical lens assembly according to the 1st embodiment, when a focal length of the imaging optical lens assembly is f, an f-number of the imaging optical lens assembly is Fno, and a half of a maximum field of view of the imaging optical lens assembly is HFOV, these parameters have the following values: f=3.82 mm; Fno=1.30; and HFOV=36.0 degrees.

In the imaging optical lens assembly according to the 1st embodiment, when a measurement is made in accordance with a reference wavelength as a d-line (587.6 nm), a refractive index of the first lens element 110 is Nd1, a refractive index of the second lens element 120 is Nd2, a refractive index of the third lens element 130 is Nd3, a refractive index of the fourth lens element 140 is Nd4, a refractive index of the fifth lens element 150 is Nd5, an Abbe number of the first lens element 110 is Vd1, an Abbe number of the second lens element 120 is Vd2, an Abbe number of the third lens element 130 is Vd3, an Abbe number of the fourth lens element 140 is Vd4, and an Abbe number of the fifth lens element 150 is Vd5, the following conditions are satisfied: Nd1=1.686; Nd2=1.686; Nd3=1.686; Nd4=1.686; Nd5=1.686; Vd1=18.4; Vd2=18.4; Vd3=18.4; Vd4=18.4; Vd5=18.4; and Vd1+Vd2+Vd3+Vd4+Vd5=91.9; wherein each of Vd1, Vd2, Vd3, Vd4 and Vd5 is calculated from Vdx=(Ndx−1)/(NFx−NCx), wherein x is 1, 2, 3, 4, 5, respectively, Ndx is a refractive index measured in accordance with a reference wavelength as a d-line of Helium (587.6 nm), NFx is a refractive index measured in accordance with a reference wavelength as a F-line of Hydrogen (486.1 nm), NCx is a refractive index measured in accordance with a reference wavelength as a C-line of Hydrogen (656.3 nm).

In the imaging optical lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, a sum of all axial distances between adjacent lens elements of the imaging optical lens assembly is ΣAT, a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, and a sum of central thicknesses of all lens elements of the image capturing optical lens assembly is ΣCT, the following condition are satisfied: ΣAT/T34=1.94; ΣCT/ΣAT=1.24; ΣCT/CT3=3.78; (CT2+CT3+CT4)/(T23+T34)=0.86; (CT3+CT4)/T34=0.98; CT3/CT1=2.27; CT3/(T23+T34)=0.37; (123+T34)/(T12+T45)=7.89; T23/T34=0.72; and T34/T12=53.60; according to the 1st embodiment, the axial distance between adjacent lens elements is the distance along the optical axis between two adjacent lens surfaces of the two adjacent lens elements; ΣCT=CT1+CT2+CT3+CT4+CT5; ΣAT=T12+T23+T34+T45.

In the imaging optical lens assembly according to the 1st embodiment, when an axial distance between the object-side surface 111 of the first lens element 110 and the image-side surface 152 of the fifth lens element 150 is TD, an axial distance between the image-side surface 152 of the fifth lens element 150 and the image surface 170 is BL, and an entrance pupil diameter of the imaging optical lens assembly is EPD, the following conditions are satisfied: TD/BL=4.35; and TD/EPD=1.57.

In the imaging optical lens assembly according to the 1st embodiment, when the focal length of the imaging optical lens assembly is 1, an axial distance between the object-side surface 111 of the first lens element 110 and the image surface 170 is TL, and a maximum image height of the imaging optical lens assembly is ImgH, the following conditions are satisfied: TL/f=1.50; and TL/ImgH=2.05.

In the imaging optical lens assembly according to the 1st embodiment, when the focal length of the imaging optical lens assembly is f, a curvature radius of the image-side surface 112 of the first lens element 110 is R2, a curvature radius of the image-side surface 122 of the second lens element 120 is R4, a curvature radius of the object-side surface 131 of the third lens element 130 is R5, a curvature radius of the image-side surface 132 of the third lens element 130 is R6, and a curvature radius of the image-side surface 142 of the fourth lens element 140 is R8, the following conditions are satisfied: R2/f=−0.45; R4/f=0.42; (R5+R6)/(R5−R6)=−0.16; and R8/f=−0.35.

In the imaging optical lens assembly according to the 1st embodiment, when the focal length of the imaging optical lens assembly is f, a focal length of the first lens element 110 is 11, a focal length of the second lens element 120 is f2, a focal length of the third lens element 130 is 13, a focal length of the fourth lens element 140 is f4, a focal length of the fifth lens element 150 is f5, a composite focal length of the first lens element 110 and the second lens element 120 is 112, a composite focal length of the fourth lens element 140 and the fifth lens element 150 is f45, and a curvature radius of the object-side surface 141 of the fourth lens element 140 is R7, the following conditions are satisfied: 1/|f3/f1+f3/f2+f3/f4+f3/f5|=192.24; f/|f12=0.31; f/f45=−0.26; f/R7=−2.63; f3/f=1.13; f3/f4=0.35; and f3/f5=−0.64.

In the imaging optical lens assembly according to the 1st embodiment, when a distance between a critical point of the image-side surface 152 of the fifth lens element 150 and the optical axis is Yc52 (labelled in FIG. 25), and a maximum distance between an optical effective region of the image-side surface 152 of the fifth lens element 150 and the optical axis is Y52 (labelled in FIG. 25), the following condition is satisfied: Yc52/Y52=0.66.

The detailed optical data of the 1st embodiment are shown in Table 1 and the aspheric surface data are shown in Table 2 below.

TABLE 1

1st Embodiment
f = 3.82 mm, Fno = 1.30, HFOV = 36.0 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Lens 1 | −2.233 | ASP | 0.301 | Plastic | 1.656 | 18.4 | 9.62 |
| 2 | | −1.737 | ASP | 0.532 | | | | |
| 3 | Ape. Stop | Plano | | −0.512 | | | | |
| 4 | Lens 2 | 1.998 | ASP | 0.550 | Plastic | 1.656 | 18.4 | −28.67 |
| 5 | | 1.609 | ASP | 0.775 | | | | |
| 6 | Lens 3 | 4.752 | ASP | 0.684 | Plastic | 1.656 | 18.4 | 4.32 |
| 7 | | −6.625 | ASP | 1.072 | | | | |
| 8 | Lens 4 | −1.452 | ASP | 0.362 | Plastic | 1.656 | 18.4 | 12.38 |
| 9 | | −1.354 | ASP | 0.047 | | | | |
| 10 | Stop | Plano | | 0.167 | | | | |
| 11 | Lens 6 | 4.026 | ASP | 0.688 | Plastic | 1.656 | 18.4 | −6.72 |
| 12 | | 1.963 | ASP | 0.700 | | | | |
| 13 | Filter | Plano | | 0.145 | Glass | 1.508 | 64.2 | — |
| 14 | | Plano | | 0.228 | | | | |
| 15 | Image | Plano | | — | | | | |

Reference wavelength is 940.0 nm.
Effective radius of Surface 10 (stop 101) is 2.200 mm.

TABLE 2

Aspheric Coefficients

| Surface # | 1 | 2 | 4 | 5 | 6 |
|---|---|---|---|---|---|
| k = | −1.0000E+00 | −1.0000E+00 | −1.1735E+00 | −8.4712E+00 | 0.0000E+00 |
| A4 = | 7.9877E−02 | 1.3146E−01 | −4.0402E−02 | 2.2268E−02 | −1.9547E−02 |
| A6 = | −5.2454E−02 | −1.0523E−01 | 2.6238E−02 | −4.2252E−02 | 7.1904E−03 |
| A8 = | 4.6078E−02 | 1.1069E−01 | −4.7845E−03 | 4.3379E−02 | −1.4913E−02 |
| A10 = | −2.0837E−02 | −7.9833E−02 | −6.1209E−03 | −3.0320E−02 | 9.2518E−03 |
| A12 = | 5.1647E−03 | 4.2526E−02 | 6.6113E−03 | 1.2503E−02 | −4.9746E−03 |
| A14 = | −6.5856E−04 | −1.5868E−02 | −3.2431E−03 | −2.7929E−03 | 1.8599E−03 |
| A16 = | 3.2819E−05 | 3.7749E−03 | 8.4087E−04 | 2.4609E−04 | −4.6972E−04 |
| A18 = | | −4.9270E−04 | −9.4447E−05 | | 6.1345E−05 |
| A20 = | | 2.5596E−05 | | | |

| Surface # | 7 | 8 | 9 | 11 | 12 |
|---|---|---|---|---|---|
| k = | −2.2780E+00 | −2.3602E+00 | −1.0000E+00 | −1.0000E+00 | −1.0000E+00 |
| A4 = | −8.7145E−03 | −3.7574E−02 | 4.2286E−02 | −1.0002E−01 | −1.4864E−01 |
| A6 = | −1.1412E−02 | 4.4488E−02 | 2.3715E−02 | 6.2876E−02 | 8.3423E−02 |
| A8 = | 1.2008E−02 | −1.2331E−01 | −8.5067E−02 | −4.7844E−02 | −4.1482E−02 |
| A10 = | −1.2988E−02 | 2.1009E−01 | 1.2383E−01 | 2.8928E−02 | 1.5043E−02 |
| A12 = | 7.1883E−03 | −1.7696E−01 | −8.5835E−02 | −1.1929E−02 | −3.7595E−03 |
| A14 = | −2.0405E−03 | 8.6560E−02 | 3.4504E−02 | 3.2042E−03 | 6.1950E−04 |
| A16 = | 2.4251E−04 | −2.5612E−02 | −8.4042E−03 | −5.3057E−04 | −6.3530E−05 |
| A18 = | | 4.2993E−03 | 1.1513E−03 | 4.8848E−05 | 3.6350E−06 |
| A20 = | | −3.1782E−04 | −6.7713E−05 | −1.9066E−06 | −8.7483E−08 |

In Table 1, the curvature radius, the thickness and the focal length are shown in millimeters (mm). Surface numbers 0-15 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
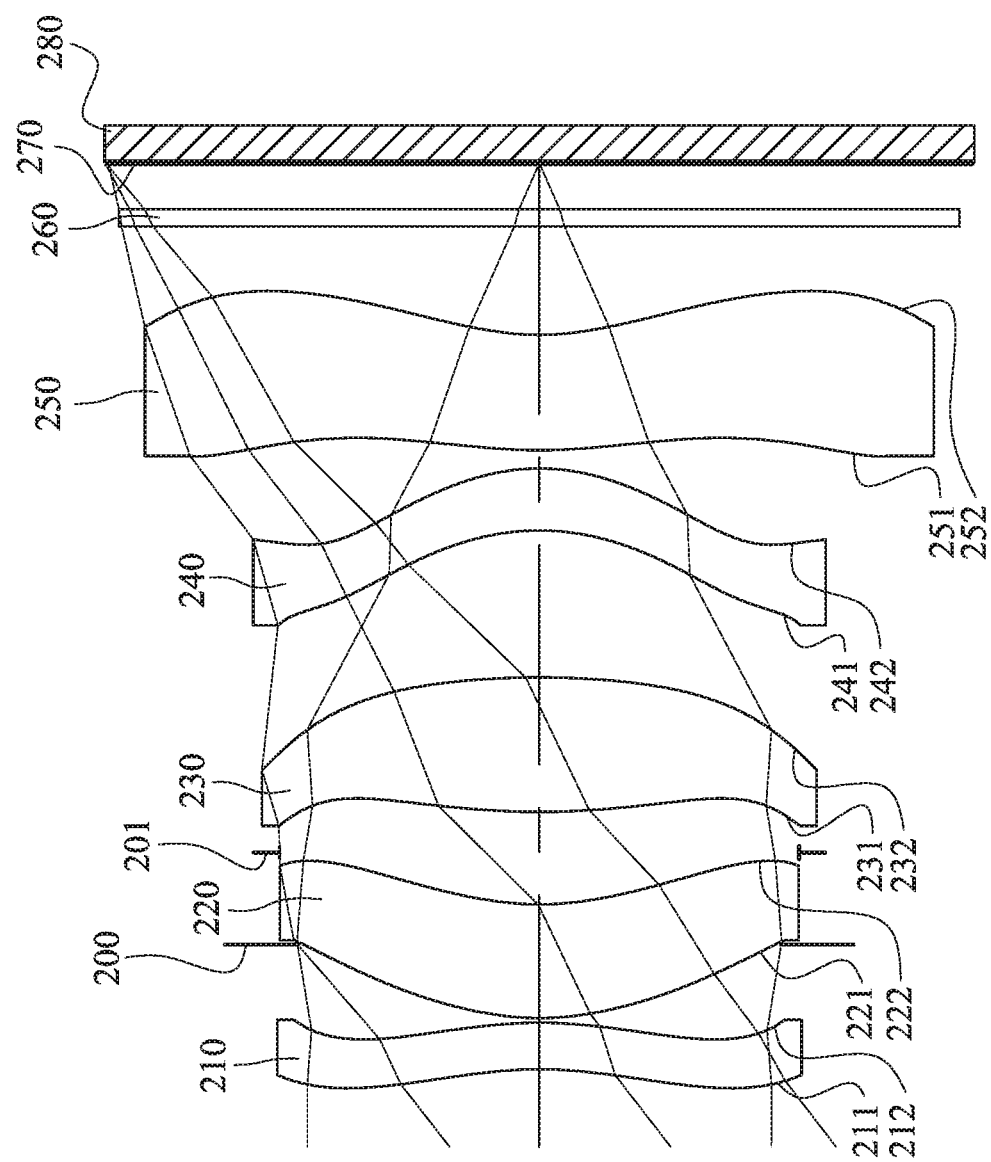
FIG. 3 is a schematic view of an imaging apparatus according to the 2nd embodiment of the present disclosure.
Figure 4:
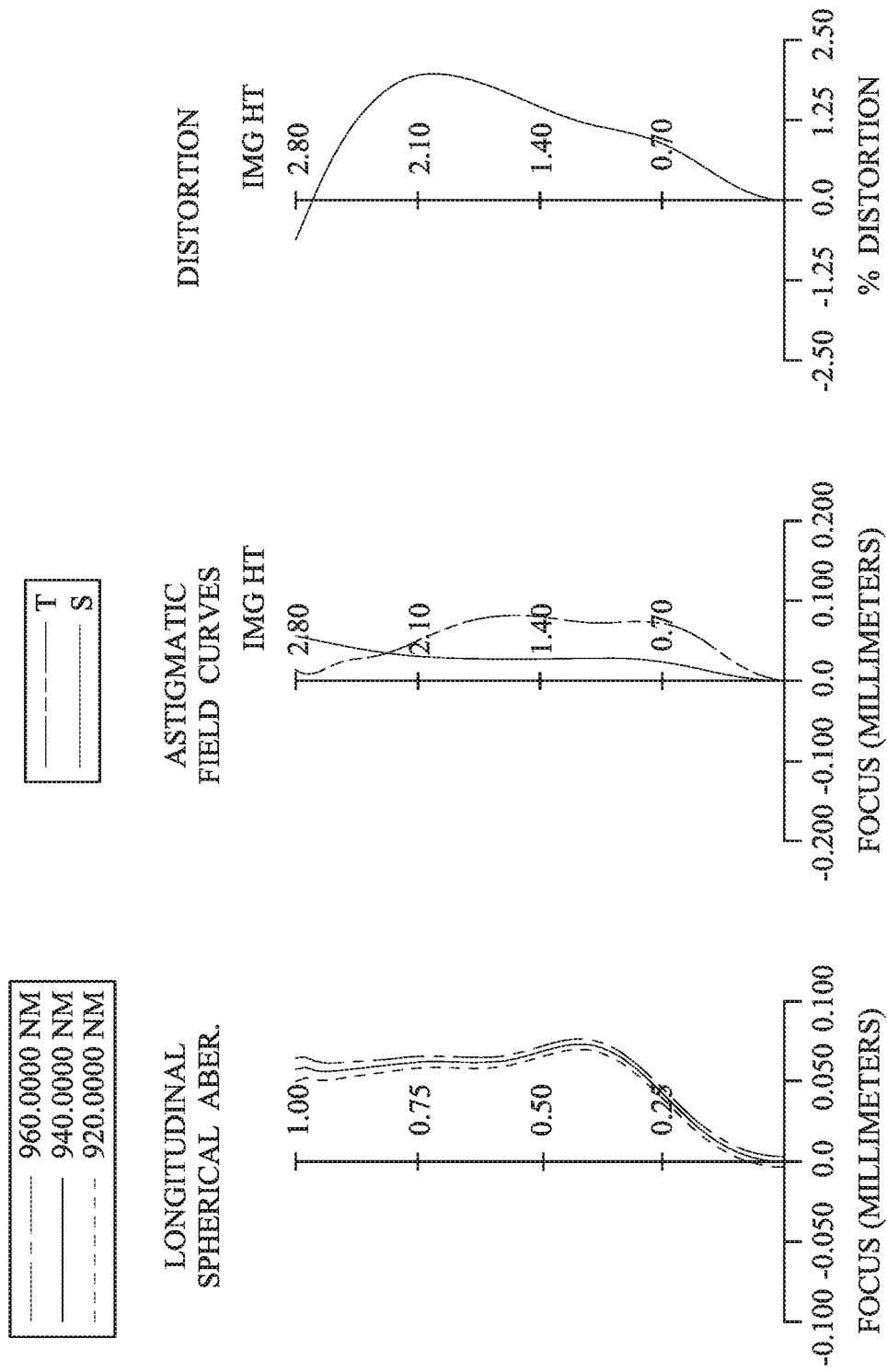
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the Imaging apparatus according to the 2nd embodiment. In FIG. 3, the imaging apparatus includes an imaging optical lens assembly (its reference numeral is omitted) and an image sensor 280. The imaging optical lens assembly includes, in order from an object side to an image side along an optical path, a first lens element 210, an aperture stop 200, a second lens element 220, a stop 201, a third lens element 230, a fourth lens element 240, a fifth lens element 250, a filter 260 and an image surface 270, wherein the image sensor 280 is disposed on the image surface 270 of the imaging optical lens assembly. The imaging optical lens assembly. includes five lens elements (210, 220, 230, 240, 250) without additional one or more lens elements inserted between the first lens element 210 and the fifth lens element 260.

The first lens element 210 with negative refractive power has an object-side surface 211 being concave in a paraxial region thereof and an image-side surface 212 being convex in a paraxial region thereof. The first lens element 210 is made of a plastic material, and has the object-side surface 211 and the image-side surface 212 being both aspheric. Furthermore, the object-side surface 211 of the first lens element 210 includes one inflection point and one critical point in an off-axis region thereof, and the image-side surface 212 of the first lens element 210 includes one inflection point and one critical point in an off-axis region thereof.

The second lens element 220 with positive refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric. Furthermore, the object-side surface 221 of the second lens element 220 includes one inflection point in an off-axis region thereof, and the image-side surface 222 of the second lens element 220 includes one inflection point and one critical point in an off-axis region thereof.

The third lens element 230 with positive refractive power has an object-side surface 231 being convex in a paraxial region thereof and an image-side surface 232 being convex in a paraxial region thereof. The third lens element 230 is made of a glass material, and has the object-side surface 231 and the image-side surface 232 being both aspheric. Furthermore, the object-side surface 231 of the third lens element 230 includes two inflection points and one critical point in an off-axis region thereof, and the image-side surface 232 of the third lens element 230 includes one inflection point in an off-axis region thereof.

The fourth lens element 240 with positive refractive power has an object-side surface 241 being concave in a paraxial region thereof and an image-side surface 242 being convex in a paraxial region thereof. The fourth lens element 240 is made of a plastic material, and has the object-side surface 241 and the image-side surface 242 being both aspheric. Furthermore, the object-side surface 241 of the fourth lens element 240 includes two inflection points in an off-axis region thereof, and the image-side surface 242 of the fourth lens element 240 includes three inflection points and one critical point in an off-axis region thereof.

The fifth lens element 250 with negative refractive power has an object-side surface 251 being convex in a paraxial region thereof and an image-side surface 252 being concave in a paraxial region thereof. The fifth lens element 250 is made of a plastic material, and has the object-side surface 251 and the image-side surface 252 being both aspheric. Furthermore, the object-side surface 251 of the fifth lens element 250 includes two inflection points and two critical points in an off-axis region thereof, and the image-side surface 252 of the fifth lens element 250 includes two inflection points and one critical point in an off-axis region thereof.

The filter 260 is made of a glass material, which is located between the fifth lens element 250 and the image surface 270 in order, and will not affect the focal length of the imaging optical lens assembly.

The detailed optical data of the 2nd embodiment are shown in Table 3 and the aspheric surface data are shown in Table 4 below,

TABLE 3

2nd Embodiment
f = 3.57 mm, Fno = 1.20, HFOV = 37.7 deg.

| Surface # | | Curvature Radius | | Thickness | Material | Index | Abbe # | Focal Length |
|---|---|---|---|---|---|---|---|---|
| 0 | Object | Plano | | 450.000 | | | | |
| 1 | Lens 1 | −2.588 | ASP | 0.300 | Plastic | 1.650 | 18.4 | −59.48 |
| 2 | | −2.900 | ASP | 0.504 | | | | |
| 3 | Ape. Stop | Plano | | −0.474 | | | | |
| 4 | Lens 2 | 1.845 | ASP | 0.734 | Plastic | 1.650 | 18.4 | 13.26 |
| 5 | | 1.980 | ASP | 0.334 | | | | |
| 6 | Stop | Plano | | 0.263 | | | | |
| 7 | Lens 3 | 4.928 | ASP | 0.868 | Glass | 1.700 | 29.2 | 3.89 |
| 8 | | −5.638 | ASP | 0.948 | | | | |
| 9 | Lens 4 | −1.569 | ASP | 0.400 | Plastic | 1.650 | 18.4 | 9.32 |
| 10 | | −1.371 | ASP | 0.118 | | | | |
| 11 | Lens 5 | 3.391 | ASP | 0.744 | Plastic | 1.650 | 18.4 | −6.61 |
| 12 | | 1.732 | ASP | 0.700 | | | | |
| 13 | Filter | Plano | | 0.110 | Glass | 1.508 | 64.2 | — |
| 14 | | Plano | | 0.301 | | | | |
| 15 | Image | Plano | | — | | | | |

Reference wavelength is 940.0 nm.
Effective radius of Surface 6 (stop 201) is 1.675 mm.

TABLE 4

Aspheric Coefficients

| Surface # | 1 | 2 | 4 | 5 | 7 |
|---|---|---|---|---|---|
| k = | −1.2471E+00 | −8.2171E−01 | −1.6427E+00 | −8.6623E+00 | 0.0000E+00 |
| A4 = | 1.3691E−01 | 7.9460E−02 | −6.7591E−02 | 3.4244E−02 | −1.9531E−02 |
| A6 = | −9.7702E−02 | 2.4789E−02 | 7.8965E−02 | −5.5644E−02 | 1.6006E−03 |

TABLE 4-continued

| | | | | | |
|---|---|---|---|---|---|
| A8 = | 6.2251E−02 | −1.1887E−01 | −7.6050E−02 | 4.3159E−02 | −7.9990E−03 |
| A10 = | −2.3718E−02 | 1.7354E−01 | 5.2628E−02 | −2.4652E−02 | 1.4719E−03 |
| A12 = | 5.2191E−03 | −1.3841E−01 | −2.2919E−02 | 8.6260E−03 | 3.6290E−04 |
| A14 = | −5.9319E−04 | 6.7552E−02 | 5.5392E−03 | −1.6769E−03 | −3.6327E−04 |
| A16 = | 2.5468E−05 | −2.0171E−02 | −5.7510E−04 | 1.3168E−04 | 7.4482E−05 |
| A18 = | | 3.4016E−03 | 7.2610E−07 | | 1.1141E−06 |
| A20 = | | −2.4852E−04 | | | |

| Surface # | 8 | 9 | 10 | 11 | 12 |
|---|---|---|---|---|---|
| k = | 1.5117E+00 | −2.3326E+00 | −1.1590E+00 | 1.4380E−01 | −7.4149E−01 |
| A4 = | −6.7892E−03 | −4.4642E−02 | 1.3452E−02 | −1.2449E−01 | −1.8477E−01 |
| A6 = | −1.9515E−02 | 8.0237E−02 | 7.0582E−02 | 9.3860E−02 | 1.1450E−01 |
| A8 = | 1.5772E−02 | −1.5838E−01 | −1.2842E−01 | −7.8661E−02 | −6.3694E−02 |
| A10 = | −1.1611E−02 | 1.7578E−01 | 1.2463E−01 | 4.7737E−02 | 2.5349E−02 |
| A12 = | 5.1362E−03 | −8.9066E−02 | −6.0157E−02 | −1.9347E−02 | −6.9154E−03 |
| A14 = | −1.2136E−03 | 1.7328E−02 | 1.5691E−02 | 5.1077E−03 | 1.2487E−03 |
| A16 = | 1.1935E−04 | 1.6962E−03 | −2.2393E−03 | −8.3967E−04 | −1.4191E−04 |
| A18 = | | −1.1934E−03 | 1.5525E−04 | 7.7779E−05 | 9.1484E−06 |
| A20 = | | 1.3219E−04 | −2.9397E−06 | −3.0914E−06 | −2.5374E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.57 | CT3/(T23 + T34) | 0.56 |
| Fno | 1.20 | (T23 + T34)/ (T12 + T45) | 10.44 |
| HFOV [deg.] | 37.7 | T23/T34 | 0.63 |
| Nd1 | 1.679 | T34/T12 | 31.60 |
| Nd2 | 1.679 | TD/BL | 4.27 |
| Nd3 | 1.722 | TD/EPD | 1.58 |
| Nd4 | 1.679 | TL/f | 1.64 |
| Nd5 | 1.679 | TL/ImgH | 2.09 |
| Vd1 | 18.4 | R2/f | −0.81 |
| Vd2 | 18.4 | R4/f | 0.55 |
| Vd3 | 29.2 | (R5 + R6)/ (R5 − R6) | −0.07 |
| Vd4 | 18.4 | R8/f | −0.38 |
| Vd5 | 18.4 | 1/|f3/f1 + f3/f2 + f3/f4 + f3/f5| | 17.53 |
| Vd1 + Vd2 + Vd3 + Vd4 + Vd5 | 103.0 | f/f12 | 0.21 |
| ΣAT/T34 | 1.79 | f/f45 | −0.14 |
| ΣCT/ΣAT | 1.80 | f/R7 | −2.27 |
| ΣCT/CT3 | 3.51 | f3/f | 1.09 |
| (CT2 + CT3 + CT4)/ (T23 + T34) | 1.30 | f3/f4 | 0.42 |
| (CT3 + CT4)/T34 | 1.34 | f3/f5 | −0.59 |
| CT3/CT1 | 2.89 | Yc52/Y52 | 0.69 |

<3rd Embodiment>

Figure 5:
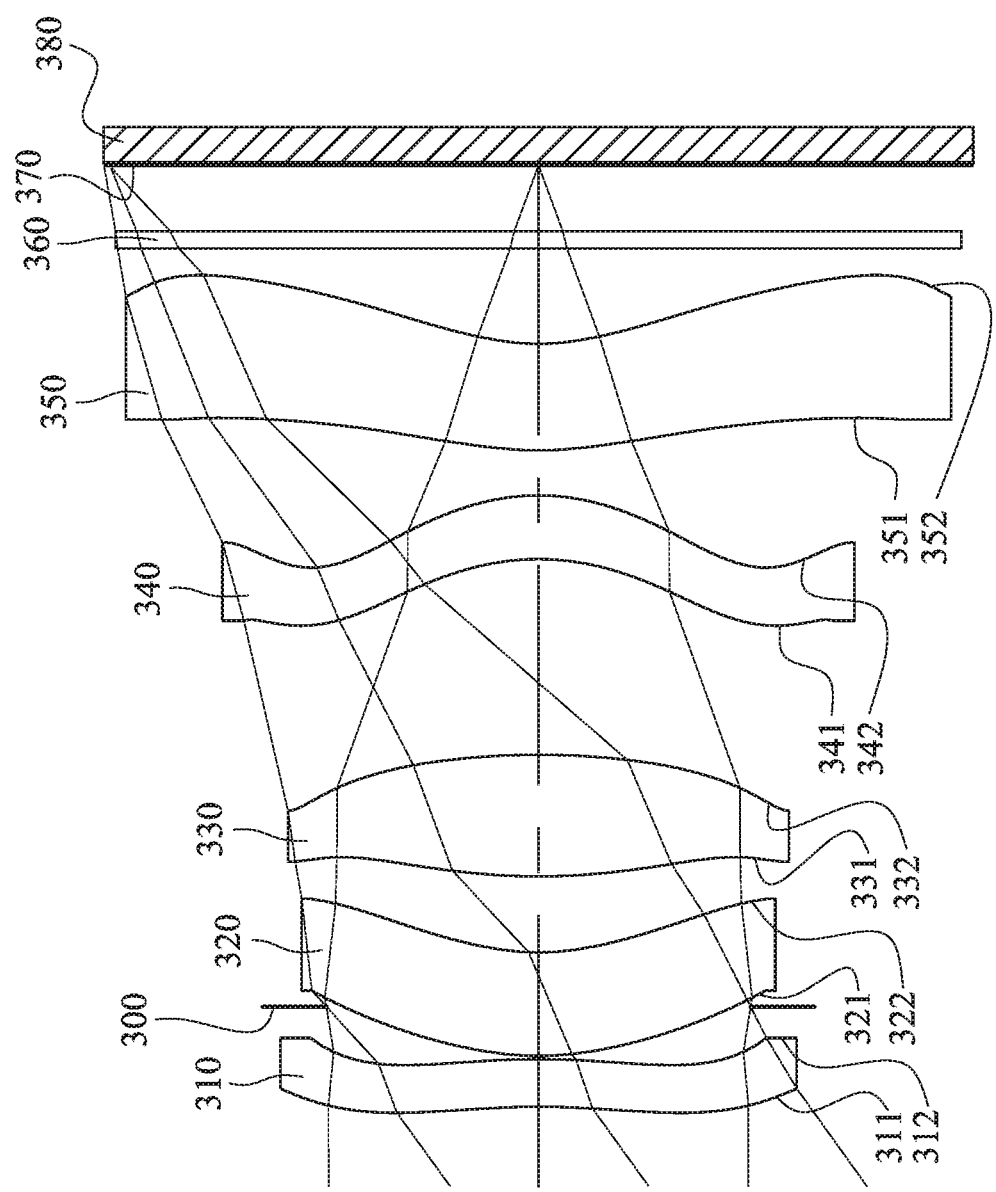
FIG. 5 is a schematic view of an imaging apparatus according to the 3rd embodiment of the present disclosure.
Figure 6:
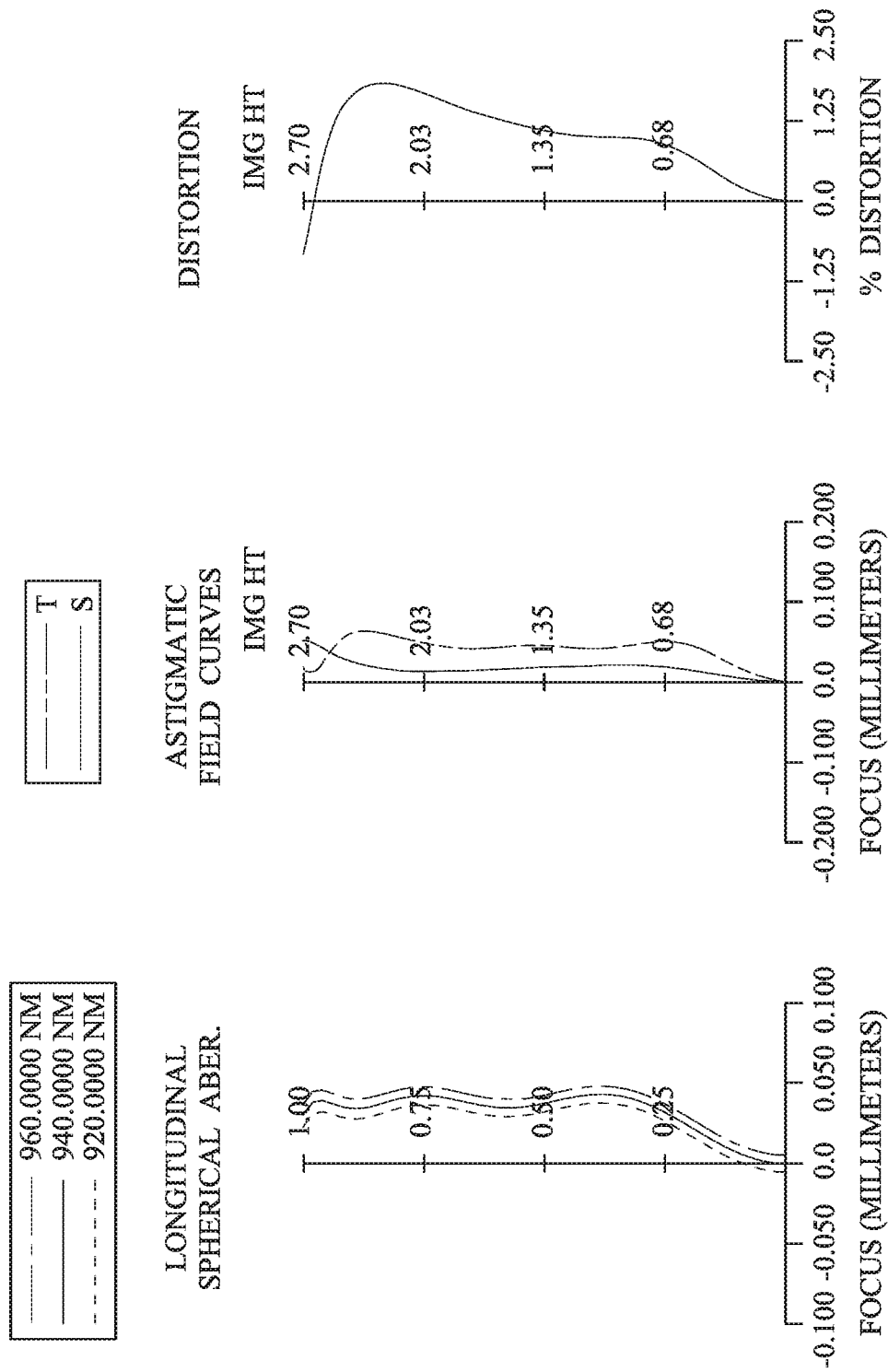
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an imaging optical lens assembly (its reference numeral is omitted) and an image sensor 380. The imaging optical lens assembly includes, in order from an object side to an image side along an optical path, a first lens element 310, an aperture stop 300, a second lens element 320, a third lens element 330, a fourth lens element 340, a fifth lens element 350, a filter 360 and an image surface 370, wherein the image sensor 380 is disposed on the image surface 370 of the imaging optical lens assembly. The imaging optical lens assembly includes five lens elements (310, 320, 330, 340, 350) without additional one or more lens elements inserted between the first lens element 310 and the fifth lens element 350.

The first lens element 310 with negative refractive power has an object-side surface 311 being concave in a paraxial region thereof and an image-side surface 312 being convex in a paraxial region thereof. The first lens element 310 is made of a plastic material, and has the object-side surface 311 and the image-side surface 312 being both aspheric. Furthermore, the object-side surface 311 of the first lens element 310 includes one inflection point and one critical point in an off-axis region thereof, and the image-side surface 312 of the first lens element 310 includes one inflection point and one critical point in an off-axis region thereof.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric. Furthermore, the image-side surface 322 of the second lens element 320 includes one inflection point and one critical point in an off-axis region thereof.

The third lens element 330 with positive refractive power has an object-side surface 331 being convex in a paraxial region thereof and an image-side surface 332 being convex in a paraxial region thereof. The third lens element 330 is made of a plastic material, and has the object-side surface 331 and the image-side surface 332 being both aspheric. Furthermore, the object-side surface 331 of the third lens element 330 includes two inflection points and one critical point in an off-axis region thereof, and the image-side surface 332 of the third lens element 330 includes one inflection point in an off-axis region thereof.

The fourth lens element 340 with positive refractive power has an object-side surface 341 being concave in a paraxial region thereof and an image-side surface 342 being convex in a paraxial region thereof. The fourth lens element 340 is made of a plastic material, and has the object-side surface 341 and the image-side surface 342 being both aspheric. Furthermore, the object-side surface 341 of the fourth lens element 340 includes two inflection points and two critical point in an off-axis region thereof, and the image-side surface 342 of the fourth lens element 340 includes two inflection points and one critical point in an off-axis region thereof.

The fifth lens element 350 with negative refractive power has an object-side surface 351 being convex in a paraxial region thereof and an image-side surface 352 being concave in a paraxial region thereof. The fifth lens element 350 is made of a plastic material, and has the object-side surface 351 and the image-side surface 352 being both aspheric. Furthermore, the object-side surface 351 of the fifth lens element 350 includes three inflection points and three critical points in an off-axis region thereof, and the image-side surface 352 of the fifth lens element 350 includes two inflection points and one critical point in an off-axis region thereof.

The filter 360 is made of a glass material, which is located between the fifth lens element 350 and the image surface 370 in order, and will not affect the focal length of the imaging optical lens assembly.

The detailed optical data of the 3rd embodiment are shown in Table 5 and the aspheric surface data are shown in Table 6 below.

TABLE 5

3rd Embodiment
f = 3.73 mm, Fno = 1.42, HFOV = 35.8 deg.

| Surface # | | Curvature Radius | | Thickness | Material | Index | Abbe # | Focal Length |
|---|---|---|---|---|---|---|---|---|
| 0 | Object | Plano | | 500.000 | | | | |
| 1 | Lens 1 | −4.396 | ASP | 0.300 | Plastic | 1.667 | 14.8 | −330.21 |
| 2 | | −4.608 | ASP | 0.330 | | | | |
| 3 | Ape. Stop | Plano | | −0.310 | | | | |
| 4 | Lens 2 | 1.895 | ASP | 0.652 | Plastic | 1.667 | 14.8 | −198.50 |
| 5 | | 1.611 | ASP | 0.478 | | | | |
| 6 | Lens 3 | 3.962 | ASP | 0.766 | Plastic | 1.667 | 14.8 | 3.44 |
| 7 | | −5.035 | ASP | 1.232 | | | | |
| 8 | Lens 4 | −1.563 | ASP | 0.401 | Plastic | 1.667 | 14.8 | 11.02 |
| 9 | | −1.421 | ASP | 0.284 | | | | |
| 10 | Lens 5 | 2.344 | ASP | 0.670 | Plastic | 1.667 | 14.8 | −8.68 |
| 11 | | 1.478 | ASP | 0.600 | | | | |
| 12 | Filter | Plano | | 0.110 | Glass | 1.508 | 64.2 | — |
| 13 | | Plano | | 0.422 | | | | |
| 14 | Image | Plano | | — | | | | |

Reference wavelength is 940.0 nm.

TABLE 6

Aspheric Coefficients

| Surface # | 1 | 2 | 4 | 5 | 6 |
|---|---|---|---|---|---|
| k = | −1.0000E+00 | −1.0000E+00 | −1.5909E+00 | −7.0057E+00 | 0.0000E+00 |
| A4 = | 1.3533E−01 | 8.5330E−02 | −9.8419E−02 | 5.2478E−02 | −1.9102E−02 |
| A6 = | −1.3210E−01 | −1.1861E−02 | 1.2085E−01 | −1.1010E−01 | −1.0097E−02 |
| A8 = | 1.3104E−01 | −3.4627E−02 | −1.3163E−01 | 1.2350E−01 | 3.6215E−02 |
| A10 = | −8.1360E−02 | 1.0923E−01 | 1.2145E−01 | −9.2474E−02 | −8.6621E−02 |
| A12 = | 3.0497E−02 | −1.2604E−01 | −7.8963E−02 | 4.1329E−02 | 9.3116E−02 |
| A14 = | −6.3287E−03 | 7.9147E−02 | 3.2617E−02 | −9.9208E−03 | −5.4815E−02 |
| A16 = | 5.5186E−04 | −2.8122E−02 | −7.5966E−03 | 9.5591E−04 | 1.6500E−02 |
| A18 = | | 5.2536E−03 | 7.4970E−04 | | −1.9587E−03 |
| A20 = | | −3.9715E−04 | | | |

| Surface # | 7 | 8 | 9 | 10 | 11 |
|---|---|---|---|---|---|
| k = | −4.2609E+00 | −3.3952E+00 | −1.0000E+00 | −1.0000E+00 | −1.0000E+00 |
| A4 = | −6.6950E−03 | −5.6606E−02 | −9.2040E−03 | −1.6582E−01 | −2.0362E−01 |
| A6 = | −2.8245E−02 | 3.7048E−02 | 8.9366E−02 | 1.4104E−01 | 1.3291E−01 |
| A8 = | 4.4812E−02 | −4.0161E−02 | −1.2522E−01 | −1.0557E−01 | −7.3016E−02 |
| A10 = | 4.9661E−02 | 9.5465E−02 | 1.3630E−01 | 6.7789E−02 | 2.9126E−02 |
| A12 = | 3.0624E−02 | −9.0034E−02 | −8.1745E−02 | −2.1531E−02 | −7.9518E−03 |
| A14 = | −1.0118E−02 | 4.4141E−02 | 2.8169E−02 | 5.2600E−03 | 1.4273E−03 |
| A16 = | 1.4147E−03 | −1.2270E−02 | −5.6518E−03 | −8.0258E−04 | −1.5973E−04 |
| A18 = | | 1.8497E−03 | 6.1390E−04 | 6.9124E−05 | 1.0015E−05 |
| A20 = | | −1.1841E−04 | −2.7846E−05 | −2.5571E−06 | −2.6612E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.73 | CT3/(T23 + T34) | 0.45 |
| Fno | 1.42 | (T23 + T34)/(T12 + T45) | 5.63 |
| HFOV [deg.] | 35.8 | T23/T34 | 0.39 |
| Nd1 | 1.705 | T34/T12 | 61.60 |
| Nd2 | 1.705 | TD/BL | 4.24 |
| Nd3 | 1.705 | TD/EPD | 1.82 |
| Nd4 | 1.705 | TL/f | 1.59 |
| Nd5 | 1.705 | TL/ImgH | 2.20 |
| Vd1 | 14.8 | R2/f | −1.24 |
| Vd2 | 14.8 | R4/f | 0.43 |
| Vd3 | 14.8 | (R5 + R6)/(R5 − R6) | −0.12 |
| Vd4 | 14.8 | R8/f | −0.38 |
| Vd5 | 14.8 | 1/|f3/f1 + f3/f2 + f3/f4 + f3/f5| | 8.93 |
| Vd1 + Vd2 + Vd3 + Vd4 + Vd5 | 74.0 | f/f12 | −0.03 |
| ΣAT/T34 | 1.63 | f/f45 | −0.06 |
| ΣCT/ΣAT | 1.38 | f/R7 | −2.39 |
| ΣCT/CT3 | 3.64 | f3/1 | 0.92 |
| (CT2 + CT3 + CT4)/(T23 + T34) | 1.06 | f3/f4 | 0.31 |
| (CT3 + CT4)/T34 | 0.95 | f3/f5 | −0.40 |
| CT3/CT1 | 2.55 | Yc52/Y52 | 0.82 |

<4th Embodiment>

Figure 7:
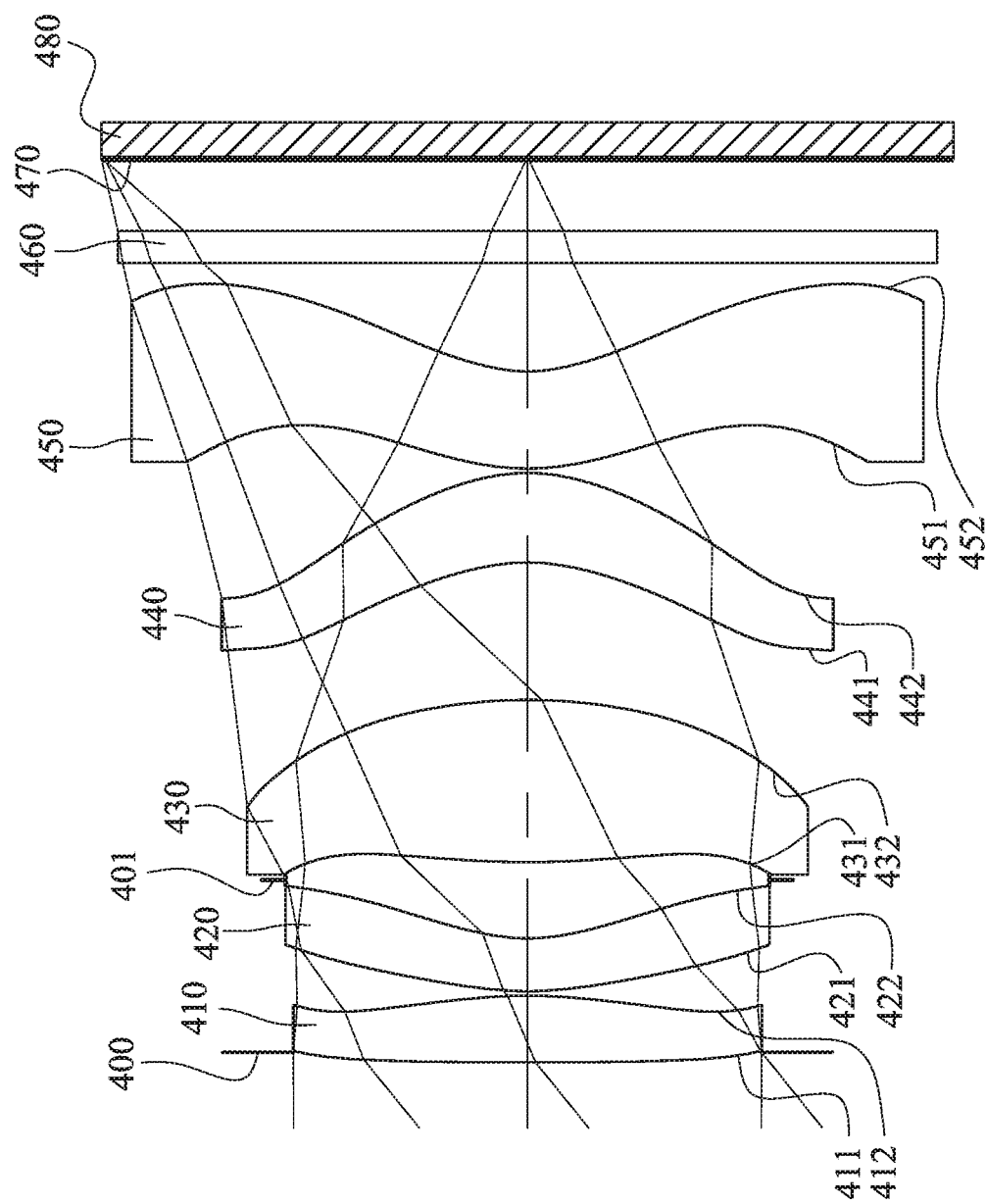
FIG. 7 is a schematic view of an imaging apparatus according to the 4th embodiment of the present disclosure.
Figure 8:
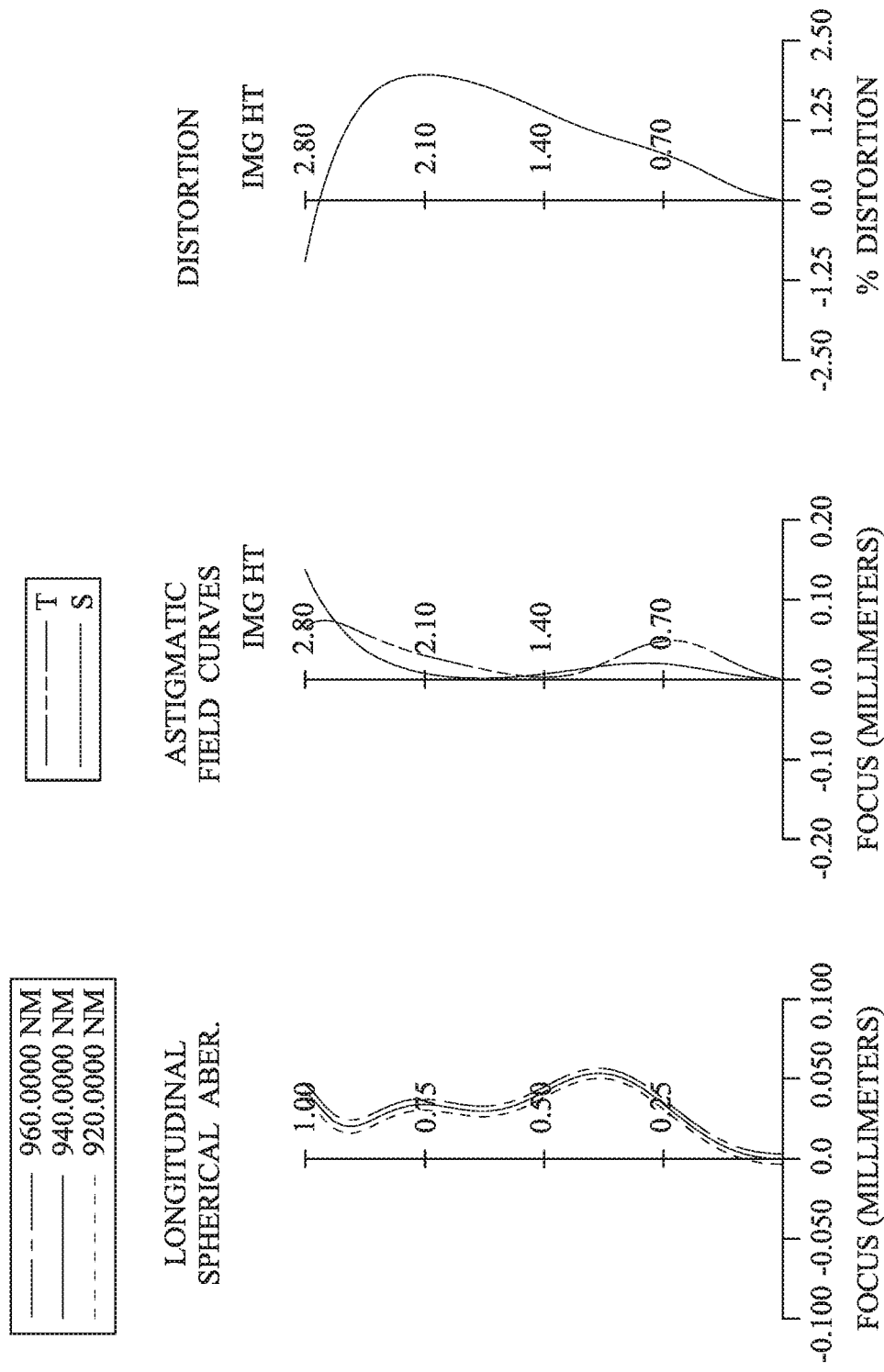
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an imaging optical lens assembly (its reference numeral is omitted) and an image sensor 480. The imaging optical lens assembly includes, in order from an object side to an image side along an optical path, an aperture stop 400, a first lens element 410, a second lens element 420, a stop 401, a third lens element 430, a fourth lens element 440, a fifth lens element 450, a filter 460 and an image surface 470, wherein the image sensor 480 is disposed on the image surface 470 of the imaging optical lens assembly. The imaging optical lens assembly includes five lens elements (410, 420, 430, 440, 450) without additional one or more lens elements inserted between the first lens element 410 and the fifth lens element 450.

The first lens element 410 with positive refractive power has an object-side surface 411 being convex in a paraxial region thereof and an image-side surface 412 being convex in a paraxial region thereof. The first lens element 410 is made of a plastic material, and has the object-side surface 411 and the image-side surface 412 being both aspheric. Furthermore, the image-side surface 412 of the first lens element 410 includes one inflection point and one critical point in an off-axis region thereof.

The second lens element 420 with negative refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric. Furthermore, the object-side surface 421 of the second lens element 420 includes on inflection point in an off-axis region thereof, and the image-side surface 422 of the second lens element 420 includes one inflection point in an off-axis region thereof.

The third lens element 430 with positive refractive power has an object-side surface 431 being convex in a paraxial region thereof and an image-side surface 432 being convex in a paraxial region thereof. The third lens element 430 is made of a plastic material, and has the object-side surface 431 and the image-side surface 432 being both aspheric. Furthermore, the object-side surface 431 of the third lens element 430 includes one inflection point and one critical point in an off-axis region thereof.

The fourth lens element 440 with positive refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric. Furthermore, the object-side surface 441 of the fourth lens element 440 includes two inflection points in an off-axis region thereof, and the image-side surface 442 of the fourth lens element 440 includes one inflection point and one critical point in an off-axis region thereof.

The fifth lens element 450 with negative refractive power has an object-side surface 451 being convex in a paraxial region thereof and an image-side surface 452 being concave in a paraxial region thereof. The fifth lens element 450 is made of a plastic material, and has the object-side surface 451 and the image-side surface 452 being both aspheric. Furthermore, the object-side surface 451 of the fifth lens element 450 includes two inflection points and one critical point in an off-axis region thereof, and the image-side surface 452 of the fifth lens element 450 includes one inflection point and one critical point in an off-axis region thereof.

The filter 460 is made of a glass material, which is located between the fifth lens element 450 and the image surface 470 in order, and will not affect the focal length of the imaging optical lens assembly.

The detailed optical data of the 4th embodiment are shown in Table 7 and the aspheric surface data are shown in Table 8 below.

TABLE 7

4th Embodiment
f = 3.45 mm, Fno = 1.12, HFOV = 39.0 deg.

| Surface # | | Curvature Radius | Thickness | Material Index | Abbe # | Focal Length |
|---|---|---|---|---|---|---|
| 0 | Object | Plano | 350.000 | | | |
| 1 | Ape. Stop | Plano | −0.067 | | | |

TABLE 7-continued

4th Embodiment
f = 3.45 mm, Fno = 1.12, HFOV = 39.0 deg.

| Surface # | | Curvature Radius | | Thickness | Material | Index | Abbe # | Focal Length |
|---|---|---|---|---|---|---|---|---|
| 2 | Lens 1 | 100.000 | ASP | 0.442 | Plastic | 1.617 | 23.5 | 5.31 |
| 3 | | -3.382 | ASP | 0.030 | | | | |
| 4 | Lens 2 | 2.299 | ASP | 0.350 | Plastic | 1.634 | 20.4 | -5.36 |
| 5 | | 1.290 | ASP | 0.387 | | | | |
| 6 | Stop | Plano | | 0.118 | | | | |
| 7 | Lens 3 | 6.009 | ASP | 1.075 | Plastic | 1.634 | 20.4 | 3.75 |
| 8 | | -3.651 | ASP | 0.910 | | | | |
| 9 | Lens 4 | -1.369 | ASP | 0.593 | Plastic | 1.634 | 20.4 | 7.35 |
| 10 | | -1.236 | ASP | 0.030 | | | | |
| 11 | Lens 5 | 1.636 | ASP | 0.644 | Plastic | 1.634 | 20.4 | -9.06 |
| 12 | | 1.079 | ASP | 0.720 | | | | |
| 13 | Filter | Plano | | 0.210 | Glass | 1.508 | 64.2 | — |
| 14 | | Plano | | 0.477 | | | | |
| 15 | Image | Plano | | — | | | | |

Reference wavelength is 940.0 nm.
Effective radius of Surface 6 (stop 401) is 1.600 mm.

TABLE 8

Aspheric Coefficients

| Surface # | 2 | 3 | 4 | 5 | 7 |
|---|---|---|---|---|---|
| k = | 0.0000E+00 | 0.0000E+00 | -1.2412E+00 | -5.7405E+00 | 0.0000E+00 |
| A4 = | 2.4948E-02 | 1.0667E-01 | -1.4687E-01 | -4.3124E-02 | -2.6315E-02 |
| A6 = | -3.3763E-02 | -9.8113E-02 | 1.1332E-01 | 6.4582E-03 | 4.0701E-03 |
| A8 = | 2.6853E-02 | 8.2253E-02 | -5.2539E-02 | 1.6872E-02 | -1.8527E-02 |
| A10 = | -1.1410E-02 | -4.0494E-02 | 1.2538E-02 | -1.9348E-02 | 1.9927E-02 |
| A12 = | 2.9680E-03 | 1.1405E-02 | -5.8295E-04 | 7.6811E-03 | -1.3802E-02 |
| A14 = | -3.5254E-04 | -1.3681E-03 | -1.8159E-04 | -1.0405E-03 | 4.8411E-03 |
| A16 = | | | | | -6.4252E-04 |

| Surface # | 8 | 9 | 10 | 11 | 12 |
|---|---|---|---|---|---|
| k = | -2.2324E+01 | -5.2254E+00 | -1.0000E+00 | -1.4715E+00 | -4.5782E+00 |
| A4 = | -5.2369E-02 | -2.1304E-02 | 1.3888E-02 | -1.0458E-01 | 2.7230E-03 |
| A6 = | 1.2493E-02 | 2.1726E-02 | -1.0765E-01 | 3.6697E-02 | -1.5800E-02 |
| A8 = | 4.0684E-03 | -3.0169E-02 | 6.6055E-02 | -1.8907E-02 | 5.9044E-03 |
| A10 = | -9.2211E-03 | 1.9894E-02 | -2.9899E-02 | 7.0511E-03 | -1.1272E-03 |
| A12 = | 4.6309E-03 | -5.6740E-03 | 9.2615E-03 | -1.5279E-03 | 1.1936E-04 |
| A14 = | -9.6645E-04 | 7.3031E-04 | -1.5788E-03 | 1.7256E-04 | -6.8569E-06 |
| A16 = | 7.0255E-05 | -3.5172E-05 | 1.0823E-04 | -7.7635E-06 | 1.6967E-07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.45 | CT3/(T23 + T34) | 0.76 |
| Fno | 1.12 | (T23 + T34)/(T12 + T45) | 23.58 |
| HFOV [deg.] | 39.0 | T23/T34 | 0.55 |
| Nd1 | 1.639 | T34/T12 | 30.33 |
| Nd2 | 1.660 | TD/BL | 3.26 |
| Nd3 | 1.660 | TD/EPD | 1.48 |
| Nd4 | 1.660 | TL/f | 1.73 |
| Nd5 | 1.660 | TL/ImgH | 2.14 |
| Vd1 | 23.5 | R2/f | -0.98 |
| Vd2 | 20.4 | R4/f | 0.37 |
| Vd3 | 20.4 | (R5 + R6)/(R5 − R6) | 0.24 |
| Vd4 | 20.4 | R8/f | -0.36 |
| Vd5 | 20.4 | 1/|f3/f1 + f3/f2 + f3/f4 + f3/f5| | 9.72 |
| Vd1 + Vd2 + Vd3 + Vd4 + Vd5 | 105.1 | f/f12 | 0.08 |
| ΣAT/T34 | 1.62 | f/f45 | 0.14 |
| ΣCT/ΣAT | 2.10 | f/R7 | -2.52 |
| ΣCT/CT3 | 2.89 | f3/f | 1.09 |
| (CT2 + CT3 + CT4)/(T23 + T34) | 1.43 | f3/f4 | 0.51 |
| (CT3 + CT4)/T34 | 1.83 | f3/f5 | -0.41 |
| CT3/CT1 | 2.43 | Yc52/Y52 | 0.81 |

<5th Embodiment>

Figure 9:
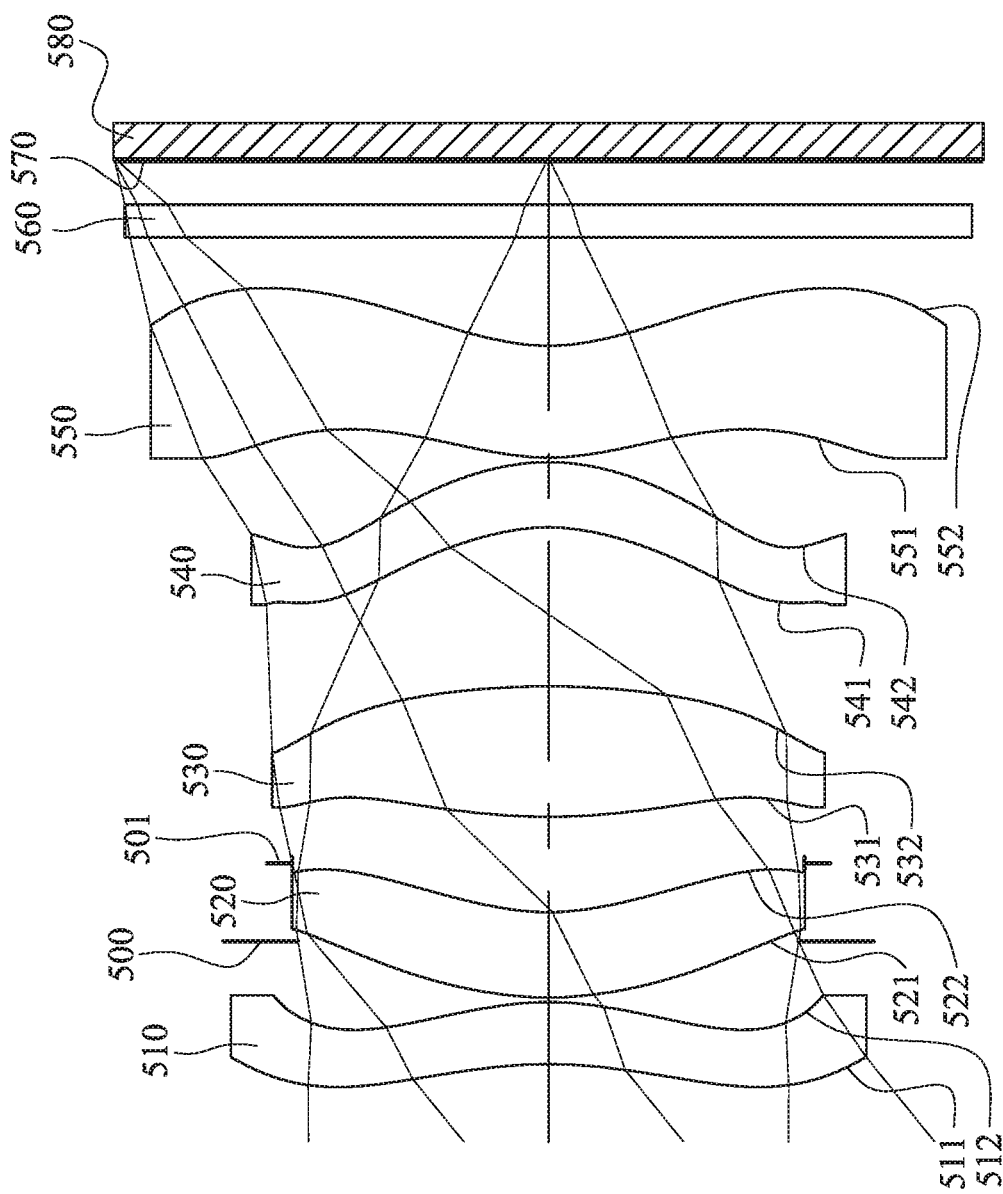
FIG. 9 is a schematic view of an imaging apparatus according to the 5th embodiment of the present disclosure.
Figure 10:
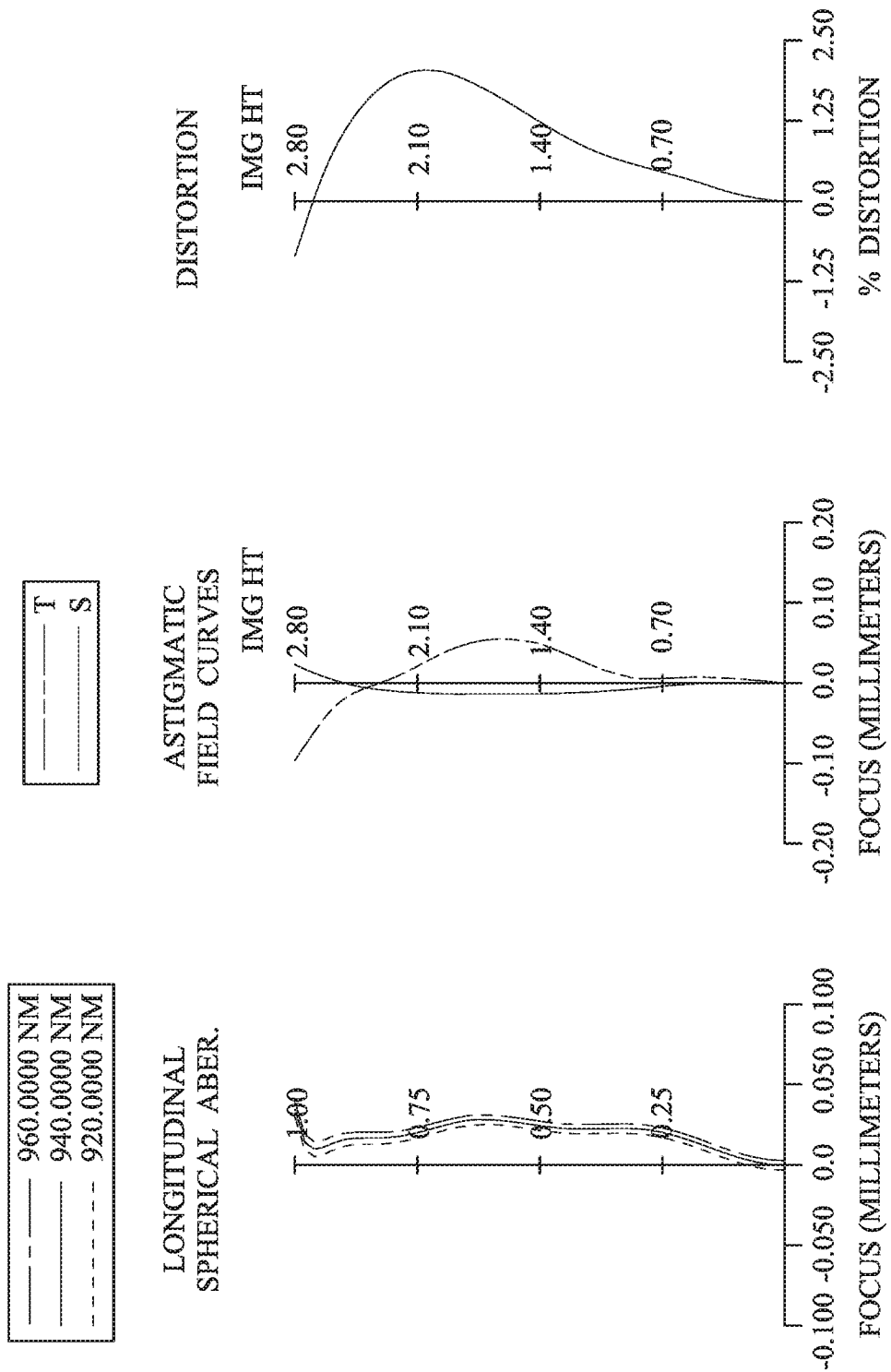
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an imaging optical lens assembly (its reference numeral is omitted) and an image sensor 580. The imaging optical lens assembly includes, in order from an object side to an image side along an optical path, a first lens element 510, an aperture stop 500, a second lens element 520, a stop 501, a third lens element 530, a fourth lens element 540, a fifth lens element 550, a filter 560 and an image surface 570, wherein the image sensor 580 is disposed on the image surface 570 of the imaging optical lens assembly. The imaging optical lens assembly includes five lens elements (510, 520, 530, 540, 550) without additional one or more lens elements inserted between the first lens element 510 and the fifth lens element 550.

The first lens element 510 with positive refractive power has an object-side surface 511 being concave in a paraxial region thereof and an image-side surface 512 being convex in a paraxial region thereof. The first lens element 510 is made of a plastic material, and has the object-side surface 511 and the image-side surface 512 being both aspheric. Furthermore, the object-side surface 511 of the first lens element 510 includes two inflection points and one critical point in an off-axis region thereof, and the image-side surface 512 of the first lens element 510 includes one inflection point and one critical point in an off-axis region thereof.

The second lens element 520 with negative refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric. Furthermore, the object-side surface 521 of the second lens element 520 includes one inflection point in an off-axis region thereof, and the image-side surface 522 of the second lens element 520 includes one inflection point and one critical point in an off-axis region thereof.

The third lens element 530 with positive refractive power has an object-side surface 531 being convex in a paraxial region thereof and an image-side surface 532 being convex in a paraxial region thereof. The third lens element 530 is made of a plastic material, and has the object-side surface 531 and the image-side surface 532 being both aspheric. Furthermore, the object-side surface 531 of the third lens element 530 includes two inflection points and one critical point in an off-axis region thereof, and the image-side surface 532 of the third lens element 530 includes one inflection point in an off-axis region thereof.

The fourth lens element 540 with positive refractive power has an object-side surface 541 being concave in a paraxial region thereof and an image-side surface 542 being convex in a paraxial region thereof. The fourth lens element 540 is made of a plastic material, and has the object-side surface 541 and the image-side surface 542 being both aspheric. Furthermore, the object-side surface 541 of the fourth lens element 540 includes two inflection points and two critical points in an off-axis region thereof, and the image-side surface 542 of the fourth lens element 540 includes two inflection points and one critical point in an off-axis region thereof.

The fifth lens element 550 with positive refractive power has an object-side surface 551 being convex in a paraxial region thereof and an image-side surface 552 being concave in a paraxial region thereof. The fifth lens element 550 is made of a plastic material, and has the object-side surface 551 and the image-side surface 552 being both aspheric. Furthermore, the object-side surface 551 of the fifth lens element 550 includes two inflection points and one critical point in an off-axis region thereof, and the image-side surface 552 of the fifth lens element 550 includes one inflection point and one critical point in an off-axis region thereof.

The filter 560 is made of a glass material, which is located between the fifth lens element 550 and the image surface 570 in order, and will not affect the focal length of the imaging optical lens assembly.

The detailed optical data of the 5th embodiment are shown in Table 9 and the aspheric surface data are shown in Table 10 below.

TABLE 9

5th Embodiment
f = 3.44 mm, Fno = 1.12, HFOV = 39.0 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Lens 1 | −3.090 | ASP | 0.400 | Plastic | 1.617 | 23.5 | 8.24 |
| 2 | | −2.017 | ASP | 0.392 | | | | |
| 3 | Ape. Stop | Plano | | −0.362 | | | | |
| 4 | Lens 2 | 2.350 | ASP | 0.550 | Plastic | 1.634 | 20.4 | −11.54 |
| 5 | | 1.617 | ASP | 0.315 | | | | |
| 6 | Stop | Plano | | 0.300 | | | | |
| 7 | Lens 3 | 4.139 | ASP | 0.841 | Plastic | 1.617 | 23.5 | 3.93 |
| 8 | | −5.402 | ASP | 1.025 | | | | |
| 9 | Lens 4 | −1.289 | ASP | 0.420 | Plastic | 1.634 | 20.4 | 7453.97 |
| 10 | | −1.451 | ASP | 0.030 | | | | |
| 11 | Lens 5 | 1.639 | ASP | 0.720 | Plastic | 1.634 | 20.4 | 114.55 |
| 12 | | 1.391 | ASP | 0.700 | | | | |
| 13 | Filter | Plano | | 0.210 | Glass | 1.508 | 64.2 | — |
| 14 | | Plano | | 0.287 | | | | |
| 15 | Image | Plano | | — | | | | |

Reference wavelength is 940.0 nm.
Effective radius of Surface 6 (stop 501) is 1.650 mm.

TABLE 10

| Aspheric Coefficients | | | | | |
|---|---|---|---|---|---|
| Surface # | 1 | 2 | 4 | 5 | 7 |
| k = | 0.0000E+00 | −1.0000E+00 | −1.8907E+00 | −8.0010E+00 | 0.0000E+00 |
| A4 = | 5.1854E−02 | 1.3704E−01 | −1.9118E−02 | 7.8597E−04 | −2.3317E−02 |
| A6 = | −5.4329E−03 | −1.0352E−01 | 1.3558E−02 | −1.6145E−02 | 1.5384E−02 |
| A8 = | 4.1400E−03 | 1.1343E−01 | −8.8502E−03 | 1.1101E−02 | −2.9718E−02 |
| A10 = | −1.4628E−03 | −8.8739E−02 | 4.0217E−03 | −9.1920E−03 | 2.5399E−02 |
| A12 = | 2.4393E−04 | 4.6434E−02 | −1.1942E−03 | 4.2309E−03 | −1.4680E−02 |
| A14 = | −3.5434E−05 | −1.4999E−02 | 1.4144E−04 | −1.0297E−03 | 4.6109E−03 |
| A16 = | 8.3616E−06 | 2.6787E−03 | | 1.0761E−04 | −6.4290E−04 |
| A18 = | −9.7197E−07 | −2.0024E−04 | | | 2.7719E−05 |
| Surface # | 8 | 9 | 10 | 11 | 12 |
| k = | −4.8421E+00 | −4.9580E+00 | −1.0000E+00 | −1.0000E+00 | −1.0000E+00 |
| A4 = | −1.0482E−02 | 5.7500E−02 | 5.5205E−02 | −2.3356E−01 | −2.0079E−01 |
| A6 = | 6.0435E−03 | −2.3535E−01 | −5.9424E−02 | 1.4886E−01 | 1.1218E−01 |
| A8 = | −1.4767E−02 | 3.1550E−01 | 5.7647E−02 | −8.8445E−02 | −5.6557E−02 |
| A10 = | 1.1797E−02 | −2.5743E−01 | −3.3361E−02 | 3.8916E−02 | 2.1510E−02 |
| A12 = | −6.7709E−03 | 1.4383E−01 | 1.3144E−02 | −1.1942E−02 | −5.7889E−03 |
| A14 = | 2.5424E−03 | −5.1828E−02 | −1.8796E−03 | 2.4760E−03 | 1.0508E−03 |
| A16 = | −5.1638E−04 | 1.1125E−02 | −4.2172E−04 | −3.2948E−04 | −1.2136E−04 |
| A18 = | 4.4004E−05 | −1.2573E−03 | 1.5967E−04 | 2.5505E−05 | 8.0018E−06 |
| A20 = | | 5.4381E−05 | −1.3352E−05 | −8.7985E−07 | −2.2800E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 6th Embodiment | | | |
|---|---|---|---|
| f [mm] | 3.44 | CT3/(T23 + T34) | 0.51 |
| Fno | 1.12 | (T23 + T34)/(T12 + T45) | 27.33 |
| HFOV [deg.] | 39.0 | T23/T34 | 0.60 |
| Nd1 | 1.639 | T34/T12 | 34.17 |
| Nd2 | 1.660 | TD/BL | 3.87 |
| Nd3 | 1.639 | TD/EPD | 1.49 |
| Nd4 | 1.660 | TL/f | 1.69 |
| Nd5 | 1.660 | TL/ImgH | 2.08 |
| Vd1 | 23.5 | R2/f | −0.59 |
| Vd2 | 20.4 | R4/f | 0.47 |
| Vd3 | 23.5 | (R5 + R6)/(R5 − R6) | −0.13 |
| Vd4 | 20.4 | R8/f | −0.42 |
| Vd5 | 20.4 | \|f3/f1 + f3/f2 + f3/f4 + f3/f5\| | 5.84 |
| Vd1 + Vd2 + Vd3 + Vd4 + Vd5 | 108.2 | f/f12 | 0.16 |
| ΣAT/T34 | 1.66 | f/f45 | 0.03 |
| ΣCT/ΣAT | 1.72 | f/R7 | −2.67 |
| ΣCT/CT3 | 3.49 | f3/f | 1.14 |
| (CT2 + CT3 + CT4)/(T23 + T34) | 1.10 | f3/f4 | 5.27E−4 |
| (CT3 + CT4)/T34 | 1.23 | f3/f5 | 0.03 |
| CT3/CT1 | 2.10 | Yc52/Y52 | 0.71 |
| <6th Embodiment> | | | |

Figure 11:
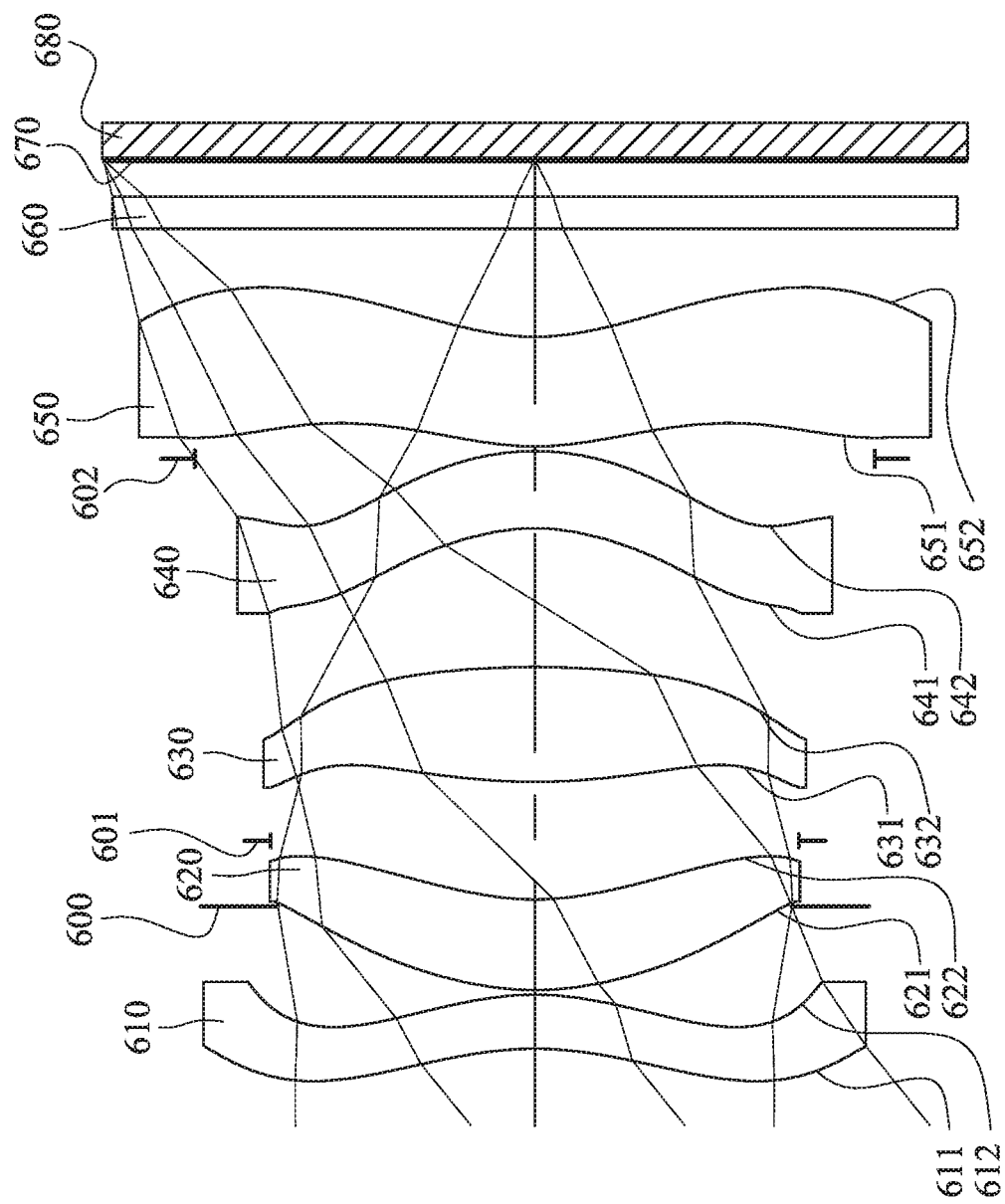
FIG. 11 is a schematic view of an imaging apparatus according to the 6th embodiment of the present disclosure.
Figure 12:
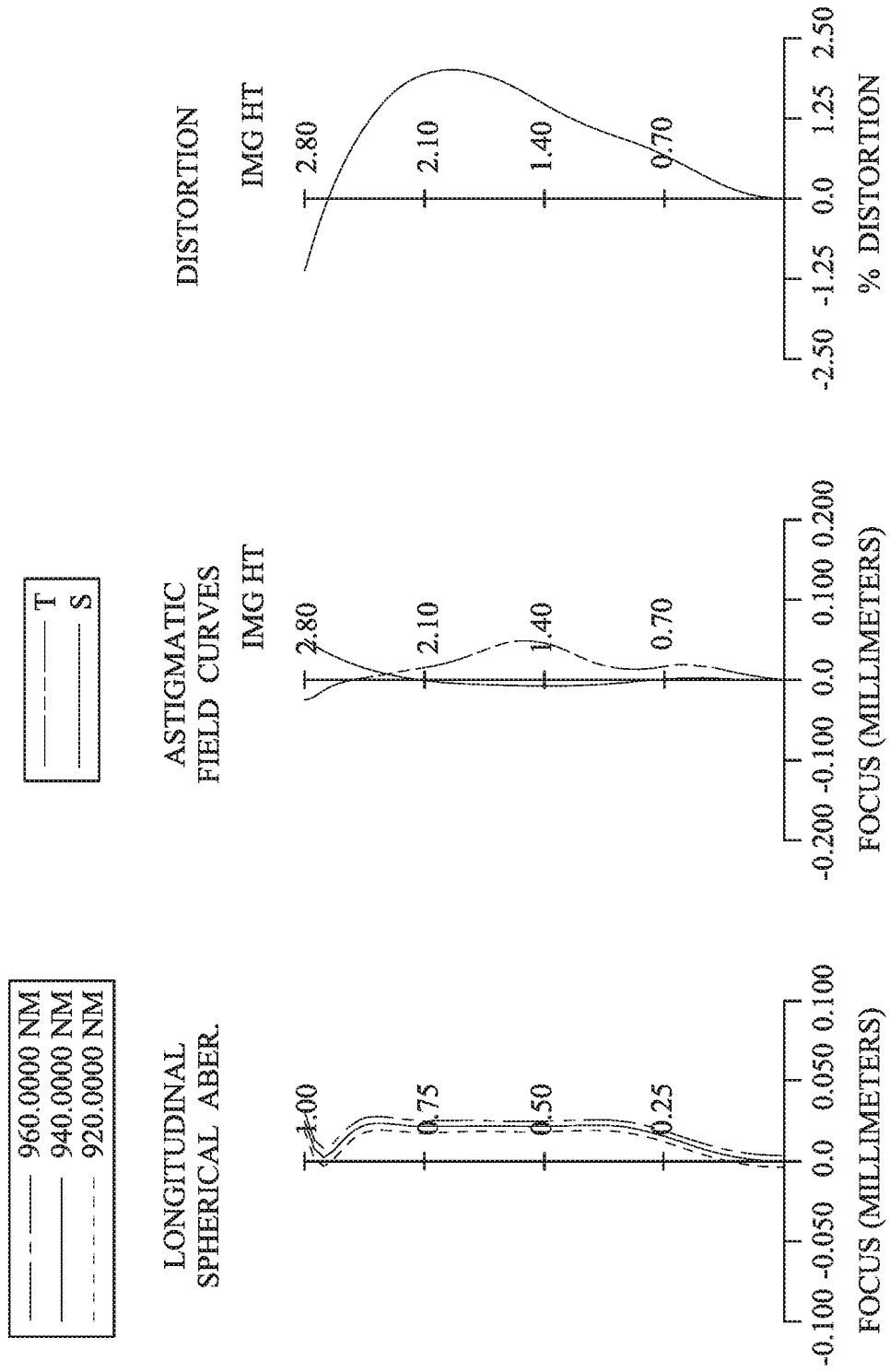
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an imaging optical lens assembly (its reference numeral is omitted) and an image sensor 680. The imaging optical lens assembly includes, in order from an object side to an image side along an optical path, a first lens element 610, an aperture stop 600, a second lens element 620, a stop 601, a third lens element 630, a fourth lens element 640, a stop 602, a fifth lens element 650, a filter 660 and an image surface 670, wherein the image sensor 680 is disposed on the image surface 670 of the imaging optical lens assembly. The imaging optical lens assembly includes five lens elements (610, 620, 630, 640, 650) without additional one or more lens elements inserted between the first lens element 610 and the fifth lens element 650.

The first lens element 610 with positive refractive power has an object-side surface 611 being concave in a paraxial region thereof and an image-side surface 612 being convex in a paraxial region thereof. The first lens element 610 is made of a plastic material, and has the object-side surface 611 and the image-side surface 612 being both aspheric. Furthermore, the object-side surface 611 of the first lens element 610 includes two inflection points and one critical point in an off-axis region thereof, and the image-side surface 612 of the first lens element 610 includes two inflection points and one critical point in an off-axis region thereof.

The second lens element 620 with positive refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric. Furthermore, the object-side surface 621 of the second lens element 620 includes one inflection point in an off-axis region thereof, and the image-side surface 622 of the second lens element 620 includes one inflection point and one critical point in an off-axis region thereof.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric.

Furthermore, the object-side surface 631 of the third lens element 630 includes two inflection points and one critical point in an off-axis region thereof, and the image-side surface 632 of the third lens element 630 includes one inflection point in an off-axis region thereof.

The fourth lens element 640 with negative refractive power has an object-side surface 641 being concave in a paraxial region thereof and an image-side surface 642 being convex in a paraxial region thereof. The fourth lens element 640 is made of a plastic material, and has the object-side surface 641 and the image-side surface 642 being both aspheric. Furthermore, the object-side surface 641 of the fourth lens element 640 includes two inflection points in an off-axis region thereof, and the image-side surface 642 of the fourth lens element 640 includes two inflection points and one critical point in an off-axis region thereof.

The fifth lens element 650 with positive refractive power has an object-side surface 651 being convex in a paraxial region thereof and an image-side surface 652 being concave in a paraxial region thereof. The fifth lens element 650 is made of a plastic material, and has the object-side surface 651 and the image-side surface 652 being both aspheric. Furthermore, the object-side surface 651 of the fifth lens element 650 includes two inflection points and two critical points in an off-axis region thereof, and the image-side surface 652 of the fifth lens element 650 includes two inflection points and one critical point in an off-axis region thereof.

The filter 660 is made of a glass material, which is located between the fifth lens element 650 and the image surface 670 in order, and will not affect the focal length of the imaging optical lens assembly.

The detailed optical data of the 6th embodiment are shown in Table 11 and the aspheric surface data are shown in Table 12 below.

TABLE 11

6th Embodiment
f = 3.45 mm, Fno = 1.12, HFOV = 39.0 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Lens 1 | −2.194 | ASP | 0.350 | Plastic | 1.634 | 20.4 | 14.36 |
| 2 | | −1.877 | ASP | 0.572 | | | | |
| 3 | Ape. Stop | Plano | | −0.542 | | | | |
| 4 | Lens 2 | 1.998 | ASP | 0.587 | Plastic | 1.634 | 20.4 | 882.59 |
| 5 | | 1.776 | ASP | 0.380 | | | | |
| 6 | Stop | Plano | | 0.382 | | | | |
| 7 | Lens 3 | 4.093 | ASP | 0.744 | Plastic | 1.634 | 20.4 | 4.06 |
| 8 | | −6.418 | ASP | 0.899 | | | | |
| 9 | Lens 4 | −1.384 | ASP | 0.500 | Plastic | 1.634 | 20.4 | −49.31 |
| 10 | | −1.651 | ASP | −0.050 | | | | |
| 11 | Stop | Plano | | 0.080 | | | | |
| 12 | Lens 5 | 1.795 | ASP | 0.710 | Plastic | 1.634 | 20.4 | 115.05 |
| 13 | | 1.558 | ASP | 0.700 | | | | |
| 14 | Filter | Plano | | 0.210 | Glass | 1.508 | 64.2 | — |
| 15 | | Plano | | 0.236 | | | | |
| 16 | Image | Plano | | — | | | | |

Reference wavelength is 940.0 nm.
Effective radius of Surface 6 (stop 601) is 1.710 mm.
Effective radius of Surface 11 (stop 602) is 2.200 mm.

TABLE 12

Aspheric Coefficients

| Surface # | 1 | 2 | 4 | 5 | 7 |
|---|---|---|---|---|---|
| k = | −1.0000E+00 | −1.0000E+00 | −1.2232E+00 | −9.6804E+00 | 0.0000E+00 |
| A4 = | 9.7125E−02 | 1.3131E−01 | −3.2800E−02 | 1.7505E−02 | −2.3744E−02 |
| A6 = | −4.6966E−02 | −7.3716E−02 | 1.9494E−02 | −3.3953E−02 | 8.3333E−03 |
| A8 = | 2.8475E−02 | 4.9626E−02 | −8.9492E−03 | 2.3970E−02 | −2.7070E−02 |
| A10 = | −1.0424E−02 | −1.6568E−02 | 3.1165E−03 | −1.2328E−02 | 2.6824E−02 |
| A12 = | 2.1450E−03 | −1.2547E−03 | −9.8969E−05 | 3.6966E−03 | −1.8093E−02 |
| A14 = | −2.2411E−04 | 4.0154E−03 | −6.1879E−04 | −5.7411E−04 | 6.5407E−03 |
| A16 = | 8.7127E−06 | −1.8149E−03 | 2.7135E−04 | 2.9433E−05 | −1.1013E−03 |
| A18 = | | 3.7730E−04 | −3.8378E−05 | | 6.8403E−05 |
| A20 = | | −3.1025E−05 | | | |

| Surface # | 8 | 9 | 10 | 12 | 13 |
|---|---|---|---|---|---|
| k = | 1.0478E+00 | −3.2171E−01 | −1.0000E+00 | −1.0000E+00 | −1.0000E+00 |
| A4 = | −1.2999E−02 | 7.4940E−02 | −2.8483E−02 | −2.4563E−01 | −1.6511E−01 |
| A6 = | 2.1229E−04 | −2.5476E−01 | 5.6370E−02 | 1.8416E−01 | 7.1382E−02 |
| A8 = | −9.8224E−03 | 3.1933E−01 | −4.9711E−02 | −1.2866E−01 | −2.4844E−02 |
| A10 = | 6.1796E−03 | −2.2700E−01 | 4.1412E−02 | 6.8328E−02 | 6.6018E−03 |
| A12 = | −2.2642E−03 | 1.0958E−01 | −1.9637E−02 | −2.5406E−02 | −6.1457E−04 |
| A14 = | 4.9831E−04 | −3.4751E−02 | 6.2483E−03 | 6.2957E−03 | −3.1065E−05 |

TABLE 12-continued

| Aspheric Coefficients | | | | | |
|---|---|---|---|---|---|
| A16 = | −3.8325E−05 | 6.2591E−03 | −1.4854E−03 | −9.7706E−04 | 1.8431E−05 |
| A18 = | | −4.4288E−04 | 2.2381E−04 | 8.5236E−05 | −2.1106E−06 |
| A20 = | | −1.0134E−05 | −1.4595E−05 | −3.1767E−06 | 8.3990E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.45 | CT3/(T23 + T34) | 0.45 |
| Fno | 1.12 | (T23 + T34)/(T12 + T45) | 27.68 |
| HFOV [deg.] | 39.0 | T23/T34 | 0.85 |
| Nd1 | 1.660 | T34/T12 | 29.97 |
| Nd2 | 1.660 | TD/BL | 4.02 |
| Nd3 | 1.660 | TD/EPD | 1.48 |
| Nd4 | 1.660 | TL/f | 1.67 |
| Nd5 | 1.660 | TL/ImgH | 2.06 |
| Vd1 | 20.4 | R2/f | −0.54 |
| Vd2 | 20.4 | R4/f | 0.51 |
| Vd3 | 20.4 | (R5 + R6)/(R5 − R6) | −0.22 |
| Vd4 | 20.4 | R8/f | −0.48 |
| Vd5 | 20.4 | 1/|f3/f1 + f3/f2 + f3/f4 + f3/f5| | 4.17 |
| Vd1 + Vd2 + Vd3 + Vd4 + Vd5 | 102.0 | f/f12 | 0.28 |
| ΣAT/T34 | 1.91 | f/f45 | −0.05 |
| ΣCT/ΣAT | 1.68 | f/R7 | −2.49 |
| ΣCT/CT3 | 3.89 | f3/f | 1.18 |
| (CT2 + CT3 + CT4)/(T23 + T34) | 1.10 | f3/f4 | −0.08 |
| (CT3 + CT4)/T34 | 1.38 | f3/f5 | 0.04 |
| CT3/CT1 | 2.13 | Yc52/Y52 | 0.68 |

<7th Embodiment>

Figure 13:
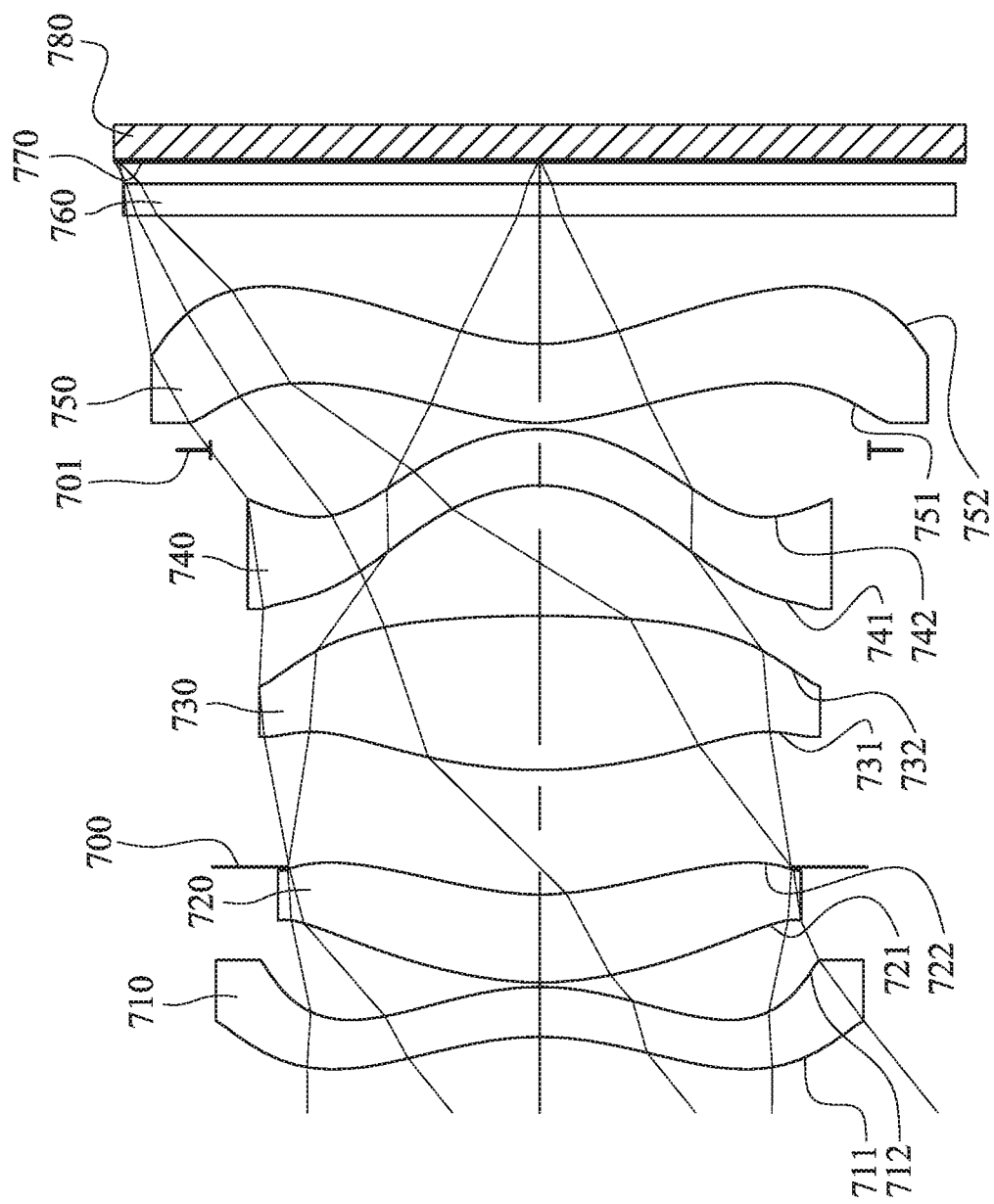
FIG. 13 is a schematic view of an imaging apparatus according to the 7th embodiment of the present disclosure.
Figure 14:
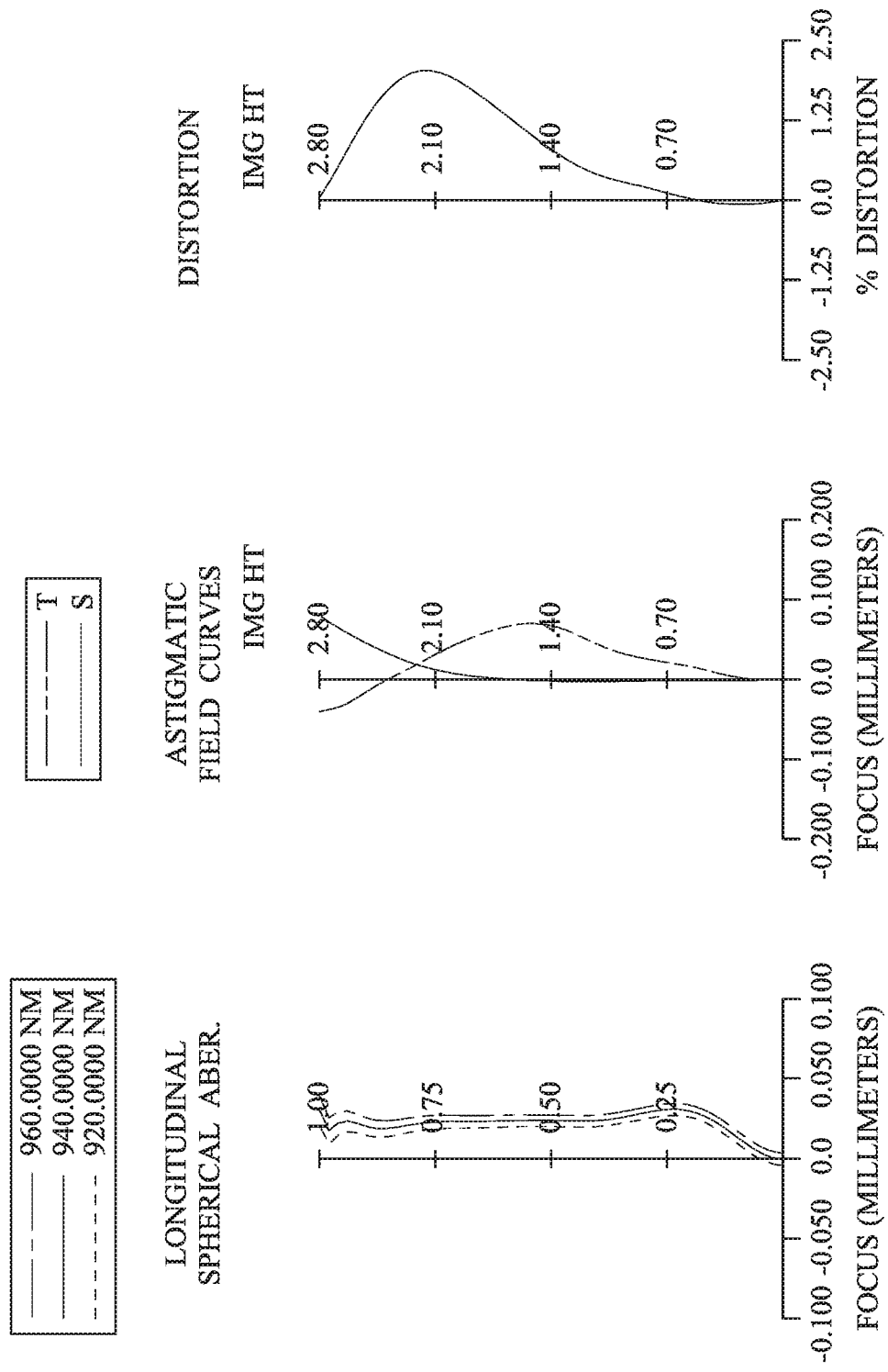
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an imaging optical lens assembly (its reference numeral is omitted) and an image sensor 780. The imaging optical lens assembly includes, in order from an object side to an image side along an optical path, a first lens element 710, a second lens element 720, an aperture stop 700, a third lens element 730, a fourth lens element 740, a stop 701, a fifth lens element 750, a filter 750 and an image surface 770, wherein the image sensor 780 is disposed on the image surface 770 of the imaging optical lens assembly. The imaging optical lens assembly includes five lens elements (710, 720, 730, 740, 750) without additional one or more lens elements inserted between the first lens element 710 and the fifth lens element 750.

The first lens element 710 with positive refractive power has an object-side surface 711 being concave in a paraxial region thereof and an image-side surface 712 being convex in a paraxial region thereof. The first lens element 710 is made of a plastic material, and has the object-side surface 711 and the image-side surface 712 being both aspheric. Furthermore, the object-side surface 711 of the first lens element 710 includes two inflection points and one critical point in an off-axis region thereof, and the image-side surface 712 of the first lens element 710 includes two inflection points and one critical point in an off-axis region thereof.

The second lens element 720 with negative refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric. Furthermore, the object-side surface 721 of the second lens element 720 includes one inflection point and one critical point in an off-axis region thereof, and the image-side surface 722 of the second lens element 720 includes one inflection point and one critical point in an off-axis region thereof.

The third lens element 730 with positive refractive power has an object-side surface 731 being convex in a paraxial region thereof and an image-side surface 732 being convex in a paraxial region thereof. The third lens element 730 is made of a plastic material, and has the object-side surface 731 and the image-side surface 732 being both aspheric. Furthermore, the object-side surface 731 of the third lens element 730 includes two inflection points and two critical points in an off-axis region thereof, and the image-side surface 732 of the third lens element 730 includes one inflection point in an off-axis region thereof.

The fourth lens element 740 with negative refractive power has an object-side surface 741 being concave in a paraxial region thereof and an image-side surface 742 being convex in a paraxial region thereof. The fourth lens element 740 is made of a plastic material, and has the object-side surface 741 and the image-side surface 742 being both aspheric. Furthermore, the object-side surface 741 of the fourth lens element 740 includes two inflection points in an off-axis region thereof, and the image-side surface 742 of the fourth lens element 740 includes one inflection point and one critical point in an off-axis region thereof.

The fifth lens element 750 with positive refractive power has an object-side surface 751 being convex in a paraxial region thereof and an image-side surface 752 being concave in a paraxial region thereof. The fifth lens element 750 is made of a plastic material, and has the object-side surface 751 and the image-side surface 752 being both aspheric. Furthermore, the object-side surface 751 of the fifth lens element 750 includes two inflection points and one critical point in an off-axis region thereof, and the image-side surface 752 of the fifth lens element 750 includes two inflection points and one critical point in an off-axis region thereof.

The filter 760 is made of a glass material, which is located between the fifth lens element 750 and the image surface 770 in order, and will not affect the focal length of the imaging optical lens assembly.

The detailed optical data of the 7th embodiment are shown in Table 13 and the aspheric surface data are shown in Table 14 below.

TABLE 13

7th Embodiment
f = 3.41 mm, Fno = 1.12, HFOV = 39.0 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Lens 1 | −1.971 | ASP | 0.330 | Plastic | 1.640 | 19.5 | 12.16 |
| 2 | | −1.676 | ASP | 0.030 | | | | |
| 3 | Lens 2 | 2.198 | ASP | 0.580 | Plastic | 1.640 | 19.5 | −36.36 |
| 4 | | 1.802 | ASP | 0.181 | | | | |
| 5 | Ape. Stop | Plano | | 0.640 | | | | |
| 6 | Lens 3 | 3.070 | ASP | 1.018 | Plastic | 1.640 | 19.5 | 3.71 |
| 7 | | −9.182 | ASP | 0.860 | | | | |
| 8 | Lens 4 | −0.990 | ASP | 0.370 | Plastic | 1.640 | 19.5 | −27.26 |
| 9 | | −1.202 | ASP | −0.138 | | | | |
| 10 | Stop | Plano | | 0.181 | | | | |
| 11 | Lens 5 | 1.472 | ASP | 0.520 | Plastic | 1.640 | 19.5 | 32.61 |
| 12 | | 1.366 | ASP | 0.847 | | | | |
| 13 | Filter | Plano | | 0.210 | Glass | 1.508 | 64.2 | — |
| 14 | | Plano | | 0.151 | | | | |
| 15 | Image | Plano | | — | | | | |

Reference wavelength is 940.0 nm.

Effective radius of Surface 10 (stop 701) is 2.170 mm.

TABLE 14

Aspheric Coefficients

| Surface # | 1 | 2 | 3 | 4 | 6 |
|---|---|---|---|---|---|
| k = | −6.4309E+00 | −4.9750E+00 | −1.5260E+01 | −9.5622E+00 | 1.4268E+00 |
| A4 = | 2.9576E−02 | 5.3785E−02. | 9.7342E−02 | −3.4824E−02 | −1.8778E−02 |
| A6 = | −1.7964E−02 | −5.0410E−02 | −1.3748E−01 | 2.7714E−02 | −8.6802E−03 |
| A8 = | 2.8641E−02 | 8.1873E−02 | 1.5318E−01 | −3.6730E−02 | 1.3073E−02 |
| A10 = | −1.7118E−02 | −6.8632E−02 | −1.1831E−01 | 3.0722E−02 | −1.7992E−02 |
| A12 = | 5.4594E−03 | 3.6945E−02 | 5.9919E−02 | −1.7040E−02 | 1.2559E−02 |
| A14 = | −9.7196E−04 | −1.2491E−02 | −1.9072E−02 | 5.7782E−03 | −5.3583E−03 |
| A16 = | 9.0565E−05 | 2.4029E−03 | 3.4528E−03 | −1.0799E−03 | 1.2156E−03 |
| A18 = | −3.4952E−06 | −1.9756E−04 | −2.7295E−04 | 8.4089E−05 | −1.0832E−04 |

| Surface # | 7 | 8 | 9 | 11 | 12 |
|---|---|---|---|---|---|
| k = | −1.4659E+01 | −1.0003E+00 | −1.0000E+00 | −1.6752E+00 | −7.3802E−01 |
| A4 = | −1.6195E−02 | 2.2166E−01 | 2.7227E−04 | −2.4297E−01 | −2.3959E−01 |
| A6 = | 6.9920E−03 | −4.5207E−01 | 7.3756E−02 | 2.2265E−01 | 1.4912E−01 |
| A8 = | −1.8484E−02 | 4.9657E−01 | −1.7460E−01 | −1.6397E−01 | −8.4888E−02 |
| A10 = | 1.3434E−02 | −2.4620E−01 | 2.3953E−01 | 8.6151E−02 | 3.4791E−02 |
| A12 = | −6.3446E−03 | 4.1382E−02 | −1.6051E−01 | −3.1227E−02 | −9.9351E−03 |
| A14 = | 2.0563E−03 | 1.3280E−02 | 6.0227E−02 | 7.5284E−03 | 1.8991E−03 |
| A16 = | −3.9796E−04 | −7.9168E−03 | −1.3150E−02 | −1.1452E−03 | −2.3117E−04 |
| A18 = | 3.4339E−05 | 1.4913E−03 | 1.5719E−03 | 9.8971E−05 | 1.6176E−05 |
| A20 = | | −1.0293E−04 | −7.9792E−05 | −3.6851E−06 | −4.9648E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.41 | CT3/(T23 + T34) | 0.61 |
| Fno | 1.12 | (T23 + T34)/ | 23.03 |
| | | (T12 + T45) | |
| HFOV [deg.] | 39.0 | T23/T34 | 0.95 |
| Nd1 | 1.669 | T34/T12 | 28.67 |
| Nd2 | 1.669 | TD/BL | 3.79 |
| Nd3 | 1.669 | TD/EPD | 1.49 |
| Nd4 | 1.669 | TL/F | 1.69 |
| Nd5 | 1.669 | TL/ImgH | 2.06 |
| Vd1 | 19.5 | R2/f | −0.49 |
| Vd2 | 19.5 | R4/f | 0.53 |
| Vd3 | 19.5 | (R5 + R6)/ | −0.50 |
| | | (R5 − R6) | |
| Vd4 | 19.5 | R8/f | −0.35 |
| Vd5 | 19.5 | 1/|f3/f1 + f3/f2 + | 5.53 |
| | | f3/f4 + f3/f5| | |
| Vd1 + Vd2 + | 97.5 | f/f12 | 0.22 |
| Vd3 + Vd4 + Vd5 | | | |
| ΣAT/T34 | 2.04 | f/f45 | −0.02 |
| ΣCT/ΣAT | 1.61 | f/R7 | −3.45 |
| ΣCT/CT3 | 2.77 | f3/f | 1.09 |
| (CT2 + CT3 + CT4)/ | 1.17 | f3/f4 | −0.14 |
| (T23 + T34) | | | |
| (CT3 + CT4)/T34 | 1.61 | f3/f5 | 0.11 |
| CT3/CT1 | 3.08 | Yc52/Y52 | 0.70 |

<8th Embodiment>

Figure 15:
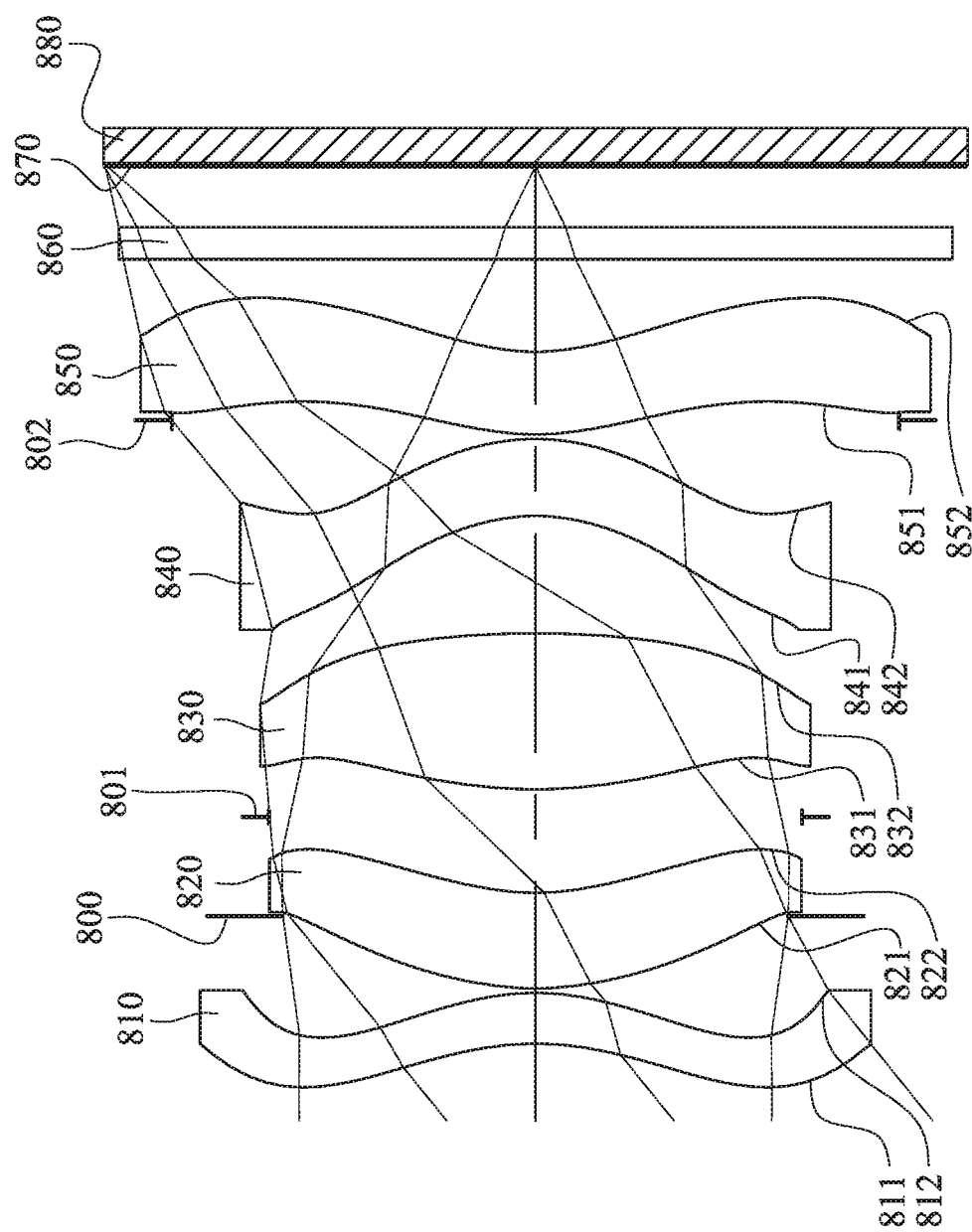
FIG. 15 is a schematic view of an imaging apparatus according to the 8th embodiment of the present disclosure.
Figure 16:
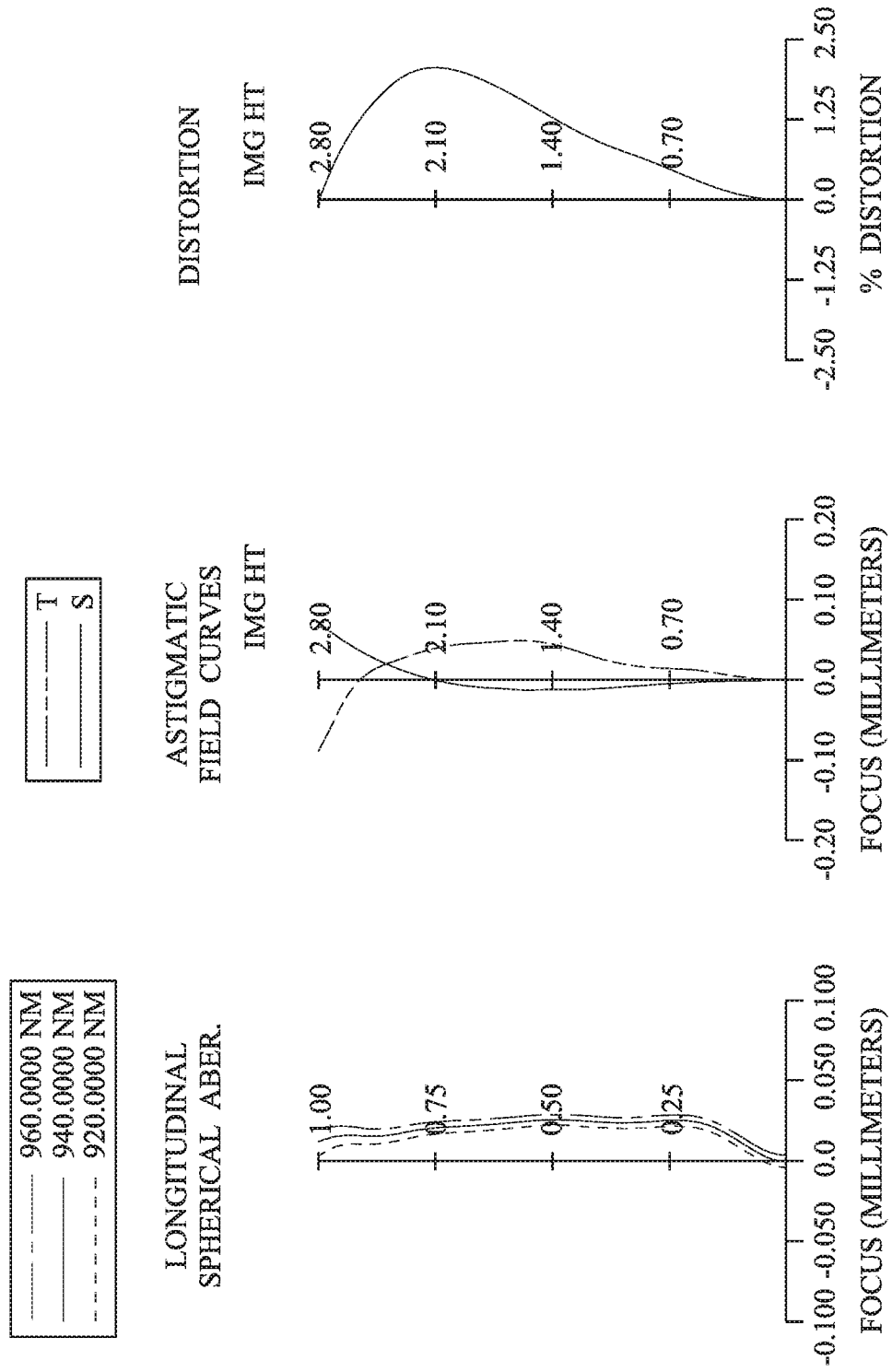
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes an imaging optical lens assembly (its reference numeral is omitted) and an image sensor 880. The imaging optical lens assembly includes, in order from an object side to an image side along an optical path, a first lens element 810, an aperture stop 800, a second lens element 820, a stop 801, a third lens element 830, a fourth lens element 840, a stop 802, a fifth lens element 850, a filter 860 and an image surface 870, wherein the image sensor 880 is disposed on the image surface 870 of the imaging optical lens assembly. The imaging optical lens assembly includes five lens elements (810, 820, 830, 840, 850) without additional one or more lens elements inserted between the first lens element 810 and the fifth lens element 850.

The first lens element 810 with positive refractive power has an object-side surface 811 being concave in a paraxial region thereof and an image-side surface 812 being convex in a paraxial region thereof. The first lens element 810 is made of a plastic material, and has the object-side surface 811 and the image-side surface 812 being both aspheric. Furthermore, the object-side surface 811 of the first lens element 810 includes two inflection points and one critical point in an off-axis region thereof, and the image-side surface 812 of the first lens element 810 includes two inflection points and one critical point in an off-axis region thereof.

The second lens element 820 with negative refractive power has an object-side surface 821 being convex in a paraxial region thereof and an image-side surface 822 being concave in a paraxial region thereof. The second lens element 820 is made of a plastic material, and has the object-side surface 821 and the image-side surface 822 being both aspheric. Furthermore, the object-side surface 821 of the second lens element 820 includes one inflection point in an off-axis region thereof, and the image-side surface 822 of the second lens element 820 includes one inflection point and one critical point in an off-axis region thereof.

The third lens element 830 with positive refractive power has an object-side surface 831 being convex in a paraxial region thereof and an image-side surface 832 being convex in a paraxial region thereof. The third lens element 830 is made of a plastic material, and has the object-side surface 831 and the image-side surface 832 being both aspheric. Furthermore, the object-side surface 831 of the third lens element 830 includes two inflection points and one critical point in an off-axis region thereof, and the image-side surface 832 of the third lens element 830 includes one inflection point in an off-axis region thereof.

The fourth lens element 840 with negative refractive power has an object-side surface 841 being concave in a paraxial region thereof and an image-side surface 842 being convex in a paraxial region thereof. The fourth lens element 840 is made of a plastic material, and has the object-side surface 841 and the image-side surface 842 being both aspheric. Furthermore, the object-side surface 841 of the fourth lens element 840 includes two inflection points in an off-axis region thereof, and the image-side surface 842 of the fourth lens element 840 includes one inflection point and one critical point in an off-axis region thereof.

The fifth lens element 850 with negative refractive power has an object-side surface 851 being convex in a paraxial region thereof and an image-side surface 852 being concave in a paraxial region thereof. The fifth lens element 850 is made of a plastic material, and has the object-side surface 851 and the image-side surface 852 being both aspheric. Furthermore, the object-side surface 851 of the fifth lens element 850 includes two inflection points and two critical points in an off-axis region thereof, and the image-side surface 852 of the fifth lens element 850 includes two inflection points and one critical point in an off-axis region thereof.

The filter 860 is made of a glass material, which is located between the fifth lens element 850 and the image surface 870 in order, and will not affect the focal length of the imaging optical lens assembly.

The detailed optical data of the 8th embodiment are shown in Table 15 and the aspheric surface data are shown in Table 16 below.

TABLE 15

8th Embodiment
f = 3.41 mm, Fno = 1.12, HFOV = 39.0 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Lens 1 | −1.898 | ASP | 0.330 | Plastic | 1.634 | 20.4 | 11.53 |
| 2 | | −1.609 | ASP | 0.499 | | | | |
| 3 | Ape. Stop | Plano | | −0.469 | | | | |
| 4 | Lens 2 | 2.058 | ASP | 0.620 | Plastic | 1.634 | 20.4 | −33.84 |
| 5 | | 1.659 | ASP | 0.493 | | | | |
| 6 | Stop | Plano | | 0.180 | | | | |
| 7 | Lens 3 | 3.296 | ASP | 1.013 | Plastic | 1.634 | 20.4 | 3.61 |
| 8 | | −6.588 | ASP | 0.762 | | | | |
| 9 | Lens 4 | −1.275 | ASP | 0.500 | Plastic | 1.634 | 20.4 | −14086.26 |
| 10 | | −1.469 | ASP | 0.122 | | | | |
| 11 | Stop | Plano | | −0.092 | | | | |
| 12 | Lens 5 | 1.739 | ASP | 0.537 | Plastic | 1.634 | 20.4 | −65.38 |
| 13 | | 1.469 | ASP | 0.600 | | | | |
| 14 | Filter | Plano | | 0.210 | Glass | 1.508 | 64.2 | — |
| 15 | | Plano | | 0.402 | | | | |
| 16 | Image | Plano | | — | | | | |

Reference wavelength is 940.0 nm.
Effective radius of Surface 6 (stop 801) is 1.730 mm.
Effective radius of Surface 11 (stop 802) is 2.360 mm.

TABLE 16

Aspheric Coefficients

| Surface # | 1 | 2 | 4 | 5 | 7 |
|---|---|---|---|---|---|
| k = | −7.5501E+00 | −1.0000E+00 | −1.4823E+01 | −8.5519E+00 | 7.8277E−01 |
| A4 = | −1.8394E−02 | 1.2876E−01 | 1.2768E−01 | −1.3243E−03 | −1.7074E−02 |
| A6 = | 1.6483E−02 | −9.1148E−02 | −1.6881E−01 | −1.2903E−02 | −1.5193E−02 |
| A8 = | 6.5218E−03 | 9.2476E−02 | 1.8711E−01 | 1.4286E−02 | 3.3623E−02 |
| A10 = | −6.4036E−03 | −6.2615E−02 | −1.4495E−01 | −1.3339E−02 | −4.5616E−02 |
| A12 = | 2.1058E−03 | 2.8855E−02 | 7.3922E−02 | 7.1262E−03 | 3.2723E−02 |
| A14 = | −3.5843E−04 | −8.5570E−03 | −2.3689E−02 | −2.3408E−03 | −1.3603E−02 |
| A16 = | 3.2583E−05 | 1.4566E−03 | 4.3115E−03 | 4.2167E−04 | 2.9766E−03 |
| A18 = | −1.3433E−06 | −1.0638E−04 | −3.4273E−04 | −3.2040E−05 | −2.5861E−04 |

| Surface # | 8 | 9 | 10 | 12 | 13 |
|---|---|---|---|---|---|
| k = | −1.6158E+01 | −8.2084E−01 | −1.0000E+00 | −1.0000E+00 | −1.0000E+00 |
| A4 = | −1.9156E−02 | 1.3512E−01 | 4.8544E−03 | −2.0091E−01 | −1.8623E−01 |
| A6 = | 2.9291E−03 | −2.3477E−01 | 4.1578E−02 | 1.3117E−01 | 9.6616E−02 |
| A8 = | −1.2924E−02 | 2.6679E−01 | −6.3819E−02 | −8.1256E−02 | −4.3186E−02 |
| A10 = | 1.2529E−02 | −1.6571E−01 | 7.6382E−02 | 3.9070E−02 | 1.4017E−02 |
| A12 = | −7.6157E−03 | 7.0810E−02 | −4.5694E−02 | −1.3401E−02 | −3.0809E−03 |
| A14 = | 2.8367E−03 | 2.3378E−02 | 1.5751E−02 | 3.0965E−03 | 4.2240E−04 |
| A16 = | −5.8133E−04 | 5.7121E−03 | −3.3253E−03 | −4.5108E−04 | −3.1314E−05 |
| A18 = | 5.1338E−05 | −8.5525E−04 | 4.0465E−04 | 3.7098E−05 | 7.8348E−07 |
| A20 = | | 5.3804E−05 | −2.1638E−05 | −1.3062E−06 | 1.8778E−08 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.41 | CT3/(T23 + T34) | 0.71 |
| Fno | 1.12 | (T23 + T34)/(T12 + T45) | 23.92 |

| 8th Embodiment | | | |
|---|---|---|---|
| HFOV [deg.] | 39.0 | T23/T34 | 0.88 |
| Nd1 | 1.660 | T34/T12 | 25.40 |
| Nd2 | 1.660 | TD/BL | 3.71 |
| Nd3 | 1.660 | TD/EPD | 1.46 |
| Nd4 | 1.660 | TL/f | 1.67 |
| Nd5 | 1.660 | TL/ImgH | 2.04 |
| Vd1 | 20.4 | R2/f | −0.47 |
| Vd2 | 20.4 | R4/f | 0.49 |
| Vd3 | 20.4 | (R5 + R6)/(R5 − R6) | −0.33 |
| Vd4 | 20.4 | R8/f | −0.43 |
| Vd5 | 20.4 | $\|1/f3/f1 + f3/f2 + f3/f4 + f3/f5\|$ | 6.63 |
| Vd1 + Vd2 + Vd3 + Vd4 + Vd5 | 102.0 | f/f12 | 0.23 |

-continued

| 8th Embodiment | | | |
|---|---|---|---|
| ΣAT/T34 | 1.96 | f/f45 | −0.06 |
| ΣCT/ΣAT | 2.01 | f/R7 | −2.68 |
| ΣCT/CT3 | 2.96 | f3/f | 1.06 |
| (CT2 +CT3 + CT4)/(T23 +T34) | 1.49 | f3/f4 | −2.56E−4 |
| (CT3 + CT4)/T34 | 1.99 | f3/f5 | −0.06 |
| CT3/CT1 | 3.07 | Yc52/Y52 | 0.70 |

<9th Embodiment>

Figure 17:
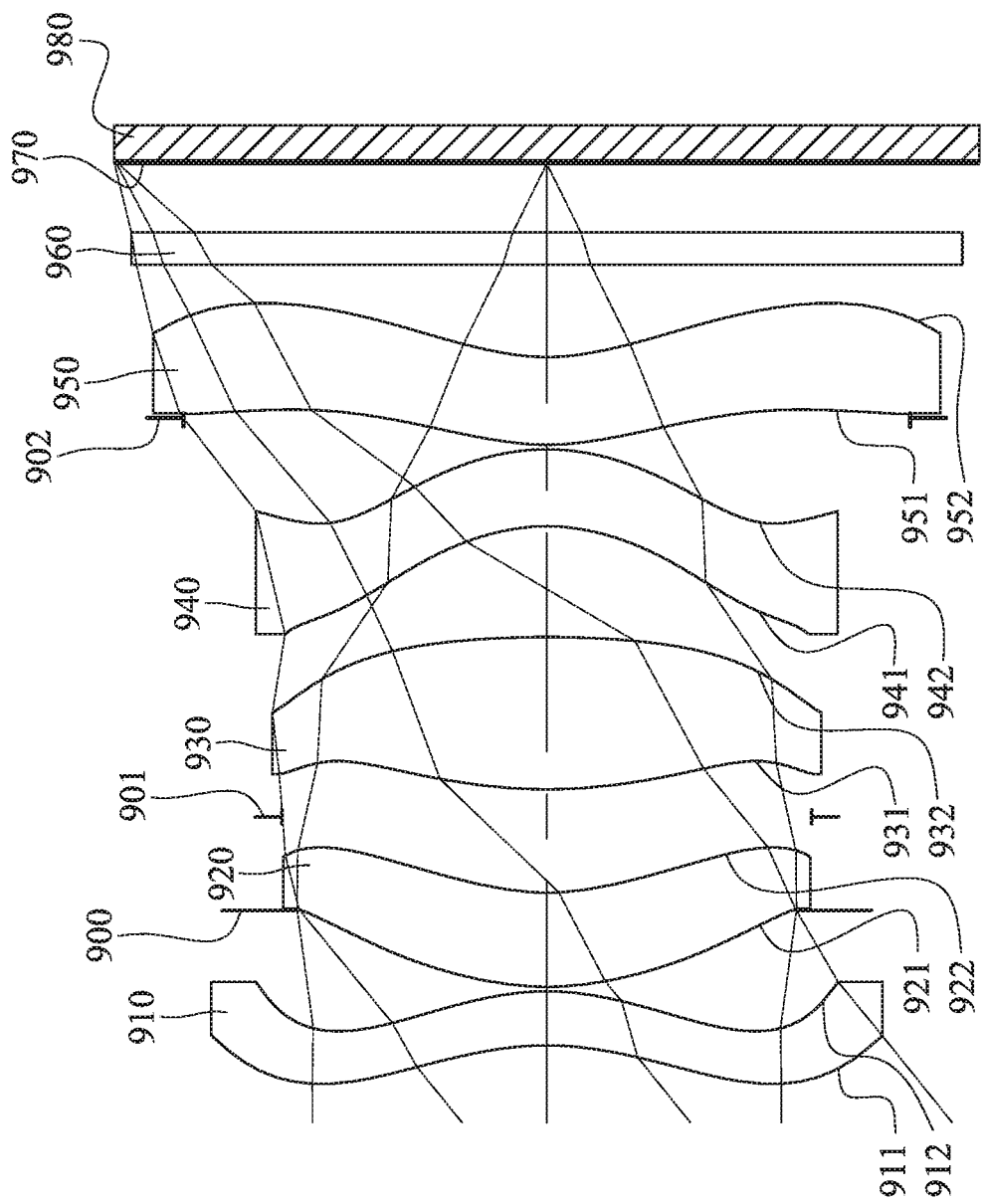
FIG. 17 is a schematic view of an imaging apparatus according to the 9th embodiment of the present disclosure.
Figure 18:
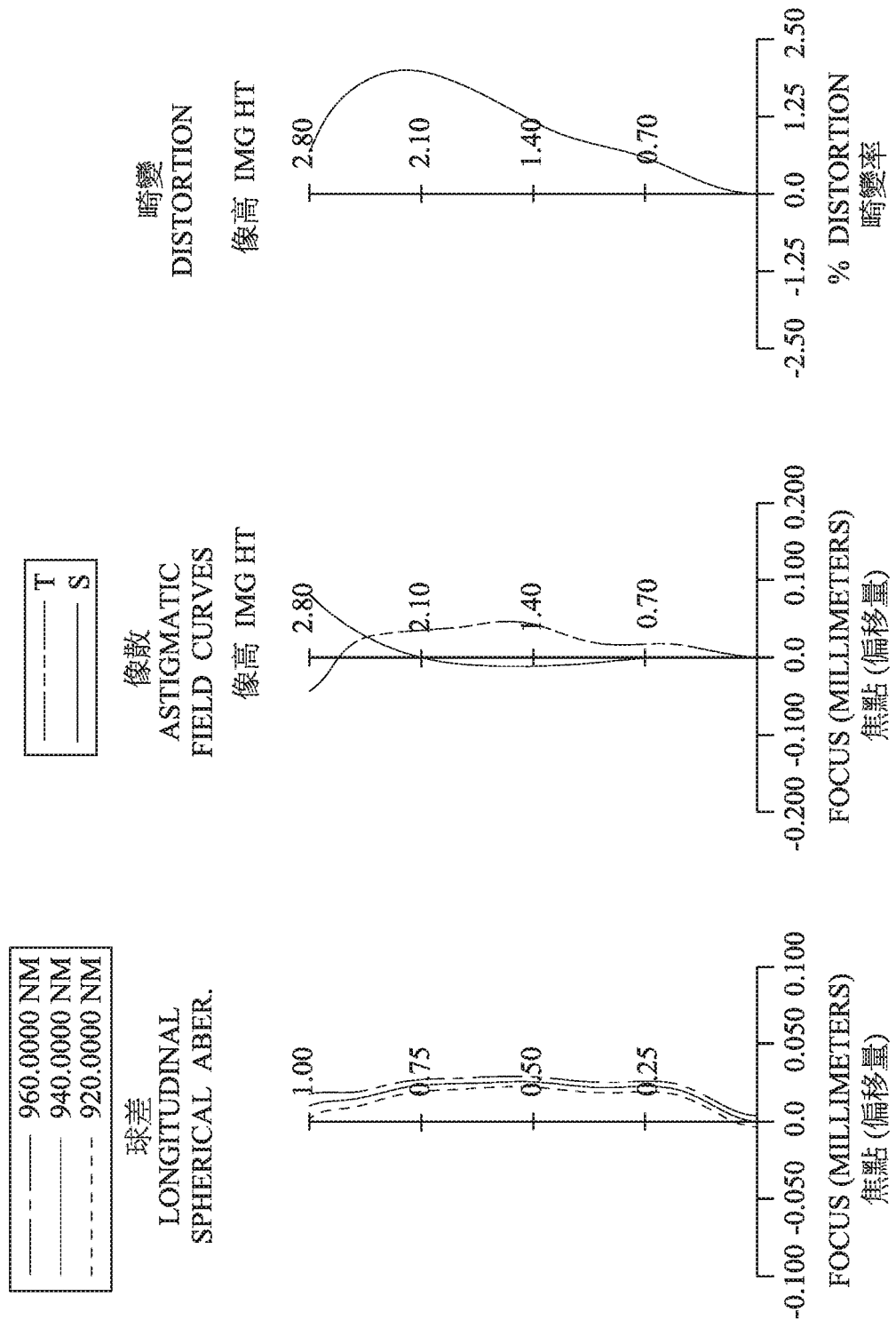
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes an imaging optical lens assembly (its reference numeral is omitted) and an image sensor 980. The imaging optical lens assembly includes, in order from an object side to an image side along an optical path, a first lens element 910, an aperture stop 900, a second lens element 920, a stop 901, a third lens element 930, a fourth lens element 940, a stop 902, a fifth lens element 950, a filter 960 and an image surface 970, wherein the image sensor 980 is disposed on the image surface 970 of the imaging optical lens assembly. The imaging optical lens assembly includes five lens elements (910, 920, 930, 940, 950) without additional one or more lens elements inserted between the first lens element 910 and the fifth lens element 950.

The first lens element 910 with positive refractive power has an object-side surface 911 being concave in a paraxial region thereof and an image-side surface 912 being convex in a paraxial region thereof. The first lens element 910 is made of a plastic material, and has the object-side surface 911 and the image-side surface 912 being both aspheric. Furthermore, the object-side surface 911 of the first lens element 910 includes two inflection points and one critical point in an off-axis region thereof, and the image-side surface 912 of the first lens element 910 includes two inflection points and one critical point in an off-axis region thereof.

The second lens element 920 with negative refractive power has an object-side surface 921 being convex in a paraxial region thereof and an image-side surface 922 being concave in a paraxial region thereof. The second lens element 920 is made of a plastic material, and has the object-side surface 921 and the image-side surface 922 being both aspheric. Furthermore, the object-side surface 921 of the second lens element 920 includes one inflection point in an off-axis region thereof, and the image-side surface 922 of the second lens element 920 includes one inflection point and one critical point in an off-axis region thereof.

The third lens element 930 with positive refractive power has an object-side surface 931 being convex in a paraxial region thereof and an image-side surface 932 being convex in a paraxial region thereof. The third lens element 930 is made of a plastic material, and has the object-side surface 931 and the image-side surface 932 being both aspheric. Furthermore, the object-side surface 931 of the third lens element 930 includes two inflection points and one critical point in an off-axis region thereof, and the image-side surface 932 of the third lens element 930 includes one inflection point in an off-axis region thereof.

The fourth lens element 940 with positive refractive power has an object-side surface 941 being concave in a paraxial region thereof and an image-side surface 942 being convex in a paraxial region thereof. The fourth lens element 940 is made of a plastic material, and has the object-side surface 941 and the image-side surface 942 being both aspheric. Furthermore, the object-side surface 941 of the fourth lens element 940 includes two inflection points in an off-axis region thereof, and the image-side surface 942 of the fourth lens element 940 includes one inflection point and one critical point in an off-axis region thereof.

The fifth lens element 950 with negative refractive power has an object-side surface 951 being convex in a paraxial region thereof and an image-side surface 952 being concave in a paraxial region thereof. The fifth lens element 950 is made of a plastic material, and has the object-side surface 951 and the image-side surface 952 being both aspheric. Furthermore, the object-side surface 951 of the fifth lens element 950 includes two inflection points and two critical points in an off-axis region thereof, and the image-side surface 952 of the fifth lens element 950 includes two inflection points and one critical point in an off-axis region thereof.

The filter 960 is made of a glass material, which is located between the fifth lens element 950 and the image surface 970 in order, and will not affect the focal length of the imaging optical lens assembly.

The detailed optical data of the 9th embodiment are shown in Table 17 and the aspheric surface data are shown in Table 18 below.

TABLE 17

9th Embodiment
f = 3.39 mm, Fno = 1.12, HFOV = 39.0 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Lens 1 | −1.982 | ASP | 0.352 | Plastic | 1.634 | 20.4 | 11.61 |
| 2 | | −1.669 | ASP | 0.525 | | | | |
| 3 | Ape. Stop | Plano | | −0.495 | | | | |
| 4 | Lens 2 | 1.998 | ASP | 0.612 | Plastic | 1.634 | 20.4 | −34.53 |
| 5 | | 1.613 | ASP | 0.492 | | | | |
| 6 | Stop | Plano | | 0.179 | | | | |
| 7 | Lens 3 | 3.394 | ASP | 0.990 | Plastic | 1.634 | 20.4 | 3.73 |
| 8 | | −6.908 | ASP | 0.720 | | | | |
| 9 | Lens 4 | −1.284 | ASP | 0.500 | Plastic | 1.634 | 20.4 | 139.66 |
| 10 | | −1.457 | ASP | 0.205 | | | | |
| 11 | Stop | Plano | | −0.175 | | | | |
| 12 | Lens 5 | 1.745 | ASP | 0.570 | Plastic | 1.634 | 20.4 | −151.11 |
| 13 | | 1.497 | ASP | 0.600 | | | | |

TABLE 17-continued

9th Embodiment
f = 3.39 mm, Fno = 1.12, HFOV = 39.0 deg.

| Surface # | | Curvature Radius | Thickness | Material | Index | Abbe # | Focal Length |
|---|---|---|---|---|---|---|---|
| 14 | Filter | Plano | 0.210 | Glass | 1.508 | 64.2 | — |
| 15 | | Plano | 0.456 | | | | |
| 16 | Image | Plano | — | | | | |

Reference wavelength is 940.0 nm.
Effective radius of Surface 6 (stop 901) is 1.720 mm.
Effective radius of Surface 11 (stop 902) is 2.360 mm.

TABLE 18

Aspheric Coefficients

| Surface # | 1 | 2 | 4 | 5 | 7 |
|---|---|---|---|---|---|
| k = | −8.3452E+00 | −1.0000E+00 | −1.3261E+01 | −7.9731E+00 | 3.3201E−01 |
| A4 = | −7.6849E−03 | 1.4297E−01 | 1.3074E−01 | −3.4873E−08 | −1.4565E−02 |
| A6 = | 1.4890E−02 | −1.0922E−01 | −1.7444E−01 | −2.5809E−03 | −1.7845E−02 |
| A8 = | 1.2365E−03 | 1.1191E−01 | 1.9307E−01 | −2.9856E−03 | 3.7381E−02 |
| A10 = | −2.1275E−03 | −7.9314E−02 | −1.4942E−01 | 2.5072E−03 | −5.0509E−02 |
| A12 = | 5.3725E−04 | 3.8191E−02 | 7.6510E−02 | −1.6497E−03 | 3.6471E−02 |
| A14 = | −4.7020E−05 | −1.1670E−02 | −2.4754E−02 | 5.4171E−04 | −1.5430E−02 |
| A16 = | 6.3499E−07 | 2.0191E−03 | 4.5715E−03 | −9.8370E−05 | 3.4597E−03 |
| A18 = | −2.8645E−08 | −1.4860E−04 | −3.7058E−04 | 7.6822E−06 | −3.0844E−04 |

| Surface # | 8 | 9 | 10 | 12 | 13 |
|---|---|---|---|---|---|
| k = | −8.8678E+00 | −8.3336E−01 | −1.0000E+00 | −1.0000E+00 | −1.0000E+00 |
| A4 = | −1.6174E−02 | 1.5186E−01 | 4.4097E−03 | −2.1316E−01 | −1.8984E−01 |
| A6 = | −3.7018E−03 | −2.9888E−01 | 2.7950E−02 | 1.5636E−01 | 1.0436E−01 |
| A8 = | −5.1645E−03 | 3.7556E−01 | −3.6458E−02 | −1.0238E−01 | −4.8610E−02 |
| A10 = | 4.2891E−03 | −2.7677E−01 | 5.0161E−02 | 5.0396E−02 | 1.6436E−02 |
| A12 = | −2.2636E−03 | 1.4603E−01 | −2.9309E−02 | −1.7424E−02 | −3.8051E−03 |
| A14 = | 8.9863E−04 | −5.6907E−02 | 9.2424E−03 | 4.0277E−03 | 5.6601E−04 |
| A16 = | −2.1592E−04 | 1.5063E−02 | −1.7973E−03 | −5.8511E−04 | −4.9183E−05 |
| A18 = | 2.3256E−05 | −2.3254E−03 | 2.1340E−04 | 4.7916E−05 | 2.0403E−06 |
| A20 = | | 1.5264E−04 | −1.1837E−05 | −1.6786E−06 | −1.9472E−08 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 3.39 | CT3/(T23 + T34) | 0.71 |
| Fno | 1.12 | (T23 + T34)/(T12 + T45) | 23.18 |
| HFOV [deg.] | 39.0 | T23/T34 | 0.93 |
| Nd1 | 1.660 | T34/T12 | 24.00 |
| Nd2 | 1.660 | TD/BL | 3.53 |
| Nd3 | 1.660 | TD/EPD | 1.47 |
| Nd4 | 1.660 | TL/f | 1.69 |
| Nd5 | 1.660 | TL/ImgH | 2.05 |
| Vd1 | 20.4 | R2/f | −0.49 |
| Vd2 | 20.4 | R4/f | 0.48 |
| Vd3 | 20.4 | (R5 + R6)/(R5 − R6) | −0.34 |
| Vd4 | 20.4 | R8/f | −0.43 |
| Vd5 | 20.4 | 1/\|f3/f1 + f3/f2 + f3/f4 + f3/f5\| | 4.65 |
| Vd1 + Vd2 + Vd3 + Vd4 + Vd5 | 102.0 | f/f12 | 0.23 |
| ΣAT/T34 | 2.02 | f/f45 | 2.04E−3 |
| ΣCT/ΣAT | 2.08 | f/R7 | −2.64 |
| ΣCT/CT3 | 3.05 | f3/f | 1.10 |
| (CT2 + CT3 + CT4)/(T23 + T34) | 1.51 | f3/f4 | 0.03 |
| (CT3 + CT4)/T34 | 2.07 | f3/f5 | −0.02 |
| CT3/CT1 | 2.81 | Yc52/Y52 | 0.72 |

<10th Embodiment>

Figure 19:
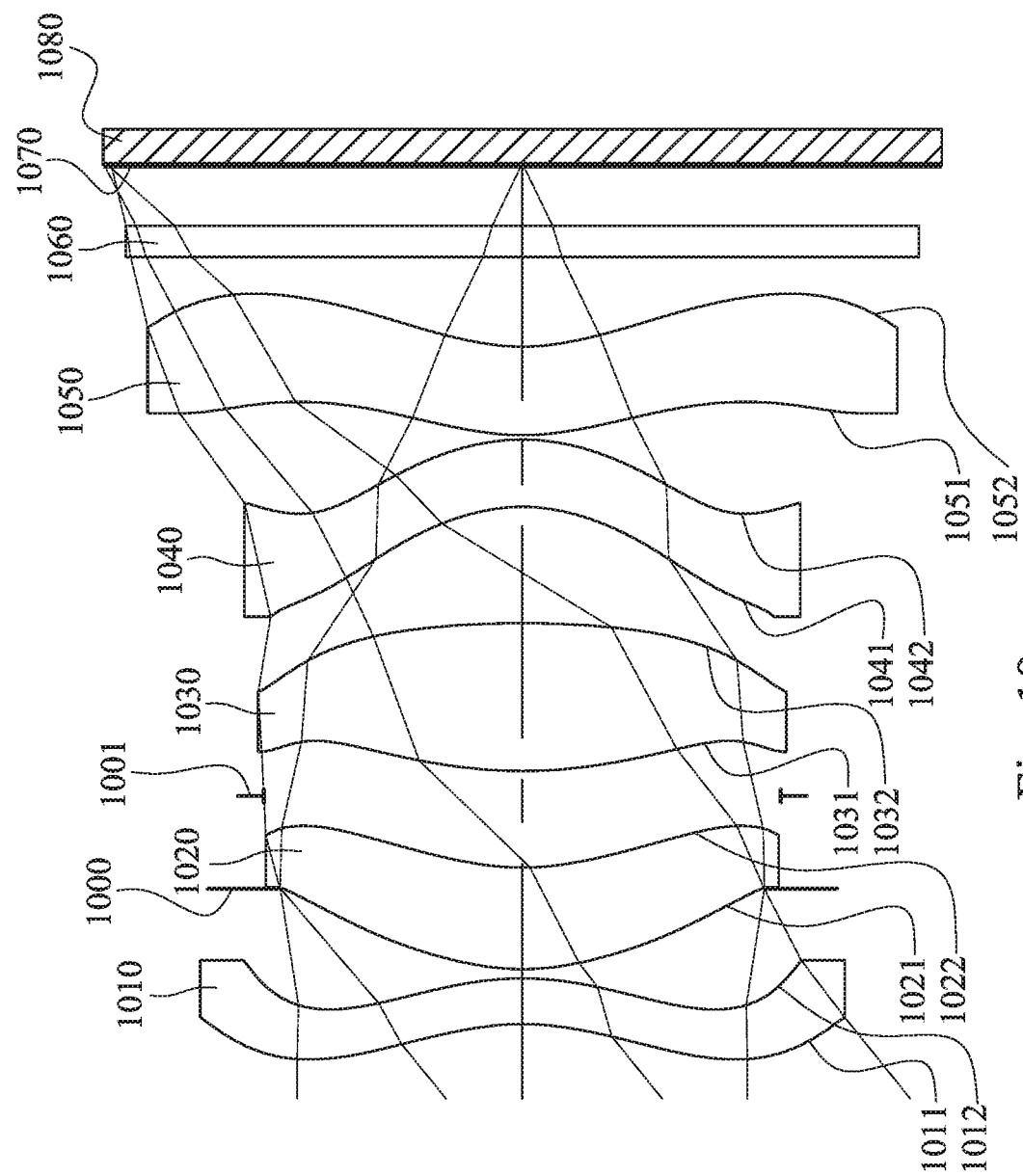
FIG. 19 is a schematic view of an imaging apparatus according to the 10th embodiment of the present disclosure.
Figure 20:
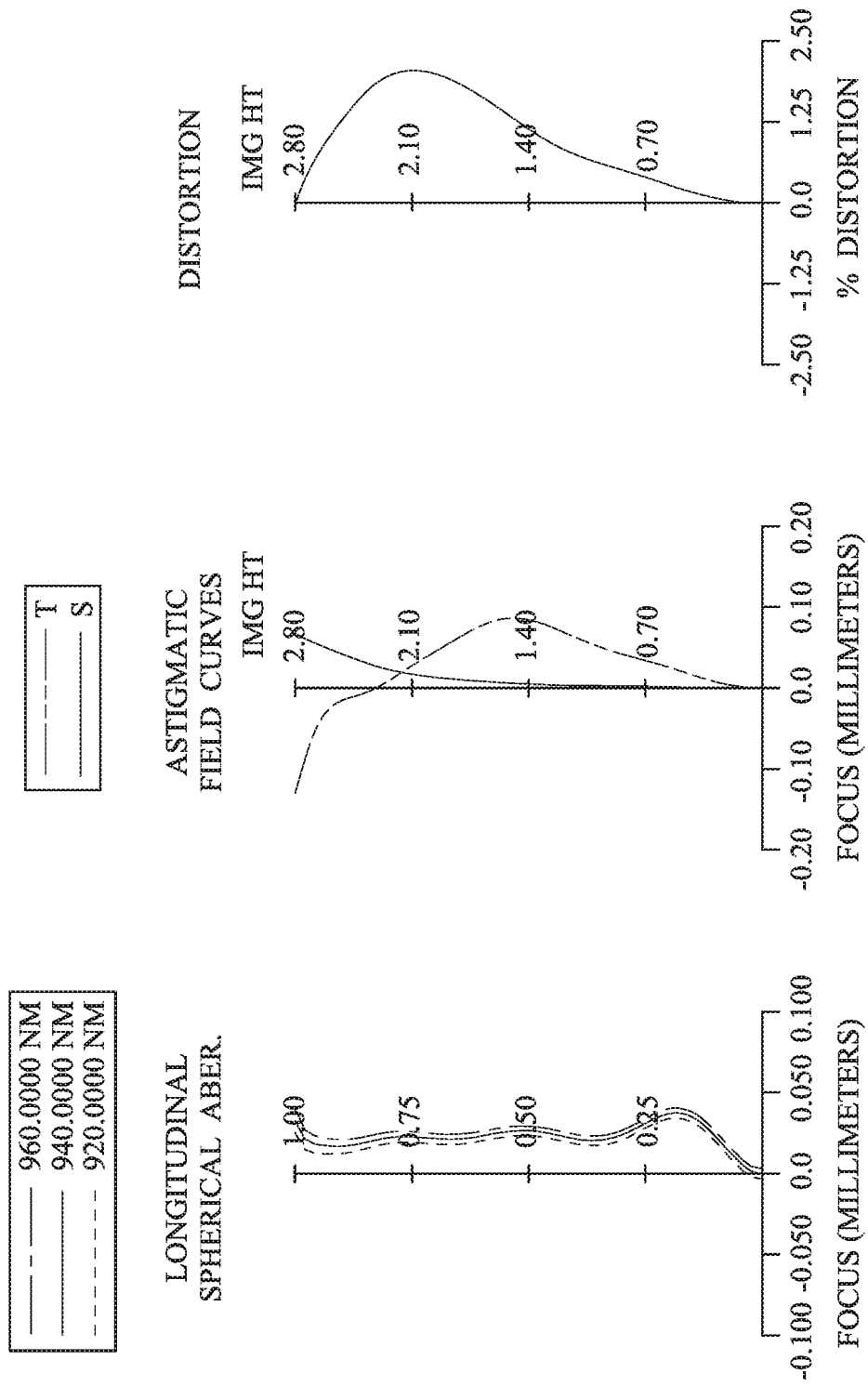
FIG. 20 shows spherical aberration curves, astigmatic field curves and a distortion curve of the imaging apparatus according to the 10th embodiment.

FIG. 19 is a schematic view of an imaging apparatus according to the 10th embodiment of the present disclosure. FIG. 20 shows spherical aberration curves, astigmatic field curves and a distortion curve of the imaging apparatus according to the 10th embodiment. In FIG. 19, the imaging apparatus includes an imaging optical lens assembly (its reference numeral is omitted) and an image sensor 1080. The imaging optical lens assembly includes, in order from an object side to an image side along an optical path, a first lens element 1010, an aperture stop 1000, a second lens element 1020, a stop 1001, a third lens element 1030, a fourth lens element 1040, a fifth lens element 1050, a filter 1060 and an image surface 1070, wherein the image sensor 1080 is disposed on the image surface 1070 of the imaging optical lens assembly. The imaging optical lens assembly includes five lens elements (1010, 1020, 1030, 1040, 1050) without additional one or more lens elements inserted between the first lens element 1010 and the fifth lens element 1050.

The first lens element 1010 with negative refractive power has an object-side surface 1011 being concave in a paraxial region thereof and an image-side surface 1012 being convex in a paraxial region thereof. The first lens element 1010 is made of a plastic material, and has the object-side surface 1011 and the image-side surface 1012 being both aspheric. Furthermore, the object-side surface 1011 of the first lens element 1010 includes two inflection points and one critical point in an off-axis region thereof, and the image-side surface 1012 of the first lens element 1010 includes two inflection points and one critical point in an off-axis region thereof.

The second lens element 1020 with positive refractive power has an object-side surface 1021 being convex in a paraxial region thereof and an image-side surface 1022 being concave in a paraxial region thereof. The second lens element 1020 is made of a plastic material, and has the object-side surface 1021 and the image-side surface 1022 being both aspheric.

Furthermore, the object-side surface 1021 of the second lens element 1020 includes one inflection point in an off-axis region thereof, and the image-side surface 1022 of the second lens element 1020 includes one inflection point and one critical point in an off-axis region thereof.

The third lens element 1030 with positive refractive power has an object-side surface 1031 being convex in a paraxial region thereof and an image-side surface 1032 being convex in a paraxial region thereof. The third lens element 1030 is made of a plastic material, and has the object-side surface 1031 and the image-side surface 1032 being both aspheric. Furthermore, the object-side surface 1031 of the third lens element 1030 includes two inflection points and one critical point in an off-axis region thereof, and the image-side surface 1032 of the third lens element 1030 includes one Inflection point in an off-axis region thereof.

The fourth lens element 1040 with negative refractive power has an object-side surface 1041 being concave in a paraxial region thereof and an image-side surface 1042 being convex in a paraxial region thereof. The fourth lens element 1040 is made of a plastic material, and has the object-side surface 1041 and the image-side surface 1042 being both aspheric. Furthermore, the object-side surface 1041 of the fourth lens element 1040 includes two inflection points in an off-axis region thereof, and the image-side surface 1042 of the fourth lens element 1040 includes one inflection point and one critical point in an off-axis region thereof.

The fifth lens element 1050 with positive refractive power has an object-side surface 1051 being convex in a paraxial region thereof and an image-side surface 1052 being concave in a paraxial region thereof. The fifth lens element 1050 is made of a plastic material, and has the object-side surface 1051 and the image-side surface 1052 being both aspheric. Furthermore, the object-side surface 1051 of the fifth lens element 1050 includes two inflection points and two critical points in an off-axis region thereof, and the image-side surface 1052 of the fifth lens element 1050 includes two inflection points and one critical point in an off-axis region thereof.

The filter 1060 is made of a glass material, which is located between the fifth lens element 1050 and the image surface 1070 in order, and will not affect the focal length of the imaging optical lens assembly.

The detailed optical data of the 10th embodiment are shown in Table 19 and the aspheric surface data are shown in Table 20 below.

TABLE 19

10th Embodiment
f = 3.42 mm, Fno = 1.14, HFOV = 39.0 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Lens 1 | −1.758 | ASP | 0.306 | Plastic | 1.617 | 23.5 | −39.26 |
| 2 | | −2.022 | ASP | 0.601 | | | | |
| 3 | Ape. Stop | Plano | | −0.539 | | | | |
| 4 | Lens 2 | 1.621 | ASP | 0.681 | Plastic | 1.617 | 23.5 | 11.22 |
| 5 | | 1.778 | ASP | 0.480 | | | | |
| 6 | Stop | Plano | | 0.167 | | | | |
| 7 | Lens 3 | 3.253 | ASP | 0.991 | Plastic | 1.617 | 23.5 | 3.70 |
| 8 | | −6.785 | ASP | 0.780 | | | | |
| 9 | Lens 4 | −1.192 | ASP | 0.450 | Plastic | 1.617 | 23.5 | −42.60 |
| 10 | | −1.429 | ASP | 0.030 | | | | |
| 11 | Lens 5 | 1.690 | ASP | 0.593 | Plastic | 1.617 | 23.5 | 67.01 |
| 12 | | 1.526 | ASP | 0.600 | | | | |
| 13 | Filter | Plano | | 0.210 | Glass | 1.508 | 64.2 | — |
| 14 | | Plano | | 0.407 | | | | |
| 15 | Image | Plano | | — | | | | |

Reference wavelength is 940.0 nm.
Effective radius of Surface 6 (stop 1001) is 1.730 mm.

TABLE 20

| Aspheric Coefficients | | | | | |
|---|---|---|---|---|---|
| Surface # | 1 | 2 | 4 | 5 | 7 |
| k = | −1.0067E+01 | −1.0000E+00 | −1.2336E+01 | −8.0351E+00 | 6.6348E−01 |
| A4 = | −5.1224E−03 | 6.9185E−02 | 1.3565E−01 | 7.4997E−03 | −7.7540E−03 |
| A6 | 1.1734E−02 | 1.5230E−02 | −1.9403E−01 | −3.1668E−02 | −4.5406E−02 |
| A8 = | 7.5430E−03 | −2.3902E−02 | 2.3086E−01 | 3.6322E−02 | 8.8001E−02 |
| A10 = | −7.3095E−03 | 1.8338E−02 | −1.8882E−01 | −2.9710E−02 | −1.0357E−01 |
| A12 = | 2.6110E−03 | −6.8888E−03 | 1.0056E−01 | 1.4700E−02 | 6.9305E−02 |
| A14 = | −4.8370E−04 | 1.0228E−03 | −3.3330E−02 | −4.4341E−03 | −2.7200E−02 |
| A16 = | 4.6499E−05 | 5.5036E−05 | 6.2303E−03 | 7.3264E−04 | 5.6968E−03 |
| A18 = | −1.9017E−06 | −2.1686E−05 | −5.0507E−04 | −5.0997E−05 | −4.8170E−04 |
| Surface # | 8 | 9 | 10 | 11 | 12 |
| k = | −1.4799E+01 | −8.6827E−01 | −1.0000E+00 | −1.0000E+00 | −1.0000E+00 |
| A4 = | −1.9078E−02 | 1.8715E−01 | 2.1184E−02 | −2.0244E−01 | −1.6382E−01 |
| A6 = | 8.7855E−03 | −3.4334E−01 | −4.1903E−03 | 1.3281E−01 | 7.6098E−02 |
| AB = | −2.3749E−02 | 4.3654E−01 | 6.5649E−03 | −8.1444E−02 | −2.8871E−02 |
| A10 = | 2.2119E−02 | −3.6619E−01 | 3.9366E−03 | 3.6934E−02 | 6.8112E−03 |
| A12 = | −1.3319E−02 | 2.3269E−01 | 3.2474E−03 | −1.1551E−02 | −6.5499E−04 |
| A14 = | 5.0177E−03 | −1.0638E−01 | −4.6759E−03 | 2.3949E−03 | −1.0133E−04 |
| A16 = | −1.0515E−03 | 3.1333E−02 | 1.6970E−03 | −3.1129E−04 | 3.7750E−05 |
| A18 = | 9.4560E−05 | −5.1880E−03 | −2.6098E−04 | 2.2846E−05 | −4.2627E−06 |
| A20 = | | 3.6132E−04 | 1.5021E−05 | −7.2007E−07 | 1.7513E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 3.42 | CT3/(T23 + T34) | 0.69 |
| Fno | 1.14 | (T23 + T34)/(T12 + T45) | 15.51 |
| HFOV [deg.] | 39.0 | T23/T34 | 0.83 |
| Nd1 | 1.639 | T34/T12 | 12.58 |
| Nd2 | 1.639 | TD/BL | 3.73 |
| Nd3 | 1.639 | TD/EPD | 1.50 |
| Nd4 | 1.639 | TL/f | 1.69 |
| Nd5 | 1.639 | TL/ImgH | 2.06 |
| Vd1 | 23.5 | R2/f | −0.59 |
| Vd2 | 23.5 | R4/f | 0.52 |
| Vd3 | 23.5 | (R5 + R6)/(R5 − R6) | −0.35 |
| Vd4 | 23.5 | R8/f | −0.42 |
| Vd5 | 23.5 | 1/\|f3/f1 + f3/f2 + f3/f4 + f3/f5\| | 4.90 |
| Vd1 + Vd2 + Vd3 + Vd4 + Vd5 | 117.5 | f/f12 | 0.23 |
| ΣAT/T34 | 1.95 | f/f45 | −0.03 |
| ΣCT/ΣAT | 1.99 | f/R7 | −2.86 |
| ΣCT/CT3 | 3.05 | f3/f | 1.08 |
| (CT2 + CT3 + CT4)/(T23 + T34) | 1.49 | f3/f4 | −0.09 |
| (CT3 + CT4)/T34 | 1.85 | f3/f5 | 0.06 |
| CT3/CT1 | 3.24 | Yc52/Y52 | 0.72 |

<11th Embodiment>

Figure 21:
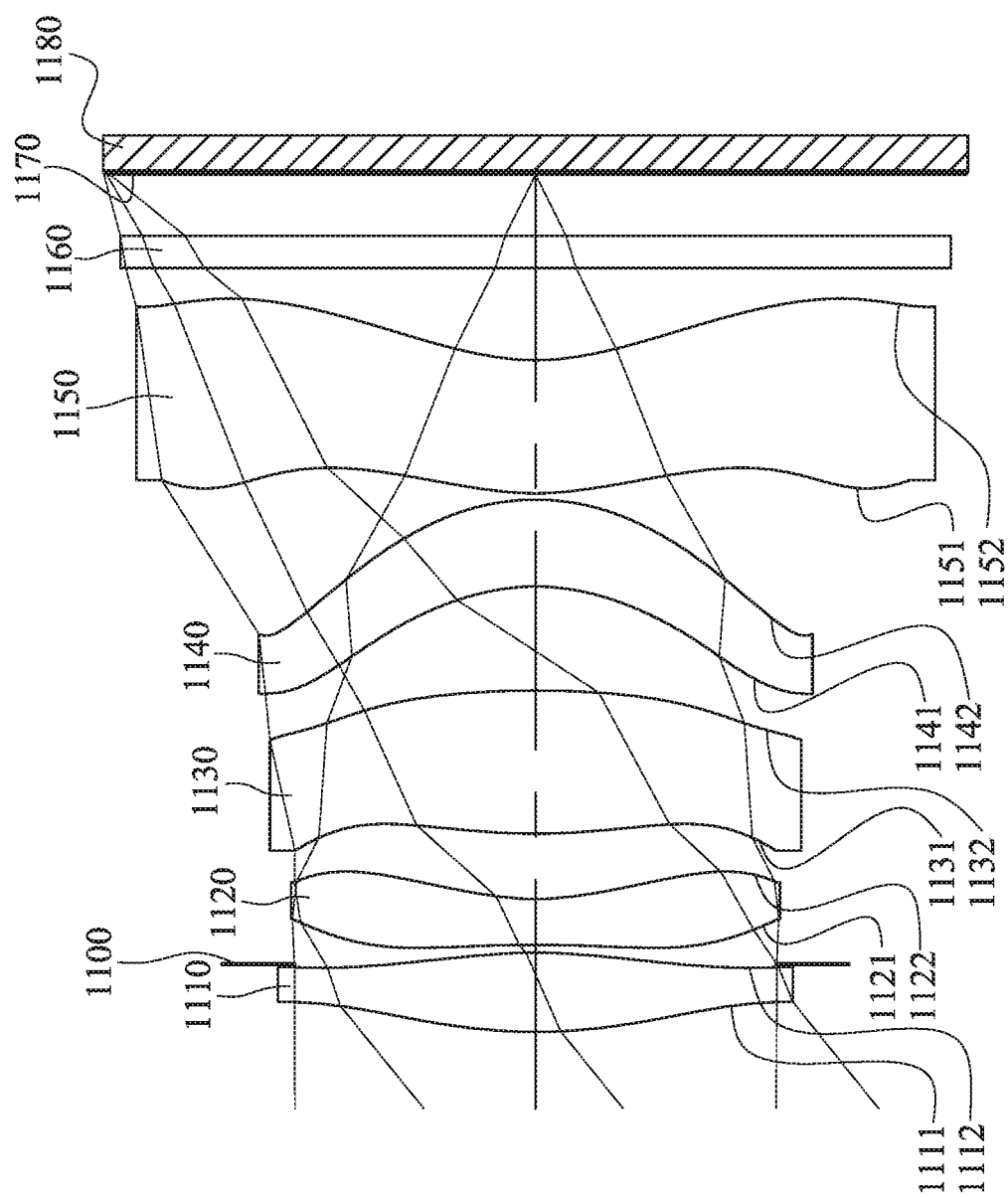
FIG. 21 is a schematic view of an imaging apparatus according to the 11th embodiment of the present disclosure.
Figure 22:
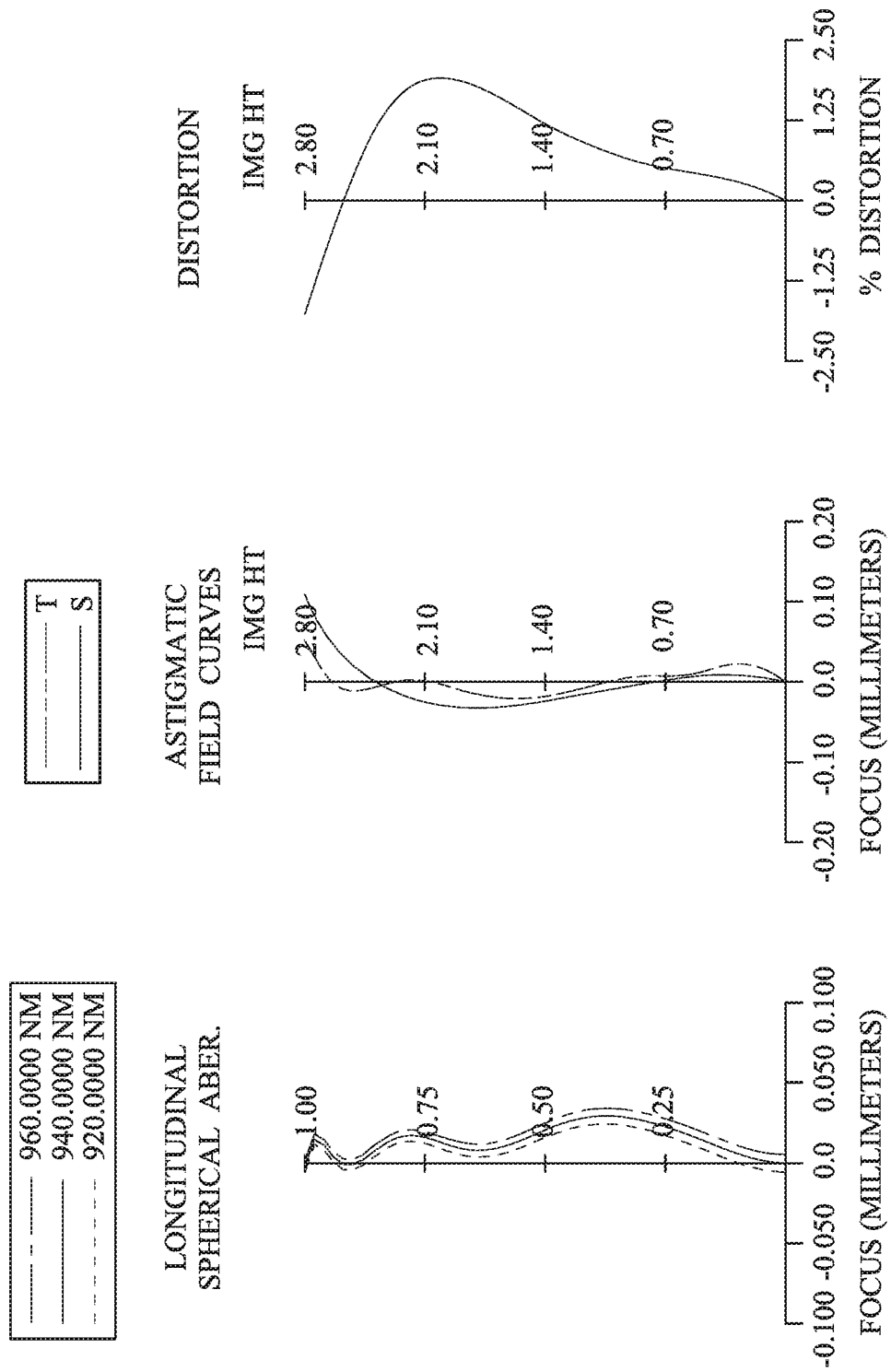
FIG. 22 shows spherical aberration curves, astigmatic field curves and a distortion curve of the imaging apparatus according to the 11th embodiment.

FIG. 21 is a schematic view of an imaging apparatus according to the 11th embodiment of the present disclosure. FIG. 22 shows spherical aberration curves, astigmatic field curves and a distortion curve of the imaging apparatus according to the 11th embodiment. In FIG. 21, the imaging apparatus includes an imaging optical lens assembly (its reference numeral is omitted) and an image sensor 1180. The imaging optical lens assembly includes, in order from an object side to an image side along an optical path, a first lens element 1110, an aperture stop 1100, a second lens element 1120, a third lens element 1130, a fourth lens element 1140, a fifth lens element 1150, a filter 1160 and an image surface 1170, wherein the image sensor 1180 is disposed on the image surface 1170 of the imaging optical lens assembly. The imaging optical lens assembly includes five lens elements (1110, 1120, 1130, 1140, 1150) without additional one or more lens elements inserted between the first lens element 1110 and the fifth lens element 1150.

The first lens element 1110 with positive refractive power has an object-side surface 1111 being convex in a paraxial region thereof and an image-side surface 1112 being convex in a paraxial region thereof. The first lens element 1110 is made of a plastic material, and has the object-side surface 1111 and the image-side surface 1112 being both aspheric. Furthermore, the object-side surface 1111 of the first lens element 1110 includes two inflection points and one critical point in an off-axis region thereof, and the image-side surface 1112 of the first lens element 1110 includes one inflection point and one critical point in an off-axis region thereof.

The second lens element 1120 with negative refractive power has an object-side surface 1121 being concave in a paraxial region thereof and an image-side surface 1122 being concave in a paraxial region thereof. The second lens element 1120 is made of a plastic material, and has the object-side surface 1121 and the image-side surface 1122 being both aspheric. Furthermore, the object-side surface 1121 of the second lens element 1120 includes two inflection points and one critical point in an off-axis region thereof, and the image-side surface 1122 of the second lens element 1120 includes one inflection point and one critical point in an off-axis region thereof.

The third lens element 1130 with positive refractive power has an object-side surface 1131 being convex in a paraxial region thereof and an image-side surface 1132 being convex in a paraxial region thereof. The third lens element 1130 is made of a plastic material, and has the object-side surface 1131 and the image-side surface 1132 being both aspheric. Furthermore, the object-side surface 1131 of the third lens element 1130 includes one inflection point and one critical point in an off-axis region thereof, and the image-side surface 1132 of the third lens element 1130 includes two inflection points in an off-axis region thereof.

The fourth lens element 1140 with negative refractive power has an object-side surface 1141 being concave in a paraxial region thereof and an image-side surface 1142 being convex in a paraxial region thereof. The fourth lens element 1140 is made of a plastic material, and has the object-side surface 1141 and the image-side surface 1142 being both aspheric. Furthermore, the object-side surface 1141 of the fourth lens element 1140 includes two inflection points in an off-axis region thereof, and the image-side surface 1142 of the fourth lens element 1140 includes one inflection point and one critical point in an off-axis region thereof.

The fifth lens element 1150 with positive refractive power has an object-side surface 1151 being convex in a paraxial region thereof and an image-side surface 1152 being concave in a paraxial region thereof. The fifth lens element 1150 is made of a plastic material, and has the object-side surface 1151 and the image-side surface 1152 being both aspheric. Furthermore, the object-side surface 1151 of the fifth lens element 1150 includes two inflection points and two critical points in an off-axis region thereof, and the image-side surface 1152 of the fifth lens element 1150 includes two inflection points and two critical points in an off-axis region thereof.

The filter 1160 is made of a glass material, which is located between the fifth lens element 1150 and the image surface 1170 in order, and will not affect the focal length of the imaging optical lens assembly.

The detailed optical data of the 11th embodiment are shown in Table 21 and the aspheric surface data are shown in Table 22 below.

TABLE 21

11th Embodiment
f = 3.49 mm, Fno = 1.12, HFOV = 39.0 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Lens 1 | 3.493 | ASP | 0.517 | Plastic | 1.640 | 19.5 | 2.72 |
| 2 | | −3.279 | ASP | −0.075 | | | | |
| 3 | Ape. Stop | Plano | | 0.125 | | | | |
| 4 | Lens 2 | −9.048 | ASP | 0.300 | Plastic | 1.524 | 55.9 | −2.82 |
| 5 | | 1.785 | ASP | 0.425 | | | | |
| 6 | Lens 3 | 4.075 | ASP | 0.933 | Plastic | 1.640 | 19.5 | 4.06 |
| 7 | | −6.547 | ASP | 0.678 | | | | |
| 8 | Lens 4 | −1.400 | ASP | 0.565 | Plastic | 1.640 | 19.5 | −115.61 |
| 9 | | −1.662 | ASP | 0.042 | | | | |
| 10 | Lens 5 | 1.815 | ASP | 0.868 | Plastic | 1.640 | 19.5 | 31.65 |
| 11 | | 1.622 | ASP | 0.600 | | | | |
| 12 | Filter | Plano | | 0.210 | Glass | 1.508 | 64.2 | — |
| 13 | | Plano | | 0.414 | | | | |
| 14 | Image | Plano | | — | | | | |

Reference wavelength is 940.0 nm.
Effective radius of Surface 5 is 1.570 mm.

TABLE 22

Aspheric Coefficients

| Surface # | 1 | 2 | 4 | 5 | 6 |
|---|---|---|---|---|---|
| k = | −3.9055E+00 | −4.5616E+01 | 1.9516E+01 | −1.3166E+01 | −1.0299E+01 |
| A4= | −1.9539E−04 | 5.2067E−03 | 2.1380E−02 | −1.1606E−02 | −3.4557E−02 |
| A6 = | −1.9220E−02 | 4.4991E−03 | 4.3927E−02 | −6.9125E−05 | −2.3463E−02 |
| A8 = | 8.9486E−03 | 5.3484E−03 | −1.3482E−02 | −6.7012E−03 | 4.5576E−02 |
| A10 = | −2.6304E−03 | −4.7665E−03 | −2.5385E−03 | −9.4407E−04 | −5.8949E−02 |
| A12 = | 3.5240E−04 | 9.6093E−04 | 1.9434E−03 | 1.4496E−03 | 3.3482E−02 |
| A14 = | | | −2.9596E−04 | −2.5304E−04 | −8.6053E−03 |
| A16 = | | | | | 8.3628E−04 |

| Surface # | 7 | 8 | 9 | 10 | 11 |
|---|---|---|---|---|---|
| k = | −3.5698E+01 | −5.7244E+00 | −6.0579E−01 | −1.7083E+01 | −2.7160E+00 |
| A4 = | −2.5691E−02. | −9.9894E−02 | −1.8982E−01 | −3.8549E−02 | −1.0281E−01 |
| A6 = | −3.3439E−02 | 4.2345E−03 | 4.6485E−01 | 5.1660E−02 | 7.1785E−02 |
| A8 = | 5.7141E−02 | 6.2357E−02 | −6.5562E−01 | −6.4064E−02 | −3.8756E−02 |
| A10 = | −5.3580E−02 | −7.9988E−02 | 6.0654E−01 | 4.3255E−02 | 1.4535E−02 |
| A12 = | 2.7469E−02 | 5.7537E−02 | −3.7189E−01 | −1.7911E−02 | −3.7452E−03 |
| A14 = | −6.6957E−03 | −2.3503E−02 | 1.4993E−01 | 4.5951E−03 | 6.4782E−04 |
| A16 = | 6.0680E−04 | 5.2481E−03 | −3.8059E−02 | −7.0204E−04 | −7.1913E−05 |
| A18 = | | −5.5393E−04 | 5.4924E−03 | 5.8241E−05 | 4.6439E−06 |
| A20 = | | 1.6152E−05 | −3.4166E−04 | −2.0174E−06 | −1.3268E−07 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 3.49 | CT3/(T23 + T34) | 0.85 |
| Fno | 1.12 | (T23 + T34)/ (T12 + T45) | 11.99 |
| HFOV [deg.] | 39.0 | T23/T34 | 0.63 |
| Nd1 | 1.669 | T34/T12 | 13.56 |
| Nd2 | 1.534 | TD/BL | 3.58 |
| Nd3 | 1.669 | TD/EPD | 1.39 |
| Nd4 | 1.669 | TL/f | 1.61 |
| Nd5 | 1.669 | TL/ImgH | 2.00 |
| Vd1 | 19.5 | R2/f | −0.94 |
| Vd2 | 55.9 | R4/f | 0.51 |
| Vd3 | 19.5 | (R5 + R6)/ (R5 − R6) | −0.23 |
| Vd4 | 19.5 | R8/f | −0.47 |
| Vd5 | 19.5 | 1/|f3/f1 + f3/f2 + f3/f4 + f3/f5| | 7.00 |
| Vd1 + Vd2 + Vd3 + Vd4 + Vd5 | 133.9 | f/f12 | 0.21 |
| ΣAT/T34 | 1.76 | f/f45 | 0.09 |
| ΣCT/ΣAT | 2.66 | f/R7 | −2.49 |
| ΣCT/CT3 | 3.41 | f3/f | 1.16 |
| (CT2 + CT3 + CT4)/ (T23 + T34) | 1.63 | f3/f4 | −0.04 |
| (CT3 + CT4)/T34 | 2.21 | f3/f5 | 0.13 |
| CT3/CT1 | 1.80 | Yc52/Y52 | 0.76, 0.99 |

<12th Embodiment>

Figure 23:
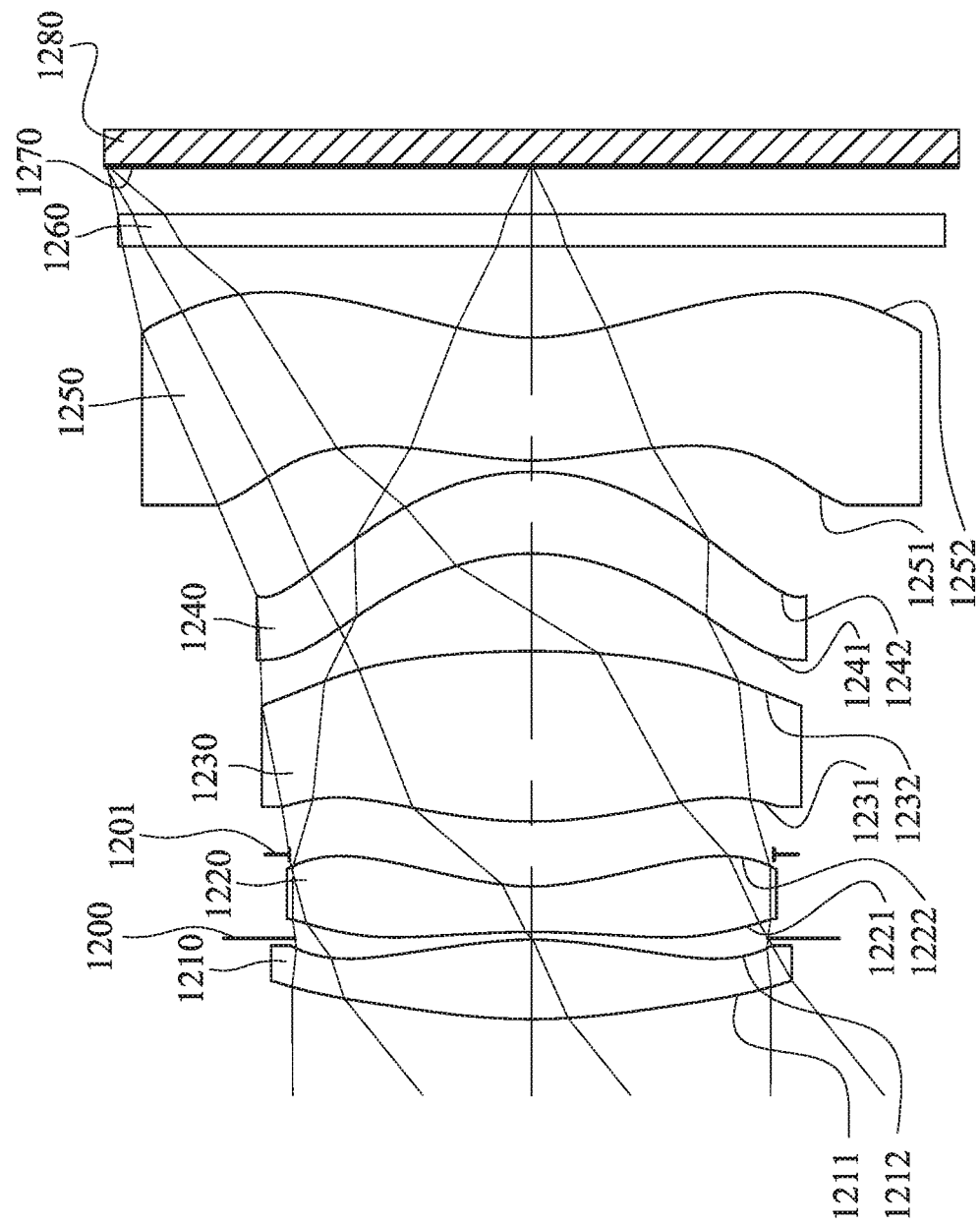
FIG. 23 is a schematic view of an imaging apparatus according to the 12th embodiment of the present disclosure.
Figure 24:
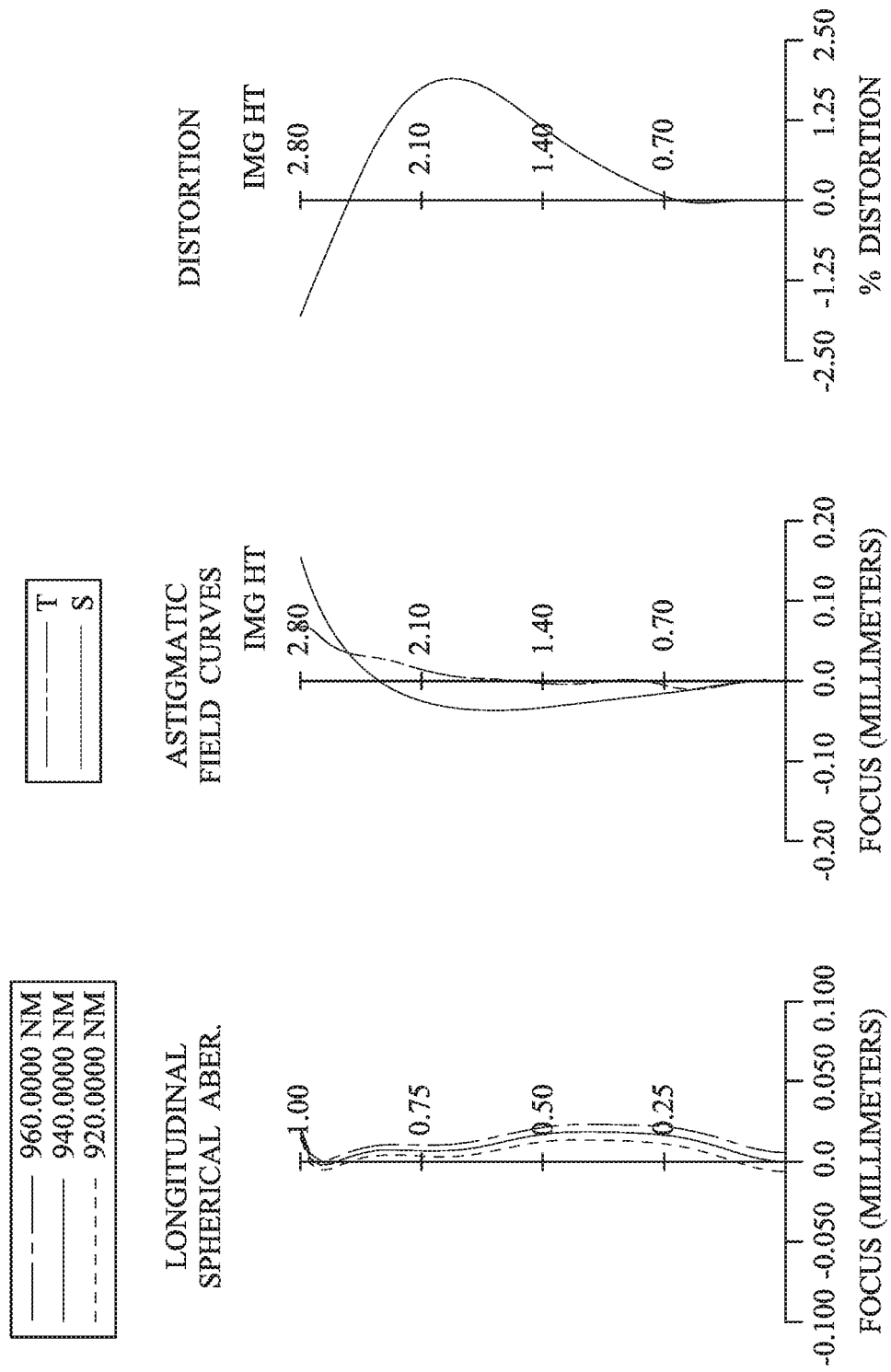
FIG. 24 shows spherical aberration curves, astigmatic field curves and a distortion curve of the imaging apparatus according to the 12th embodiment.

FIG. 23 is a schematic view of an imaging apparatus according to the 12th embodiment of the present disclosure. FIG. 24 shows spherical aberration curves, astigmatic field curves and a distortion curve of the imaging apparatus according to the 12th embodiment. In FIG. 23, the imaging apparatus includes an imaging optical lens assembly (its reference numeral is omitted) and an image sensor 1280. The imaging optical lens assembly includes, in order from an object side to an image side along an optical path, a first lens element 1210, an aperture stop 1200, a second lens element 1220, a stop 1201, a third lens element 1230, a fourth lens element 1240, a fifth lens element 1250, a filter 1260 and an image surface 1270, wherein the image sensor 1280 is disposed on the image surface 1270 of the imaging optical lens assembly. The imaging optical lens assembly includes five lens elements (1210, 1220, 1230, 1240, 1250) without additional one or more lens elements inserted between the first lens element 1210 and the fifth lens element 1250.

The first lens element 1210 with positive refractive power has an object-side surface 1211 being convex in a paraxial region thereof and an image-side surface 1212 being convex in a paraxial region thereof. The first lens element 1210 is made of a plastic material, and has the object-side surface 1211 and the image-side surface 1212 being both aspheric. Furthermore, the object-side surface 1211 of the first lens element 1210 includes three inflection points in an off-axis region thereof, and the image-side surface 1212 of the first lens element 1210 includes one inflection point and one critical point in an off-axis region thereof.

The second lens element 1220 with negative refractive power has an object-side surface 1221 being concave in a paraxial region thereof and an image-side surface 1222 being concave in a paraxial region thereof. The second lens element 1220 is made of a plastic material, and has the object-side surface 1221 and the image-side surface 1222 being both aspheric. Furthermore, the object-side surface 1221 of the second lens element 1220 includes two inflection points and one critical point in an off-axis region thereof, and the image-side surface 1222 of the second lens element 1220 includes one inflection point and one critical point in an off-axis region thereof.

The third lens element 1230 with positive refractive power has an object-side surface 1231 being convex in a paraxial region thereof and an image-side surface 1232 being convex in a paraxial region thereof. The third lens element 1230 is made of a plastic material, and has the object-side surface 1231 and the image-side surface 1232 being both aspheric. Furthermore, the object-side surface 1231 of the third lens element 1230 includes one inflection point and one critical point in an off-axis region thereof, and the image-side surface 1232 of the third lens element 1230 includes two inflection points in an off-axis region thereof.

The fourth lens element 1240 with negative refractive power has an object-side surface 1241 being concave in a paraxial region thereof and an image-side surface 1242 being convex in a paraxial region thereof. The fourth lens element 1240 is made of a plastic material, and has the object-side surface 1241 and the image-side surface 1242 being both aspheric. Furthermore, the object-side surface 1241 of the fourth lens element 1240 includes two inflection points in an off-axis region thereof, and the image-side surface 1242 of the fourth lens element 1240 includes one inflection point and one critical point in an off-axis region thereof.

The fifth lens element 1250 with negative refractive power has an object-side surface 1251 being convex in a paraxial region thereof and an image-side surface 1252 being concave in a paraxial region thereof. The fifth lens element 1250 is made of a plastic material, and has the object-side surface 1251 and the image-side surface 1252 being both aspheric. Furthermore, the object-side surface 1251 of the fifth lens element 1250 includes three inflection points and one critical point in an off-axis region thereof, and the image-side surface 1252 of the fifth lens element 1250 includes one inflection point and one critical point in an off-axis region thereof.

The filter 1260 is made of a glass material, which is located between the fifth lens element 1250 and the image surface 1270 in order, and will not affect the focal length of the imaging optical lens assembly.

The detailed optical data of the 12th embodiment are shown in Table 23 and the aspheric surface data are shown in Table 24 below.

TABLE 23

12th Embodiment
f = 3.49 mm, Fno = 1.12, HFOV = 39.0 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Lens 1 | 4.137 | ASP | 0.522 | Plastic | 1.634 | 20.4 | 2.45 |
| 2 | | −2.363 | ASP | 0.009 | | | | |
| 3 | Ape. Stop | Plano | | 0.041 | | | | |
| 4 | Lens 2 | −6.168 | ASP | 0.300 | Plastic | 1.525 | 55.9 | −2.27 |
| 5 | | 1.502 | ASP | 0.210 | | | | |
| 6 | Stop | Plano | | 0.216 | | | | |
| 7 | Lens 3 | 2.848 | ASP | 1.120 | Plastic | 1.634 | 20.4 | 3.27 |
| 8 | | −6.495 | ASP | 0.641 | | | | |
| 9 | Lens 4 | −1.427 | ASP | 0.536 | Plastic | 1.634 | 20.4 | −116.66 |
| 10 | | −1.667 | ASP | 0.075 | | | | |
| 11 | Lens 5 | 2.027 | ASP | 0.808 | Plastic | 1.634 | 20.4 | −86.42 |
| 12 | | 1.652 | ASP | 0.600 | | | | |
| 13 | Filter | Plano | | 0.210 | Glass | 1.508 | 64.2 | — |
| 14 | | Plano | | 0.315 | | | | |
| 15 | Image | Plano | | — | | | | |

Reference wavelength is 940.0 nm.
Effective radius of Surface 6 (stop 1201) is 1.590 mm.

TABLE 24

Aspheric Coefficients

| Surface # | 1 | 2 | 4 | 5 | 7 |
|---|---|---|---|---|---|
| k = | −5.0781E+01 | −2.4897E+01 | 9.9076E+00 | −1.1535E+01 | −1.0000E+00 |
| A4 = | 6.8581E−02 | 3.6638E−02 | 5.2986E−02 | −2.5945E−02 | −5.4409E−02 |
| A6 = | −8.6900E−02 | −5.4636E−02 | −1.5262E−02 | 1.6992E−02 | 2.3612E−02 |
| A8 = | 4.5787E−02 | 4.7118E−02 | 3.5082E−02 | −1.7794E−02 | −2.0013E−02 |
| A10 = | −1.0138E−02 | −1.4628E−02 | −2.1839E−02 | 4.1376E−03 | 1.1319E−02 |
| A12 = | 7.7648E−04 | 1.6952E−03 | 5.3994E−03 | −4.4700E−05 | −7.6696E−03 |
| A14 = | | | −4.9083E−04 | −6.6635E−05 | 2.9069E−03 |
| A16 = | | | | | −3.8167E−04 |

| Surface # | 8 | 9 | 10 | 11 | 12 |
|---|---|---|---|---|---|
| k = | −2.5330E+01 | −8.1022E+00 | −6.6335E−01 | −1.9488E+01 | −6.1760E−01 |
| A4 = | −1.9043E−02 | −1.8606E−01 | −1.8518E−01 | −9.4744E−02 | −1.9062E−01 |
| A6 = | −7.2529E−03 | 1.7485E−01 | 4.6103E−01 | 9.8139E−02 | 1.1288E−01 |
| A8 = | 1.2717E−02 | −1.4077E−01 | −6.5294E−01 | −8.8556E−02 | −6.3925E−02 |
| A10 = | −1.3069E−02 | 8.6883E−02 | 6.1325E−01 | 4.1839E−02 | 2.6305E−02 |
| A12 = | 5.7079E−03 | −4.2257E−02 | −3.8427E−01 | −8.3649E−03 | −7.6509E−03 |
| A14 = | −9.3988E−04 | 1.8412E−02 | 1.5838E−01 | −1.0212E−03 | 1.5183E−03 |
| A16 = | 3.6242E−05 | −6.1340E−03 | −4.0900E−02 | 8.5361E−04 | −1.9572E−04 |
| A18 = | | 1.2028E−03 | 5.9618E−03 | −1.5393E−04 | 1.4781E−05 |
| A20 = | | −9.9315E−05 | −3.7208E−04 | 9.3748E−06 | −4.9647E−07 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 3.49 | CT3/(T23 + T34) | 1.05 |
| Fno | 1.12 | (T23 + T34)/(T12 + T45) | 8.54 |

-continued

| 12th Embodiment | | | |
|---|---|---|---|
| HFOV (deg.) | 39.0 | T23/T34 | 0.66 |
| Nd1 | 1.660 | T34/T12 | 12.82 |
| Nd2 | 1.534 | TD/BL | 3.98 |
| Nd3 | 1.660 | TD/EPD | 1.42 |
| Nd4 | 1.660 | TL/f | 1.61 |
| Nd5 | 1.660 | TL/ImgH | 2.00 |
| Vd1 | 20.4 | R2/f | −0.68 |
| Vd2 | 55.9 | R4/f | 0.43 |
| Vd3 | 20.4 | (R5 + R6)/(R5 − R6) | −0.39 |
| Vd4 | 20.4 | R8/f | −0.48 |
| Vd5 | 20.4 | 1/|f3/f1 + f3/f2 + f3/f4 + f3/f5| | 5.85 |
| Vd1 + Vd2 + Vd3 + Vd4 + Vd5 | 137.5 | f/f12 | 0.09 |
| ΣAT/T34 | 1.86 | f/f45 | −0.08 |

-continued

| 12th Embodiment | | | |
|---|---|---|---|
| ΣCT/ΣAT | 2.76 | f/R7 | −2.45 |
| ΣCT/CT3 | 2.93 | f3/f | 0.94 |
| (CT2 + CT3 + CT4)/(T23 + T34) | 1.83 | f3/f4 | −0.03 |
| (CT3 +CT4)/T34 | 2.58 | f3/f5 | −0.04 |
| CT3/CT1 | 2.15 | Yc52/Y52 | 0.67 |

<13th Embodiment>

Figure 26:
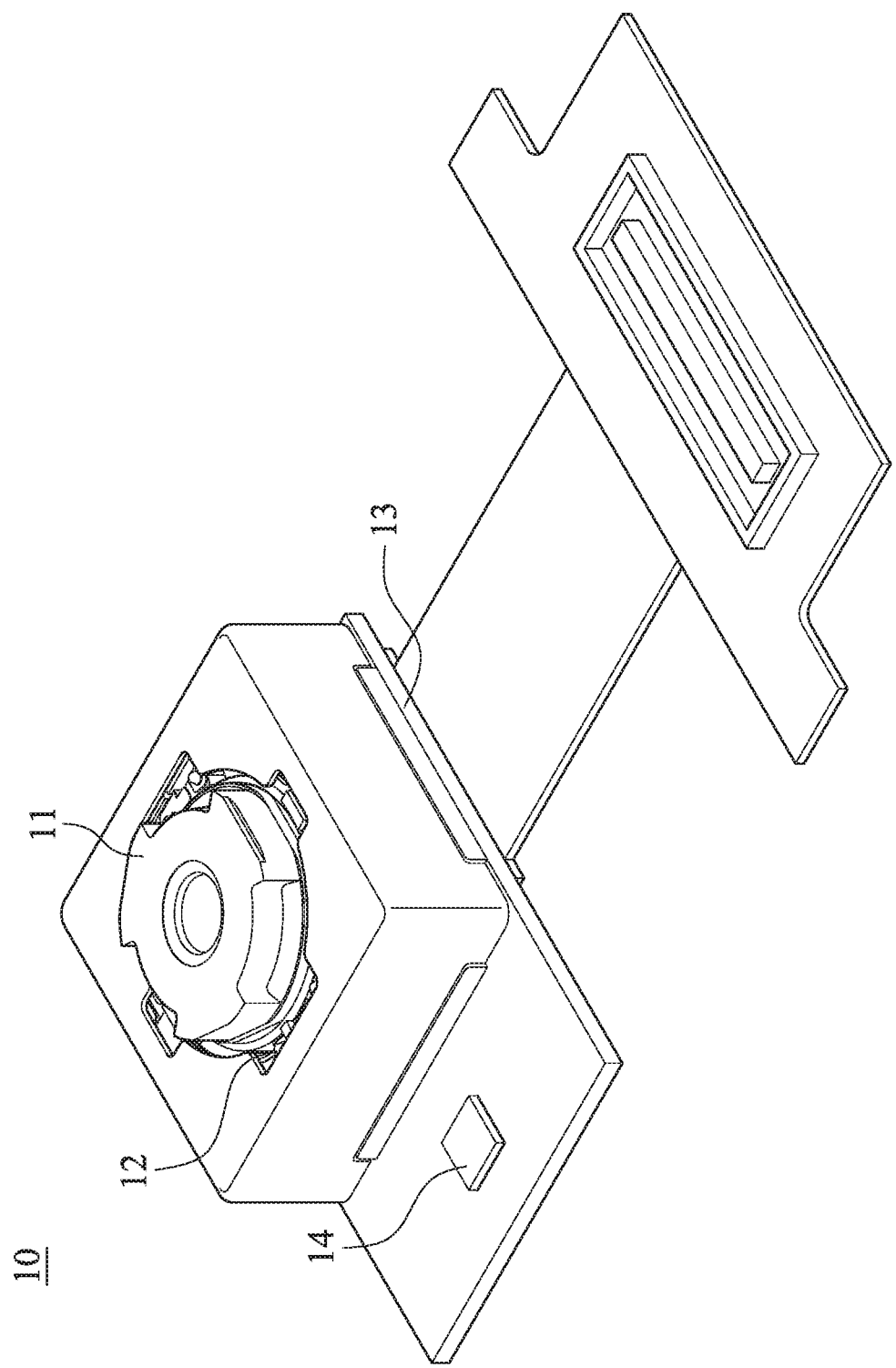
FIG. 26 is a schematic view of an imaging apparatus 10 according to the 13th embodiment of the present disclosure.

FIG. 26 is a schematic view of an imaging apparatus 10 according to the 13th embodiment of the present disclosure. In FIG. 26, the imaging apparatus 10 of the 13th embodiment is a camera module, the imaging apparatus 10 includes an imaging lens assembly 11, a driving apparatus 12 and an image sensor 13, wherein the imaging lens assembly 11 includes the imaging optical lens assembly of the present disclosure and a lens barrel (not shown in drawings) for carrying the imaging optical lens assembly. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The imaging optical lens assembly can obtain a favorable imaging position by the driving apparatus 12 so as to capture clear images when the imaged object is disposed at different object distances.

The imaging apparatus 10 can include the image sensor 13 located on the image surface of the imaging optical lens assembly, such as CMOS and CCD, with superior photosensitivity and low noise. Thus, it is favorable for providing realistic images with high definition image quality thereof.

Moreover, the imaging apparatus 10 can further include an image stabilization module 14, which can be a kinetic energy sensor, such as an accelerometer, a gyro sensor, and a Hall Effect sensor. In the 13th embodiment, the image stabilization module 14 is a gyro sensor, but is not limited thereto. Therefore, the variation of different axial directions of the imaging optical lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

14th Embodiment

Figure 27A:
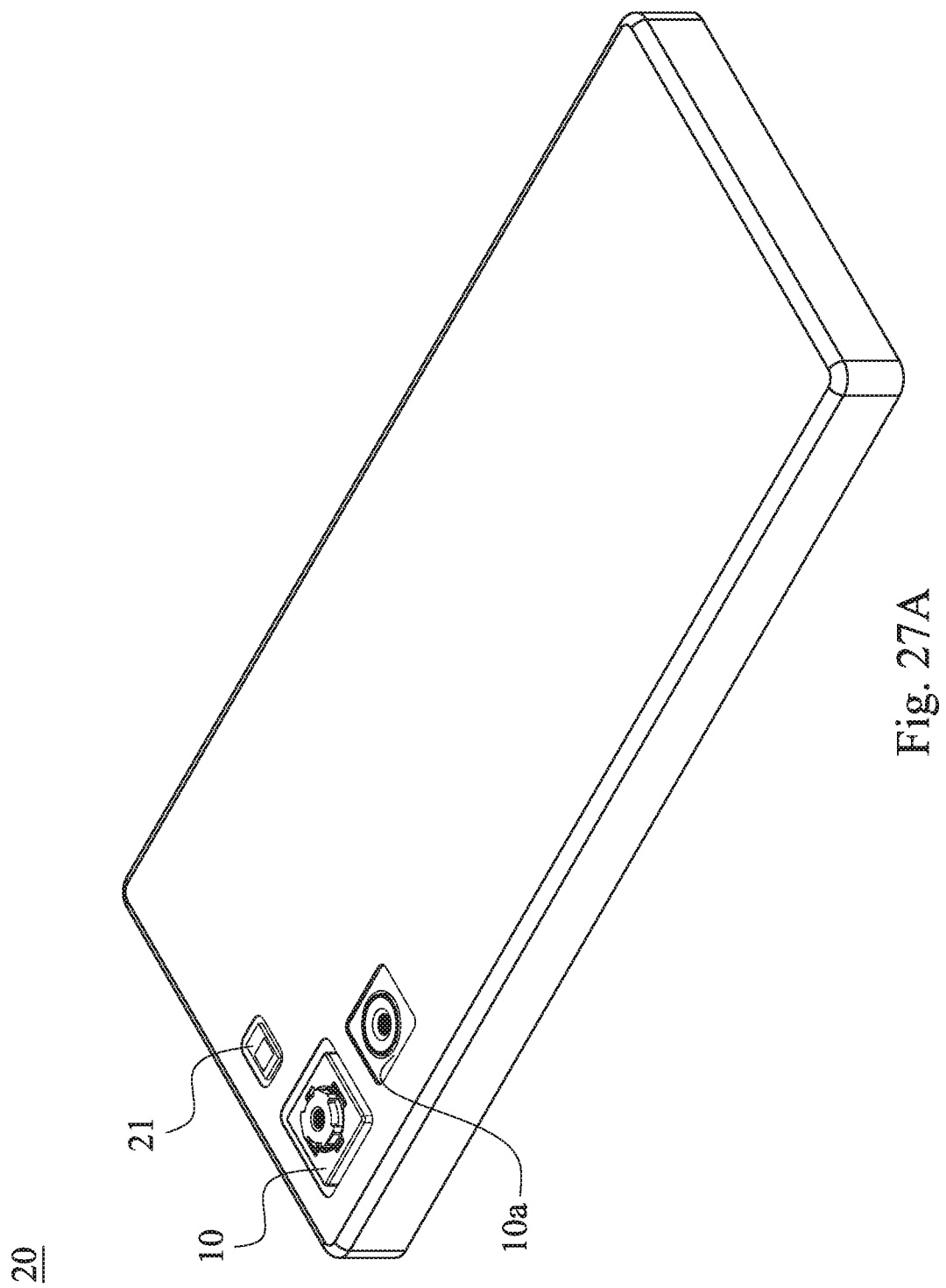
FIG. 27A is a schematic view of one side of an electronic device 20 according to the 14th embodiment of the present disclosure.
Figure 27B:
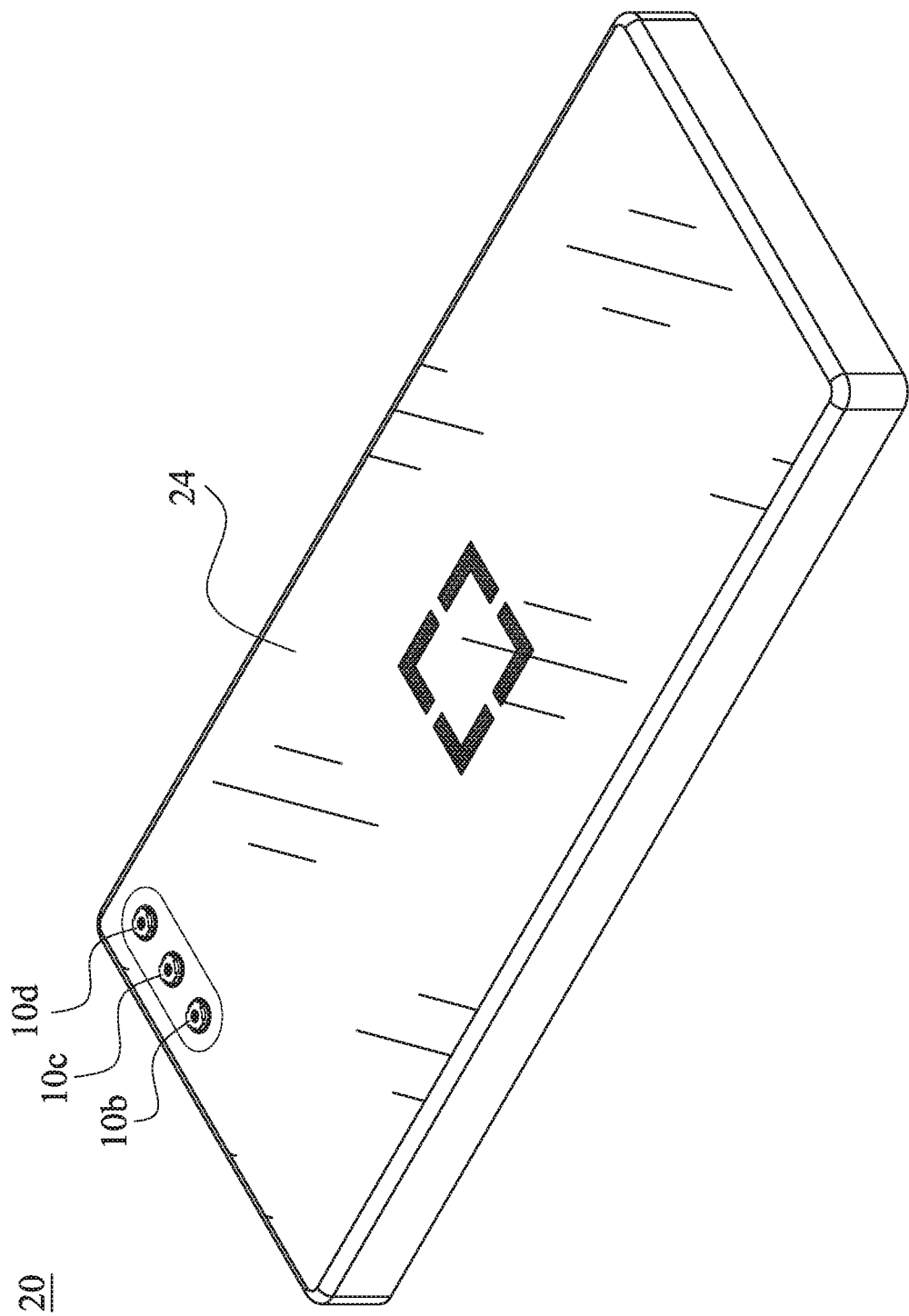
FIG. 27B is a schematic view of another side of the electronic device 20 of FIG. 27A.
Figure 27C:
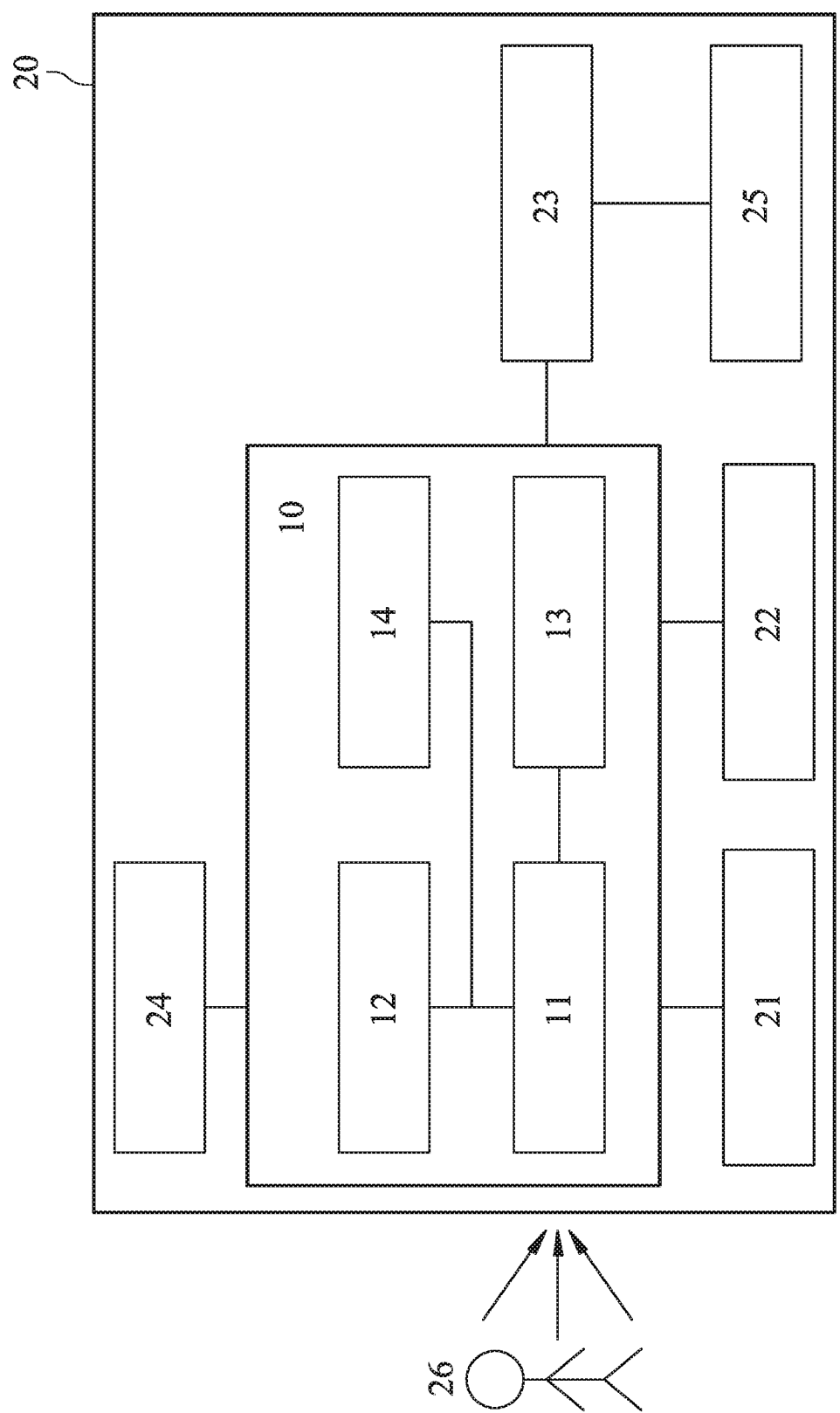
FIG. 27C is a system schematic view of the electronic device 20 of FIG. 27A.

FIG. 27A is a schematic view of one side of an electronic device 20 according to the 14th embodiment of the present disclosure. FIG. 27B is a schematic view of another side of the electronic device 20 of FIG. 27A. FIG. 27C is a system schematic view of the electronic device 20 of FIG. 27A. In FIGS. 27A, 27B and 27C, the electronic device 20 according to the 14th embodiment is a smartphone, which include imaging apparatuses 10, 10a, 10b, 10c, 10d, a flash module 21, a focusing assisting module 22, an image signal processor (ISP) 23, a user interface 24 and an image software processor 25, wherein each of the Imaging apparatuses 10b, 10c, 10d is a front camera. When the user captures images of an imaged object 26 via the user interface 24, the electronic device 20 focuses and generates an image via at least one of the imaging apparatuses 10, 10a, 10b, 10c, 10d while compensating for low illumination via the flash module 21 when necessary. Then, the electronic device 20 quickly focuses on the imaged object 26 according to its object distance information provided by the focusing assisting module 22, and optimizes the image via the image signal processor 23 and the image software processor 25. Thus, the image quality can be further enhanced. The focusing assisting module 22 can adopt conventional infrared or laser for obtaining quick focusing, and the user interface 24 can utilize a touch screen or a physical button for capturing and processing the image with various functions of the image processing software.

Each of the imaging apparatuses 10, 10a, 10b, 10c, 10d according to the 14th embodiment can include the imaging optical lens assembly of the present disclosure, and can be the same or similar to the imaging apparatus 10 according to the aforementioned 13th embodiment, and will not describe again herein. In detail, according to the 14th embodiment, the imaging apparatuses 10, 10a can be wide angle imaging apparatus and ultra-wide angle imaging apparatus, respectively. The imaging apparatuses 10b, 10c, 10d can be TOF (Time-Of-Flight) module, ultra-wide angle imaging apparatus and wide angle imaging apparatus, respectively, or can be others imaging apparatuses, which will not be limited thereto. Further, the connecting relationships between each of the imaging apparatuses 10a, 10b, 10c, 10d and other elements can be the same as the imaging apparatus 10 in FIG. 27C, or can be adaptively adjusted according to the type of the imaging apparatuses, which will not be shown and detailed descripted again.

15th Embodiment

FIG. 28 is a schematic view of one side of an electronic device 30 according to the 15th embodiment of the present disclosure. According to the 15th embodiment, the electronic device 30 is a smartphone, which include imaging apparatuses 30a, 30b, 30c and a flash module 31.

The electronic device 30 according to the 15th embodiment can include the same or similar elements to that according to the 14th embodiment, and each of the imaging apparatuses 30a, 30b, 30c and the flash module 31 according to the 15th embodiment can have a configuration which is the same or similar to that according to the 14th embodiment, and will not describe again herein. In detail, according to the 15th embodiment, each of the imaging apparatuses 30a, 30b, 30c can include the imaging optical lens assembly of the present disclosure, and can be the same or similar to the imaging apparatus 10 according to the aforementioned 13th embodiment, and will not describe again herein. In detail, the imaging apparatuses 30a, 30b, 30c can be ultra-wide angle imaging apparatus, wide angle imaging apparatus and telephoto imaging apparatus (which can include light path folding element), respectively, or can be adaptively adjusted according to the type of the imaging apparatuses, which will not be limited to the arrangement.

16th Embodiment

Figure 29:
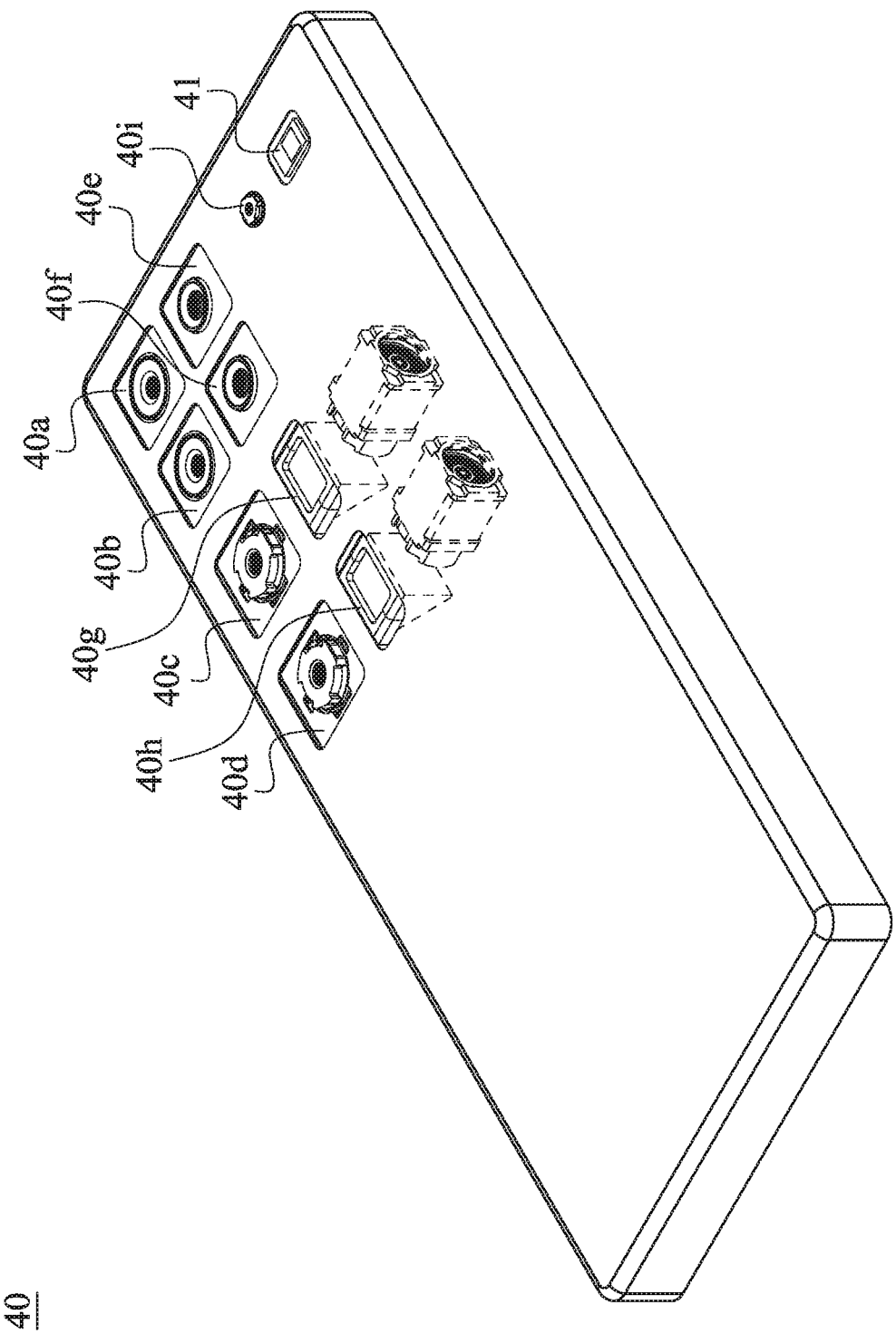
FIG. 29 is a schematic view of one side of an electronic device according to the 16th embodiment of the present disclosure.

FIG. 29 is a schematic view of one side of an electronic device 40 according to the 16th embodiment of the present disclosure. According to the 16th embodiment, the electronic device 40 is a smartphone, which include imaging apparatuses 40a, 40b, 40c, 40d, 40e, 40f, 40g, 40h, 401 and a flash module 41.

The electronic device 40 according to the 16th embodiment can include the same or similar elements to that according to the 14th embodiment, and each of the imaging apparatuses 40a, 40b, 40c, 40d, 40e, 40f, 40g, 40h, 401 and the flash module 41 can have a configuration which is the same or similar to that according to the 14th embodiment, and will not describe again herein. In detail, according to the 16th embodiment, each of the imaging apparatuses 40a, 40b, 40c, 40d, 40e, 40f, 40g, 40h, 401 can include the imaging optical lens assembly of the present disclosure, and can be the same or similar to the imaging apparatus 10 according to the aforementioned 13th embodiment, and will not describe again herein. In detail, each of the imaging apparatuses 40a, 40b can be ultra-wide angle imaging apparatus, each of the imaging apparatuses 40c, 40d can be wide angle imaging apparatus, each of the imaging apparatuses 40e, 40f can be telephoto imaging apparatus, each of the imaging apparatuses 40g, 40h can be telephoto imaging apparatus (which can include light path folding element), the imaging apparatus 40i can be TOF module, or can be adaptively adjusted according to the type of the imaging apparatuses, which will not be limited to the arrangement.

17th Embodiment

Figure 30:
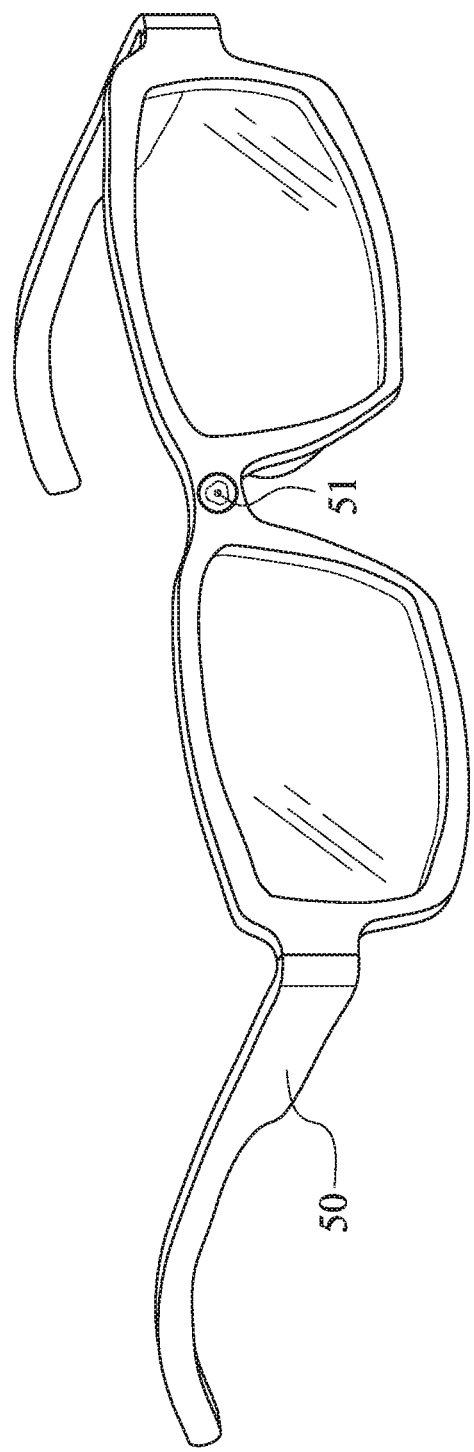
FIG. 30 is a schematic view of an electronic device according to the 17th embodiment of the present disclosure.

FIG. 30 is a schematic view of an electronic device 50 according to the 17th embodiment of the present disclosure. The electronic device 50 of the 17th embodiment is a wearable device, wherein the electronic device 50 includes an imaging apparatus 51, wherein the imaging apparatus 51 can be the same or similar to the imaging apparatus 10 according to the aforementioned 13th embodiment, and will not describe again herein.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising five lens elements, the five lens elements being, in order from an object side to an image side along an optical path:
   a first lens element, a second lens element, a third lens element, a fourth lens element and a fifth lens element, each of the five lens elements has an object-side surface towards the object side and an image-side surface towards the image side;
   when the first lens element has the image-side surface being convex in a paraxial region thereof;
   the second lens element has the image-side surface being concave in a paraxial region thereof;
   the third lens element has positive refractive power;
   the fourth lens element has the object-side surface being concave in a paraxial region thereof and the image-side surface being convex in a paraxial region thereof;
   the fifth lens element has the object-side surface being convex in a paraxial region thereof and the image-side surface being concave in a paraxial region thereof;
   at least one of the object-side surface and the image-side surface of at least one of the five lens elements comprises at least one critical point in an off-axis region thereof;
   wherein a total number of the lens elements in the imaging optical lens assembly is five; when an Abbe number of the first lens element is Vd1, an Abbe number of the second lens element is Vd2, an Abbe number of the third lens element is Vd3, an Abbe number of the fourth lens element is Vd4, an Abbe number of the fifth lens element is Vd5, and the following condition is satisfied:

$55.0 < Vd1+Vd2+Vd3+Vd4+Vd5 < 140.0$;

wherein a focal length of the imaging optical lens assembly is f, a focal length of the third lens element is f3, a curvature radius of the image-side surface of the second lens element is R4, and the following conditions are satisfied:

$0 < f3/f < 4.5$; and $0.30 < R4/f < 0.60$;

wherein a distance between a critical point of the image-side surface of the fifth lens element and an optical axis is Yc52, a maximum distance between an optical effective region of the image-side surface of the fifth lens element and the optical axis is Y52, and the image-side surface of the fifth lens element comprises at least one critical point in an off-axis region thereof satisfying the following condition:

$0.60 < Yc52/Y52 < 0.90$.

2. The imaging optical lens assembly of claim 1, wherein the Abbe number of the first lens element is Vd1, the Abbe number of the second lens element is Vd2, the Abbe number of the third lens element is Vd3, the Abbe number of the fourth lens element is Vd4, the Abbe number of the fifth lens element is Vd5, and the following condition is satisfied:

$60.0 < Vd1+Vd2+Vd3+Vd4+Vd5 < 120.0$.

3. The imaging optical lens assembly of claim 1, wherein the third lens element has the object-side surface being convex in a paraxial region thereof and the image-side surface being convex in a paraxial region thereof; the focal length of the imaging optical lens assembly is f, the focal length of the third lens element is f3, and the following condition is satisfied:

$0.40 < f3/f < 2.5$.

4. The imaging optical lens assembly of claim 1, wherein a curvature radius of the object-side surface of the fourth lens element is R7, and the following condition is satisfied:

$-4.4 < f/R7 < -1.8$.

5. The imaging optical lens assembly of claim 1, wherein a sum of central thicknesses of all lens elements of the imaging optical lens assembly is ΣCT, a sum of all axial distances between adjacent lens elements of the imaging optical lens assembly is ΣAT, an axial distance between the third lens element and the fourth lens element is T34, and the following conditions are satisfied:

$1.4 < \Sigma AT/T34 < 2.3$; and $1.0 < \Sigma CT/\Sigma AT < 3.0$.

6. The imaging optical lens assembly of claim 1, wherein a central thickness of the first lens element is CT1, a central thickness of the third lens element is CT3, and the following condition is satisfied:

$$1.70 < CT3/CT1 < 4.25.$$

7. The imaging optical lens assembly of claim 1, wherein a central thickness of the second lens element is CT2, a central thickness of the third lens element is CT3, a central thickness of the fourth lens element is CT4, an axial distance between the first lens element and the second lens element is T12, an axial distance between the second lens element and the third lens element is T23, an axial distance between the third lens element and the fourth lens element is T34, and the following conditions are satisfied:

$$0.30 < (CT2+CT3+CT4)/(T23+T34) < 3.0; \text{ and}$$

$$6.00 < T34/T12 < 100.$$

8. The imaging optical lens assembly of claim 1, wherein the imaging optical lens assembly is applied to an infrared band within a wavelength ranged from 780 nm to 1500 nm; at least one of the object-side surface and the image-side surface of each of at least three of the five lens elements comprises at least one inflection point; an axial distance between the object-side surface of the first lens element and the image-side surface of the fifth lens element is TD, an axial distance between the image-side surface of the fifth lens element and an image surface is BL, an entrance pupil diameter of the imaging optical lens assembly is EPD, and the following conditions are satisfied:

$$3.0 < TD/BL; \text{ and}$$

$$1.0 < TD/EPD < 2.2.$$

9. An imaging apparatus, comprising:
the imaging optical lens assembly of claim 1; and
an image sensor disposed on an image surface of the imaging optical lens assembly.

10. An electronic device, comprising:
the imaging apparatus of claim 9.

* * * * *

UNITED STATES PATENT AND TRADEMARK OFFICE
CERTIFICATE OF CORRECTION

PATENT NO. : 11,899,172 B2  
APPLICATION NO. : 17/038066  
DATED : February 13, 2024  
INVENTOR(S) : Chung-Yu Wei et al.

Page 1 of 1

It is certified that error appears in the above-identified patent and that said Letters Patent is hereby corrected as shown below:

On the Title Page

Item (54) in the title, and in the Specification, Column 1, Lines 1-5, immediately following "FIVE LENSES" please insert --OF--.

Signed and Sealed this  
Twenty-fourth Day of December, 2024

Derrick Brent  
*Acting Director of the United States Patent and Trademark Office*